US009656223B2

(12) United States Patent
Mochizuki

(10) Patent No.: US 9,656,223 B2
(45) **Date of Patent: *May 23, 2017**

(54) MIXING UNIT AND DEVICE, FLUID MIXING METHOD AND FLUID

(71) Applicant: Isel Co., Ltd.

(72) Inventor: Noboru Mochizuki, Osaka (JP)

(73) Assignee: Isel Co., Ltd., Osaka (JP)

( * ) Notice: Subject to any disclaimer, the term of this patent is extended or adjusted under 35 U.S.C. 154(b) by 96 days.

This patent is subject to a terminal disclaimer.

(21) Appl. No.: 14/203,188

(22) Filed: Mar. 10, 2014

(65) Prior Publication Data

US 2014/0241960 A1 Aug. 28, 2014

Related U.S. Application Data

(63) Continuation-in-part of application No. PCT/JP2013/056439, filed on Mar. 8, 2013, and a (Continued)

(30) Foreign Application Priority Data

Jun. 16, 2008 (JP) ................................ 2008-157237
Oct. 22, 2008 (JP) ................................ 2008-272394

(Continued)

(51) Int. Cl.
*B01F 5/00* (2006.01)
*B01F 5/06* (2006.01)

(Continued)

(52) U.S. Cl.
CPC ............. *B01F 5/12* (2013.01); *B01F 5/0604* (2013.01); *B01F 5/104* (2013.01);

(Continued)

(58) Field of Classification Search
CPC ........ B01F 5/06; B01F 5/0602; B01F 5/0604; B01F 5/10; B01F 5/104; B01F 5/12;

(Continued)

(56) References Cited

U.S. PATENT DOCUMENTS 3,770,249 A 11/1973 Schmitt
3,780,767 A 12/1973 Borg et al.

(Continued)

FOREIGN PATENT DOCUMENTS

DE 2330329 A1 1/1975
EP 2286905 A1 2/2011

(Continued)

OTHER PUBLICATIONS

Machine translation of JP 11-009980 A, published on Jan. 19, 1999.*

(Continued)

*Primary Examiner* — Natasha Young
(74) *Attorney, Agent, or Firm* — Nakanishi IP Associates, LLC

(57) ABSTRACT

A mixing unit has a stacked member having mixing elements that are stacked in a stacking direction and that extend in an extending direction, a first plate, and a second plate disposed opposite the first plate. The stacked member is sandwiched between the first plate and the second plate. Each of the mixing elements has first through holes. The second plate comprises an opening portion that communicates with the first through holes in the stacked member.

54 Claims, 48 Drawing Sheets

Related U.S. Application Data continuation-in-part of application No. 12/999,102, filed as application No. PCT/JP2009/060922 on Jun. 16, 2009, now Pat. No. 8,715,585.

(60) Provisional application No. 61/610,290, filed on Mar. 13, 2012.

(30) Foreign Application Priority Data

| | | |
|---|---|---|
| Feb. 27, 2009 | (JP) | 2009-045414 |
| Jun. 2, 2009 | (JP) | 2009-132802 |

(51) Int. Cl.

| | |
|---|---|
| ***B01F 5/10*** | (2006.01) |
| ***B01F 5/12*** | (2006.01) |
| ***B01F 7/00*** | (2006.01) |
| ***B01F 7/16*** | (2006.01) |
| ***B01F 7/32*** | (2006.01) |
| ***B01J 19/00*** | (2006.01) |
| ***B01J 19/18*** | (2006.01) |
| ***B01J 19/24*** | (2006.01) |
| *B01J 8/00* | (2006.01) |
| *B01J 8/02* | (2006.01) |
| *B01J 8/04* | (2006.01) |

(52) U.S. Cl.

CPC ...... *B01F 7/00241* (2013.01); *B01F 7/00491* (2013.01); *B01F 7/00633* (2013.01); *B01F 7/1625* (2013.01); *Y10T 29/49885* (2015.01)

(58) Field of Classification Search

CPC ........ B01F 7/00; B01F 7/00008; B01F 7/002; B01F 7/00241; B01F 7/0042; B01F 7/00491; B01F 7/00625; B01F 7/00633; B01F 7/16; B01F 7/1625; B01F 7/32; B01F 5/0603; B01F 7/00233; B01F 7/0045; B01F 5/00; B01J 8/00; B01J 8/02; B01J 8/0292; B01J 8/04; B01J 8/0446–8/0453; B01J 8/0492; B01J 19/00; B01J 19/0053–19/0066; B01J 19/18; B01J 19/1806; B01J 19/24; B01J 19/2405; B01J 2208/00796; B01J 2208/00823–2208/00849; B01J 2219/00761–2219/00765; B01J 2219/00777; B01J 2219/00779; B01J 2208/00777; B01J 2208/00779

See application file for complete search history.

(56) References Cited

U.S. PATENT DOCUMENTS

| | | | | |
|---|---|---|---|---|
| 4,456,033 | A | 6/1984 | Kay et al. | |
| 6,568,845 | B1 * | 5/2003 | Harada | B01F 5/0603 366/340 |
| 2004/0135017 | A1 | 7/2004 | Sekine | |
| 2006/0004226 | A1 * | 1/2006 | Machhammer | B01J 8/0453 562/526 |

FOREIGN PATENT DOCUMENTS

| | | | | |
|---|---|---|---|---|
| GB | 398114 | A | | 9/1933 |
| JP | S55-020737 | B2 | | 6/1980 |
| JP | S58-133822 | A | | 8/1983 |
| JP | S58-184381 | A | | 10/1983 |
| JP | H09-276675 | A | | 10/1997 |
| JP | 10216495 | A | * | 8/1998 |
| JP | 11009980 | A | * | 1/1999 |
| JP | H11-009980 | A | | 1/1999 |
| JP | 11114396 | A | * | 4/1999 |
| JP | 2003-305360 | A | | 10/2003 |
| JP | 2007-209862 | A | | 8/2007 |
| JP | 2011-121020 | A | | 6/2011 |
| WO | 02-089989 | A1 | | 11/2002 |

OTHER PUBLICATIONS

Machine translation of JP 10-216495 A, published on Aug. 18, 1998.*

Machine translation of JP 11-114396 A, published on Apr. 27, 1999.*

Extended European Search Report issued in European Patent Application No. 09766636.6, mailed on May 28, 2014 (10 pages).

Communication pursuant to Article 94(3) EPC issued in European Patent Application No. 09766636.6, mailed on Mar. 25, 2015 (5 pages).

Extended European Search Report issued in European Patent Application No. 13760917.8, mailed on Nov. 17, 2015 (13 pages).

Partial Supplemental European Search Report issued in European Patent Application No. 13760917.8, mailed on Jul. 21, 2015 (7 pages).

* cited by examiner (a)

(b)

(a)

MIXING UNIT AND DEVICE, FLUID MIXING METHOD AND FLUID

CROSS-REFERENCE TO RELATED APPLICATIONS

This application is a continuation-in-part of U.S. patent application Ser. No. 12/999,102 (filed on Dec. 15, 2010), which is U.S. national phase application of International Patent application No. PCT/JP2009/060922, now WO 2013/154153, (filed on Jun. 16, 2009), which claims the benefit of priority from Japanese Patent applications Nos. 2008-157237 (filed on Jun. 16, 2008), 2008-272394 (filed on Oct. 22, 2008), 2009-045414 (filed on Feb. 27, 2009), and 2009-132802 (filed on Jun. 2, 2009). Note that U.S. patent application Ser. No. 12/999,102 is now issued as U.S. Pat. No. 8,715,585.

Also, this application is a continuation-in-part-application of International Patent application No. PCT/JP2013/056439, now WO 2013/137136, (filed on Mar. 8, 2013), which claims the benefit of priority from U.S. Provisional Patent application No. 61/610,290 (filed on Mar. 13, 2012).

BACKGROUND OF THE INVENTION

1. Field of the Invention

The present invention relates to a mixing unit for mixing a fluid such as a liquid or a gas and a device using such a mixing unit, and, more particularly, relates to a mixing unit that can be suitably utilized for static mixing where a fluid is mixed by being passed, dynamic mixing where a fluid is mixed by rotation within the fluid, the promotion of a reaction involving the mixing of a liquid and the like, and to a device and a method using such a mixing unit.

2. Description of the Related Art

As a static mixing device for mixing a fluid, a Kenics-type static mixer or the like is widely used. Since this type of static mixing device generally does not include a movable component, the static mixing device is widely used in fields, such as the chemical industry and the food industry, in which fluids are required to be mixed in piping. On the other hand, as a dynamic mixing device, a product is widely used in which an agitation impeller is provided in a fluid within a mixing vessel and which rotates the agitation impeller to mix the fluid.

As a conventional static fluid mixing device, there is a static fluid mixing device which includes a tubular case body and a plurality of types of disc-shaped elements where a plurality of holes are drilled a predetermined space apart within the tubular case body, and in which the elements are sequentially combined in the direction of thickness thereof, are fitted and are fixed with connection hardware.

In the fluid mixing device described above, a plurality of types of elements are sequentially combined, and thus static mixing agitation caused by the division and combination of a fluid is performed, and mixing agitation is also performed such as by eddies and disturbance resulting from enlarged and reduced cross sections and shearing stress.

However, in the fluid mixing device described above, since the direction from the inlet to the outlet of the mixing device is the same as the direction of the division and aggregation of the fluid, its static mixing effect is low. Although the cross sections of holes are enlarged and reduced to increase its flow resistance and thus the mixing effect is improved, the loss of pressure in the entire device is increased. Since the holes are trapezoidal and have a flow reduction portion, it is difficult to process the holes.

As another conventional static fluid mixing device, there is a static fluid mixing device that includes a cylindrical casing and a mixing unit member which is formed with a first mixing hollow core group and a second mixing hollow core group, each having a plurality of hollow cores within a cylindrical member inserted into the cylindrical casing.

In the fluid mixing device described above, a fluid entering from its inlet is prevented from flowing linearly to changes direction, and flows radially between the hollow cores communicating with each other, with the result that the fluid is dispersed and mixed such as by collision, dispersion, combination, meandering and eddying flow. Since the direction from the inlet to the outlet of the mixing device differs from the direction of the division and aggregation of the fluid, its static mixing effect is high.

However, in the fluid mixing device described above, since the mixing unit member is formed with only the first mixing hollow core group and the second mixing hollow core group, the dispersion and combination of the fluid is performed only planarly and two-dimensionally with respect to the radial direction. The fluid only flows alternately between the first mixing hollow core group and the second mixing hollow core group, which overlap each other, and is thereby prevented from extending in the direction in which the first mixing hollow core group and the second mixing hollow core group overlap each other, with the result that the loss of pressure is increased.

SUMMARY OF THE INVENTION

One or more embodiments of the present invention provides a mixing device, and a pump mixture, an agitation impeller, a reaction device or a catalyst unit using such a mixing device, which has a simple structure and is easy to be made, applicable to versatile use according to desired mixing degrees.

According to one or more embodiments of the present invention, there is provided a mixing unit including: a mixing body having a flow through-path; and first and second surfaces which are arranged opposite each other across the mixing body, wherein the second surface is provided with an opening portion communicating with the flow through-path of the mixing body and the flow through-path is provided with an opening portion communicating with a peripheral surface outside the mixing unit.

According to one or more embodiments of the present invention, there is provided a mixing unit including a stacked member having a plurality of mixing elements which are stacked; and a first plate and a second plate between which the stacked member is sandwiched and which are arranged opposite each other, wherein each of the mixing elements has a plurality of first through holes, the second plate has an opening portion communicating with the first through holes in the stacked member, and wherein the mixing elements are arranged such that the first through holes in one of mixing elements communicates with the first through holes in its adjacent one of mixing elements to allow fluid to be passed in a direction in which the mixing element extends to provide a flow path that divides the fluid in a direction in which mixing elements are stacked.

"The direction in which the mixing element extends" means "the direction in which the mixing element extends toward a circumferential face of the mixing element", hereinafter.

According to one or more embodiments of the present invention, there is provided a mixing unit including a stacked member having a plurality of mixing elements which are stacked, and a first plate and a second plate between which the stacked member is sandwiched and which are arranged opposite each other, wherein each of the mixing elements has a plurality of first through holes, the first plate has a surface in contact with the stacked member for blocking a fluid flow from the stacked member, the second plate has an opening portion communicating with at least one of the first through holes in the stacked member, and each of the mixing elements has a partition wall to constitute the first through holes provided by the partition wall, wherein mixing elements are arranged such that, a part of the partition wall of one of mixing elements extending in a direction crossing a direction in which the mixing element extends is differently positioned between adjacent one of mixing elements to provide a flow path for passing fluid within one of the first through holes to one of the first through holes in adjacent one of mixing elements in the direction in which the mixing element extends and for dividing, the fluid in a direction in which mixing elements are stacked is provided, and wherein the opening portion of the second plate is an inlet or outlet of fluid and an outer circumferential side of the stacked member is an outlet or inlet of the fluid.

According to one or more embodiments of the present invention, there is provided a mixing unit including: a stacked member in which a plurality of mixing elements are stacked; and a first plate and a second plate between which the stacked member is sandwiched and which are arranged opposite each other, wherein each of the mixing elements has a plurality of first through holes which are unevenly arranged, the second plate has an opening portion communicating with the first through holes in the stacked member, wherein mixing elements are arranged such that the at least one first through holes in one of mixing elements communicates with the first through holes in its adjacent one of mixing elements to allow fluid to be passed in a direction in which the mixing element extends, and the at least one first through hole in the one mixing element overlap the at least one first through hole in the adjacent one of the mixing element whereby the fluid is unevenly divided in the direction in which the mixing element extends.

According to one or more embodiments of the present invention, there is provided a mixing unit including: a stacked member having a plurality of mixing elements which are stacked; and a first plate and a second plate between which the stacked member is sandwiched and which are arranged opposite each other, wherein each of the mixing elements has a plurality of first through holes, the first through holes in each of mixing elements are non-linearly arranged in a direction in which the mixing element extends, the second plate has an opening portion communicating with the first through holes in the stacked member, and wherein mixing elements are arranged such that the first through holes in one of mixing elements communicate with the first through holes in adjacent one of mixing elements to allow fluid to be passed in a direction in which the mixing element extends.

According to one or more embodiments of the present invention, there is provided a mixing device including: the mixing unit described above; and a casing that accommodates the mixing unit and that has an inlet and an outlet, where the first plate of the mixing unit has an outer shape smaller than an inner shape of the casing, and the second plate of the mixing unit has an outer shape substantially equal to the inner shape of the casing and an outer side surface of the second plate is substantially in contact with an inner side surface of the casing.

According to one or more embodiments of the present invention, there is provided a pump mixer including the above-described mixing unit a rotational axis to support the mixing unit to be driven to rotate, and a casing having a suction port disposed in an end surface of the casing and a discharge port for housing the mixing unit therein, wherein the mixing unit is driven to rotate such that the fluid sucked through the suction port is passed into the mixing unit, and further passed out through an outer circumferential portion of the mixing unit and discharged through the discharge port.

According to one or more embodiments of the present invention, there is also provided an agitation impeller having the above-described mixing unit supported by a rotation shaft that is driven to rotate.

According one or more embodiments of the present invention, there is provided a reaction device that makes a fluid react within a vessel having an inlet and an outlet, the reaction device within the vessel including, the mixing unit described above, where the first plate of the mixing unit has an outer shape smaller than an inner shape of the vessel and the second plate of the mixing unit has substantially the substantially same outer shape as the inner shape of the vessel and an outer side surface of the second plate is substantially in contact with an inner side surface of the vessel.

According one or more embodiments of the present invention, there is provided a catalyst unit including: the above-described mixing unit, where the mixing elements of the mixing unit have a catalytic ability, whereby the mixing elements that mix the fluid passing within the catalyst unit and have a catalytic ability promote a reaction.

According to one or more embodiments of the present invention, there is provided a fluid mixing method including the steps of passing fluid, between a plurality of stacked mixing elements each of which has an extending surface, along the extending surface of the mixing element, dividing the fluid in a stacking direction in which mixing elements are stacked and combining the divided fluid, diving the fluid in an extending direction along the extending surface of the mixing element and combining the divided fluid, and discharging the fluid combined in the stacking and extending directions.

The "extending surface" described above refers to a surface extending in a direction in which the mixing element extends. The "extending surface" in one or more embodiments of the present invention includes surfaces that are formed not only planarly but also three-dimensionally such as curvedly and conically.

According to one or more embodiments of the present invention, there is provided a fluid that is mixed by the fluid mixing method described above.

According to one or more embodiments of the present invention, the mixing unit according to one or more embodiments of the present invention may be formed by a 3-D printer.

According to one or more embodiments of the present invention, a program for manufacturing the mixing unit according to one or more embodiments of the present invention may be stored on a non-transitory computer-readable medium.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Returning to FIG. 1 there is shown an exploded perspective view of a mixing unit 1*a* in accordance with a first embodiment of the present invention. Mixing unit 1*a* includes a stacked member 2 having a plurality of mixing elements 21 (21*a* and 21*b*; here exemplary, three mixing elements) which are alternately stacked, a first plate 3, and a second plate 4. FIG. 2 is a plan view showing two types of mixing elements 21*a* and 21*b* (exemplary, a pair of mixing elements) of mixing unit 1*a* and a state of mixing elements 21*a* and 21*b* stacked. FIG. 3A is a partial plan view of the mixing elements (exemplary, three mixing elements) and FIG. 3B is a cross-sectional view showing a state of flow of a fluid A within mixing unit 1*a*.

Figure 1:
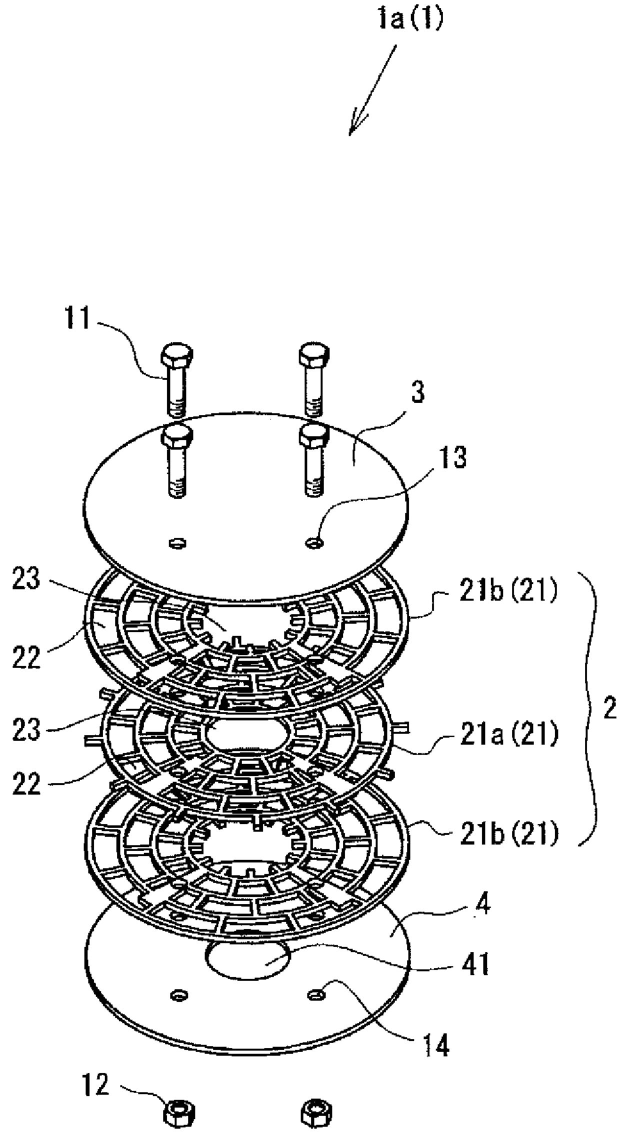
FIG. 1 is an exploded perspective view of a mixing unit in accordance with a first embodiment of the present invention.
Figure 2:
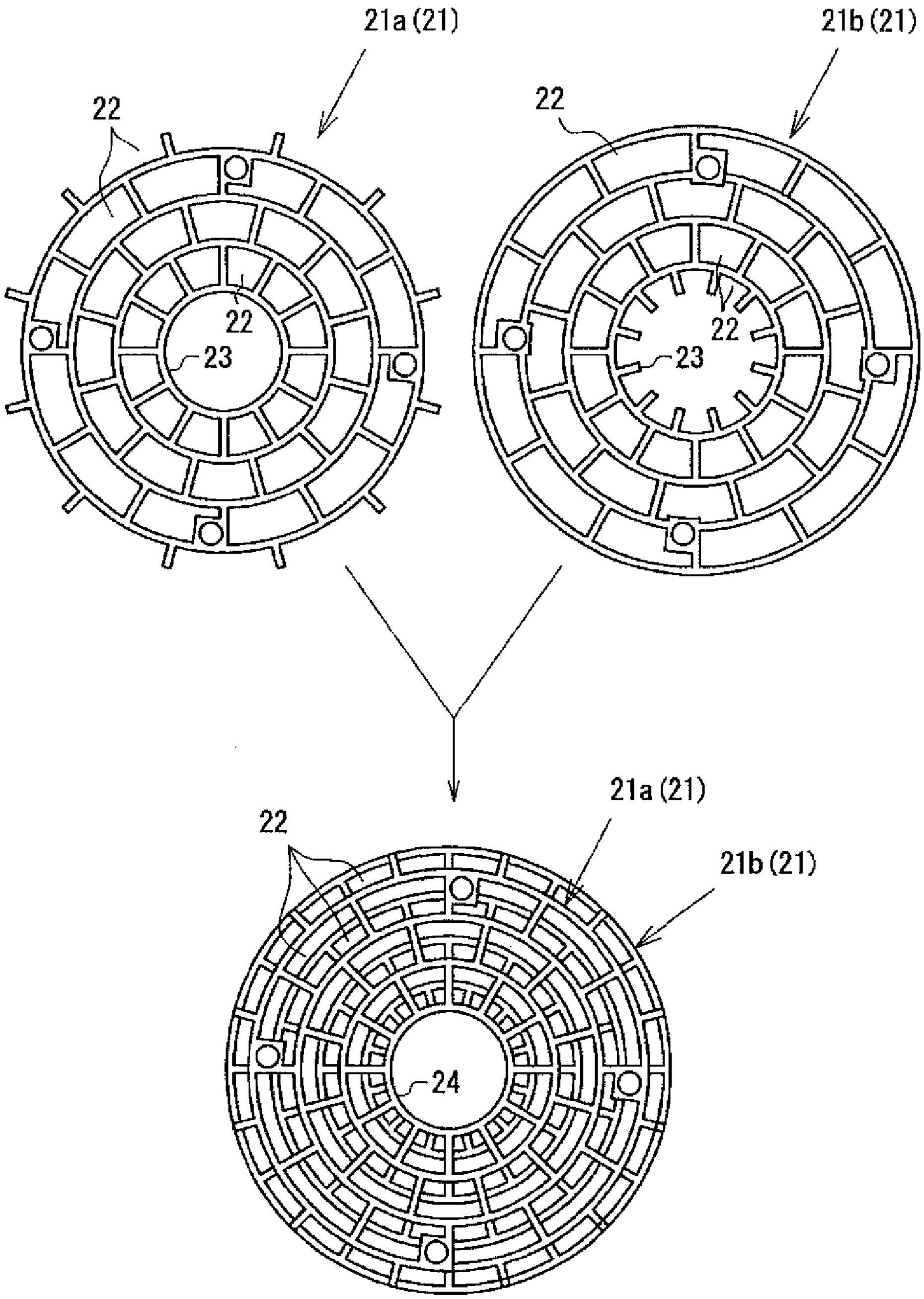
FIG. 2 is a plan view of mixing elements employed by the mixing unit of FIG. 1.
Figure 3A:
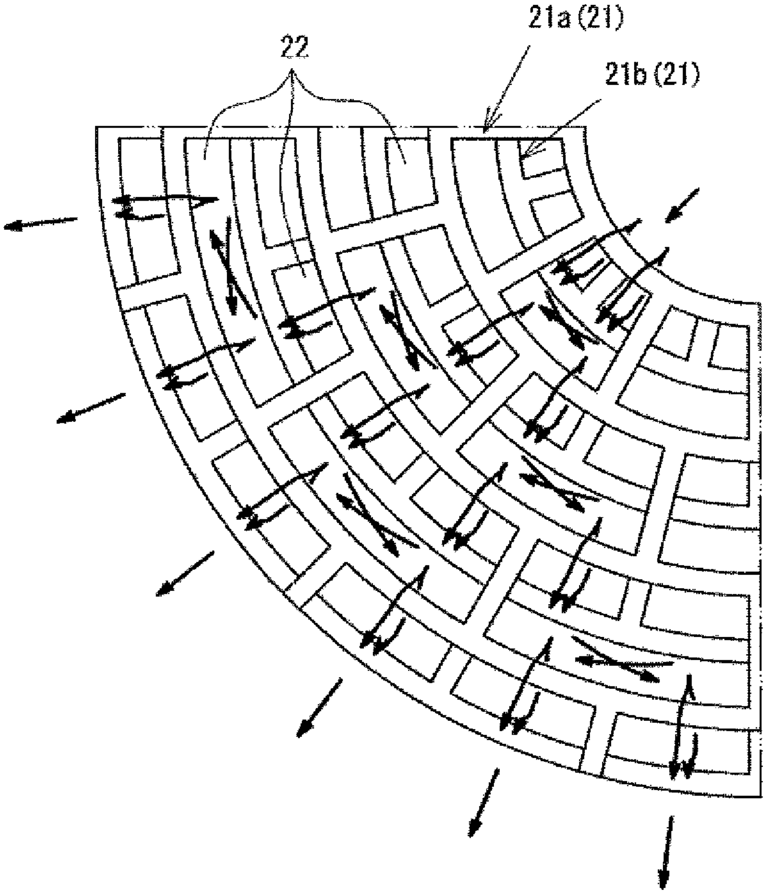
FIG. 3A is a partial plan view of the mixing elements and FIG. 3B is a cross-sectional view showing a state of flow of a fluid within the mixing unit of FIG. 1.
Figure 3B:
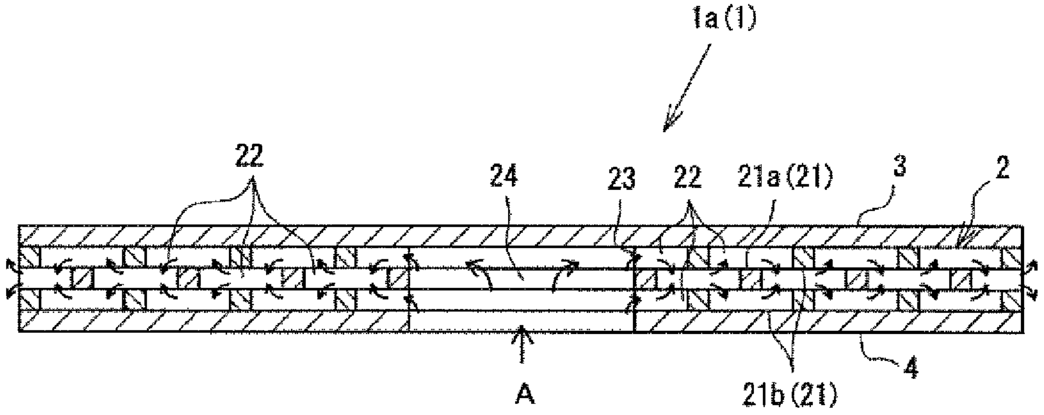

As shown in FIGS. 1 and 2, mixing unit 1*a* is configured by sandwiching a stacked member 2, in which a plurality of two types of disc-shaped mixing elements 21*a* and 21*b* are alternately stacked, between first plate 3 and second plate 4, for example, fixed with four bolts 11 and nuts 12 appropriately arranged. Although here, three mixing elements are stacked, according to one or more embodiments of the present invention, more than three mixing elements may be employed. Mixing elements 21*a* and 21*b* and first and second plates 3 and 4 can be separated from each other; thus, mixing unit 1*a* may be disassembled.

First plate 3 is a disc that has holes 13 for the bolts and no other holes. Second plate 4 has not only holes 14 for the bolts but also a circular opening portion 41, in a center portion, through which fluid A flows in and out as shown in FIG. 3B. First plate 3 and second plate 4 are substantially equal in outside diameter to mixing elements 21*a* and 21*b*. An outside shape of first plate 3 is larger than opening portion 41 of second plate 4.

The two types of mixing elements 21*a* and 21*b* each have a plurality of first through holes 22 penetrating in the direction of thickness thereof. In other words, a plurality of first through holes are provided along an extending surface that extends in a direction in which mixing elements 21*a* and 21*b* extend. Moreover, the two types of mixing elements 21*a* and 21*b* each has substantially circular second through holes 23 in the center portion. Second through hole 23 is substantially equal in inside diameter to and is substantially concentric with opening portion 41 of second plate 4. As mixing elements 21*a* and 21*b* are stacked, the second through holes 23 form a hollow portion 24.

Each of the first through holes 22 is substantially rectangular as seen in plan view, and is arranged concentrically with respect to the center of the second through hole 23. The first through holes 22 are staggered; the two types of mixing elements 21*a* and 21*b* differ from each other in the arrangement pattern of the first through holes 22 itself.

First through holes 22 of mixing elements 21*b* and 21*c* are partially displaced and overlapped in a radial direction and in a circumferential direction, and communicate with each other in the direction in which mixing elements 21*b* and 21*c* extend. In other words, among partition walls between first through holes 22, the partition walls that extend in a direction intersecting the direction in which mixing elements 21*a* and 21*b* extend are displaced between their adjacent mixing elements, and are arranged such that a fluid may be sequentially passed through first through holes 22 of the adjacent mixing elements 21*a* and 21*b* in the direction in which mixing elements 21*a* and 21*b* extend.

As shown in FIG. 2, on one hand, in mixing element 21*a*, first through holes 22 arranged along the inner circumferential surface are not open, and on the other hand, in mixing elements 21*b*, first through holes 22 in the inner circumferential surface are open. The size of and the pitch between first through holes 22 are increased as first through holes 22 extend outward in the radial direction. Furthermore, in the state where mixing elements 21*a* and 21*b* are stacked, the areas in which first through holes 22 overlap each other are equal to each other in the circumferential direction.

The stacked member 2 is formed by stacking the mixing elements 21*a* and 21*b* described above.

As shown in FIG. 3B, first through holes 22 of mixing elements 21*a* and 21*b* on both ends of stacked member 2 are closed, in the direction in which they are stacked, by the first plate 3 and the second plate 4 arranged opposite each other on both ends of the stacked member 2 in the stacking direction. In other words, first through holes 22 are blocked. Hence, fluid A within stacked member 2 is prevented from flowing from first through holes 22 of mixing elements 21*a* on both ends of stacked member 2 in the direction in which mixing elements 21*a* and 21*b* are stacked, and is, as shown in FIG. 3A, reliably passed within stacked member 2 in the direction in which mixing elements 21*a* and 21*b* extend. Thus, the direction in which mixing elements 21*a* and 21*b* are stacked is designed to cross the direction in which mixing elements 21*a* and 21*b* extend.

Therefore, fluid A is passed within mixing unit 1*a* from the inner circumferential portion to the outer circumferential portion or vise verse, that is, from the outer circumferential portion to the inner circumferential portion. As described above, a plurality of first through holes 22 are formed to communicate with each other such that fluid A may be passed between first through holes 22 in the direction in which mixing elements 21*a* and 21*b* extend.

In mixing unit 1*a* described above, for example, fluid A flows through the opening portion 41 of the second plate 4 into the hollow portion 24 with appropriate pressure, and then fluid A flows into stacked member 2 through first through holes 22 of mixing elements 21*a* and 21*b* which are open to the inner circumferential surface of the hollow portion 24. Then, fluid A is passed through other first through holes 22 that communicate with the above-mentioned first through holes 22, and is further passed through first through holes 22 that communicate with the above-mentioned other first through holes 22 whereby the division and combination of fluid A may be performed planarly. Finally, fluid A flows out of stacked member 2 through first through holes 22 of mixing elements 21*a* and 21*b* which are open to the outer circumferential surface of stacked member 2.

As described above, fluid A within stacked member 2 substantially radially flows through first through holes 22 communicating with each other within stacked member 2 from the inner circumferential portion to the outer circumferential portion.

A plurality of layers of flow paths along which fluid A flows are provided in the direction in which mixing elements 21*a* and 21*b* are stacked; in the example of FIG. 3B, two layers are provided. Since a plurality of flow paths that divide fluid A in the direction in which mixing elements 21*a* and 21*b* are stacked are provided, when fluid A passes through first through holes 22, as shown in FIG. 3B, fluid A is divided in the direction in which mixing elements 21*a* and 21*b* are stacked, and is thereafter combined. In other words, the flow of fluid A is performed not only two-dimensionally in the radial direction such that the division and combination are performed planarly but also three-dimensionally while extending in the direction in which mixing elements 21*a* and 21*b* are stacked.

While the flow described above is performed, fluid A is mixed by repeating dispersion, combination, reversal, turbulent flow, eddying flow, collision and the like.

Since first through holes 22 of mixing elements 21*a* and 21*b* are staggered, when the fluid flows from the above-mentioned first through holes 22 to other first through holes 22 on the upper and lower surfaces, the flow is easily divided or easily combined, and thus the fluid is efficiently mixed.

On the contrary to what has been described above, fluid A may be made to flow in through the outer circumferential portion of stacked member 2 of mixing elements 21*a* and 21*b* and flow out through the inner circumferential portion.

Hollow portion 24 is sufficiently larger in size than first through holes 22; second through holes 23 of mixing elements 21*a* and 21*b* constituting hollow portion 24 are substantially equal in inside diameter to each other, and are substantially concentric with each other. Hence, the flow resistance to fluid A flowing through hollow portion 24 is smaller than that of fluid A flowing within stacked member 2, and the loss of pressure is also smaller. Therefore, even when a large number of mixing elements 21*a* and 21*b* are stacked, fluid A substantially uniformly reaches the inner circumferential portion of mixing elements 21*a* and 21*b* regardless of the position in the direction in which mixing elements 21*a* and 21*b* are stacked, and substantially uniformly flows within stacked member 2 from the inner circumferential portion to the outer circumferential portion.

Since hollow portion 24 is provided, as compared with a case where there is no hollow portion 24, the fluid is more likely to enter mixing unit 1*a* and to be passed to first through holes 22. Likewise, the fluid entering mixing unit 1*a* through the outer circumferential side thereof and passing through first through holes 22 is made to smoothly flow out without being disturbed.

In first through holes 22 of mixing element 21*a* whose upper surface and lower surface are in contact with other mixing elements 21*b* respectively within mixing unit 1*a*, since fluid A flows out from the above-mentioned first through holes 22 to the above-mentioned other first through holes 22 on the upper and lower surfaces, fluid A is dispersed through the above-mentioned other first through holes 22 on the upper and lower surfaces. Moreover, since fluid A flows in from the above-mentioned other first through holes 22 on the upper and lower surfaces to the above-mentioned first through holes 22, fluid A from the above-mentioned other first through holes 22 on the upper and lower surfaces is combined. Therefore, significant mixing effects are acquired and fluid A is mixed.

In particular, when the flow rate is increased and thus the flow state is transferred to the turbulent flow, the effects of the turbulent flow and the eddying flow are increased, and thus the mixing effects of the fluid resulting from the dispersion and the combination described above are further increased. Even when the flow rate is low and thus the flow state is a laminar flow, the fluid is dispersed toward the upper and lower surfaces and is combined, with the result that the fluid is mixed.

Since first through holes 22 on both end surfaces in the stacking direction of stacked member 2 are blocked by the removable first plate 3 and second plate 4, it is possible to separately produce the individual members. For example, it is possible to produce a large number of mixing elements 21*a* and 21*b* for a short period of time by punching holes in a metal plate having a given thickness or the like. Hence, it is possible to easily and inexpensively produce mixing unit 1*a*.

Since mixing elements 21*a* and 21*b* and first plate 3 and second plate 4 may be divided into individual pieces, it is possible to easily perform a washing operation such as the removal of stuff and foreign matter left in first through holes 22 of mixing elements 21*a* and 21*b*. Since the first through holes are holes that penetrate in the direction of thickness, it is easy to clean first through holes 22 by the washing operation.

Since mixing elements 21*a* and 21*b* and first plate 3 and the second plate 4 have simple structures, it is possible to produce them with a material such as ceramic. Thus, it is possible to apply mixing unit 1*a* to applications in which corrosion resistance and heat resistance are required.

Moreover, when first plate 3 and second plate 4 are appropriately held, it is possible to freely apply mixing unit 1*a* to various portions. Thus, it is possible to apply mixing unit 1*a* to various devices, and it is therefore possible to widely utilize its high mixing capability.

Second Embodiment

Figure 4A:
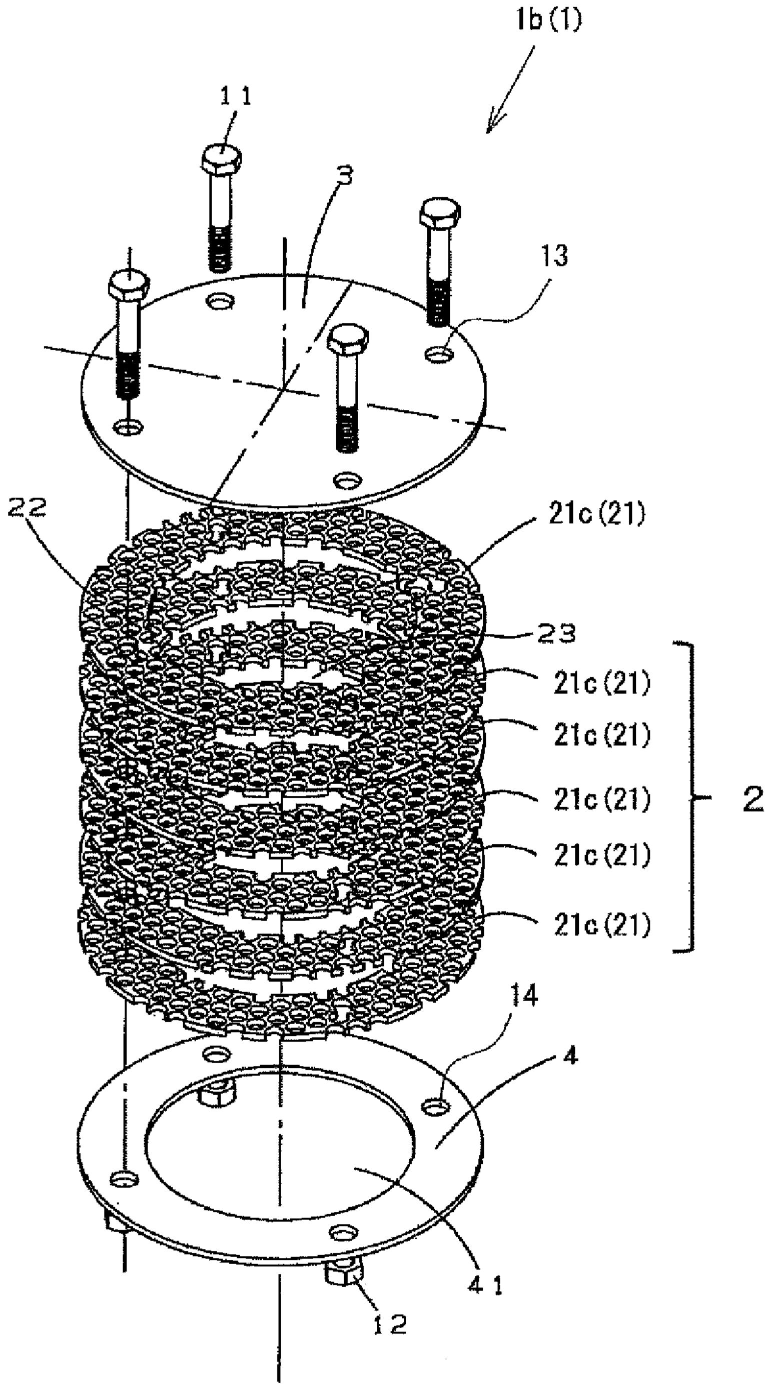
FIG. 4A is an exploded perspective view of a mixing unit in accordance with a second embodiment of the present invention.
Figure 4B:
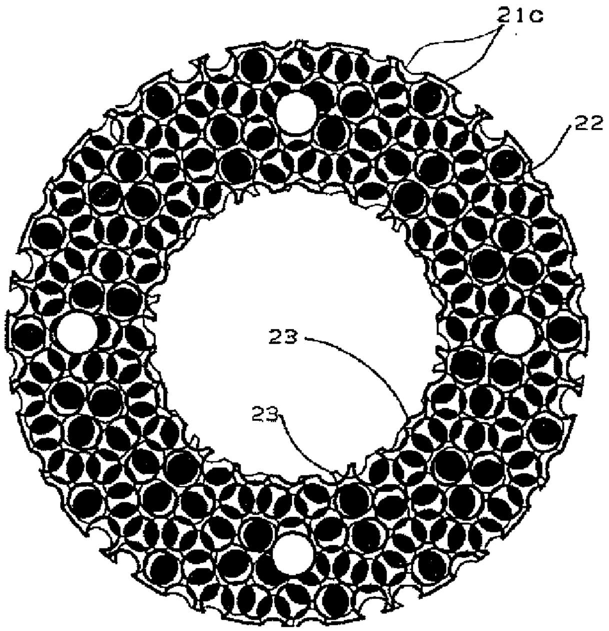
FIG. 4B is a plan view of mixing elements which are stacked to constitute the mixing unit of FIG. 4A.

FIG. 4A is an exploded perspective view of a mixing unit 1*b* including a plurality of mixing elements 21*c* which are designed to be stacked to constitute a stacked member 2 in which each mixing elements 21*e* has first through holes 22 and a second through hole 23 in its center portion in accordance with a second embodiment of the present invention. Mixing unit 1*b* further includes a first plate 3 and a second plate 4 having a circular opening portion 41 in a center portion between which stacked member 2 is sandwiched. FIG. 4B is a plan view of mixing elements 21*c* which are stacked to constitute mixing unit 1*b* of FIG. 4A and shows the overlapping of first through holes 22 in a stacked state of mixing elements 21*c* adjacent to the mixing element 21*c* in the direction in which mixing elements 21*c* are stacked. In FIG. 4B, in order for the overlapping of first through holes 22 to be clearly shown, the portions where first through holes 22 overlap each other are filled with black.

Mixing unit 1*b* of this second embodiment differs from mixing unit 1*a* of the first embodiment in that first through holes 22 are formed to be circular as seen in plan view and that the number of mixing elements 21*c* is changed from three to six. The inside diameter and the pitch of first through holes 22 are substantially equal to each other. As shown in FIG. 4B, parts of first through holes 22 are arranged such that they are displaced with respect to first through holes 22 of mixing elements 21*a* adjacent to each other and are partially overlapped, and spaces formed with first through holes 22 are made to communicate with each other in the direction in which mixing elements 21*a* extend.

Among first through holes 22, first through holes 22 on the inner circumferential edge are open to the inner circumferential surface of mixing elements 21*a*, and first through holes 22 on the outer circumferential edge are open to the outer circumferential surface of mixing elements 21*a*.

Even with the mixing unit 1*b* configured described above, fluid A made to flow into the mixing unit 1*b* with appropriate pressure flows into stacked member 2 through opening portion 41 of second plate 4 and first through holes 22 open to the inner circumferential surface of mixing elements 21*c*. Then, while fluid A is being passed radially within stacked member 2, fluid A is passed through first through holes 22 communicating with mixing elements 21*c*, with the result that fluid A is mixed.

In particular, since a larger number of mixing elements 21*c* are provided than three, a larger number of flow paths extending in the direction in which mixing elements 21*c* extend are provided than the two layers. Hence, a large number of flow paths that divide the fluid in the direction in which mixing elements 21*c* are stacked are obtained in the stacking direction, and the division and combination of fluid A is three-dimensionally performed in a wide area in the direction in which mixing elements 21*c* are stacked. Consequently, it is possible to obtain higher mixing effects. It is also possible to reduce the loss of pressure.

The other parts of the configuration of and the other effects of the mixing unit 1*b* of the second embodiment are the same as those of mixing unit 1*a* of the first embodiment.

Third Embodiment

Figure 5A:
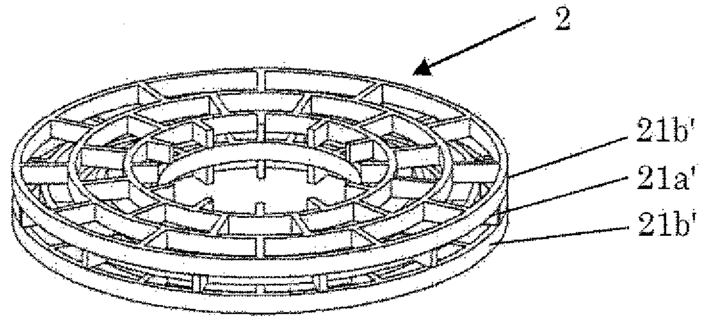
FIG. 5A is a perspective view of a mixing body in accordance with a third embodiment of the present invention.

FIG. 5A is a perspective view of a mixing body 2 in accordance with a third embodiment of the present invention, which may be employed in mixing unit 1*a* of FIG. 1 instead of stacked member 2. Mixing body 2 includes three layered portions 21*a*' and 21*b*' corresponding to mixing elements 21*a* and 21*b*, and has the same external configuration as that of stacked member 2 as shown in FIG. 3B to provide the same flow condition of fluid A in stacked member 2. Mixing body 2 is formed as a single member by 3D printing. Mixing body 2 with two layered portions with 21*a*' and 21*b*' is formed as a single member by die casting or 3D printing.

Figure 5B:
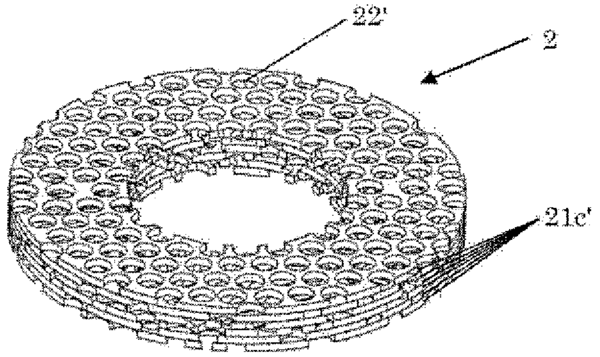
FIG. 5B a perspective view of a mixing body as one of modifications of the third embodiment.

FIG. 5B is a perspective view of a mixing body 2 which may be employed in mixing unit 1*b* of FIG. 4A instead of stacked member 2 as one of modifications of the third embodiment of the present invention. Mixing body 2 includes six layered portions each having different pattern of first through holes 22', which correspond to mixing elements 21*c* of FIG. 4A. First through holes 22' communicate in a direction crossing the extending direction with in random fashion, whereby fluid may be divided and combined in plural directions. Mixing body 2 is formed as a single member by 3D printing. If desired, first through holes 22' may be formed in a random fashion to provide a porous body.

Figure 5C:
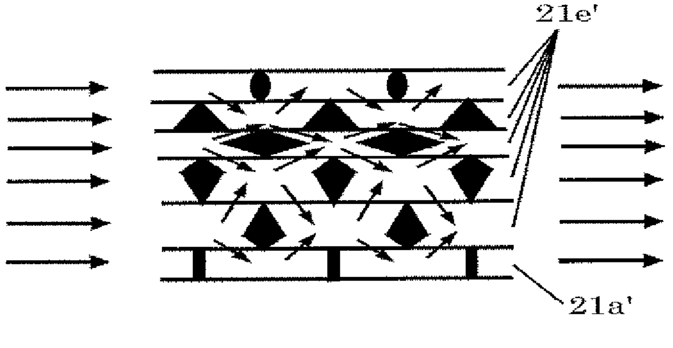
FIG. 5C is a partial schematic sectional view of a mixing unit as another modification of the third embodiment.

FIG. 5C is a partial schematic sectional view of a mixing unit employing opposing layers guiding fluid within a mixing body including a different pattern of layered portions 21*a*' (21*b*') and 21*e*' (21*f*') which correspond to mixing elements as shown in FIGS. 2, 16, 17 and 19 as another modification of the third embodiment. According to the mixing body of FIG. 5C, a fluid within the mixing body may be guided in favorite plural directions in which the fluid is divided and combined in accordance with the material of fluid. If desired, the mixing body may be formed by 3D printing.

In the third embodiment, the mixing body may provide division and combination of a fluid within the mixing body in three-dimensional plural directions. If desired, the mixing body of the third embodiment may be formed by die casting, 3D printing or other conventional way. Further, the mixing body may be formed by stacked elements as explained in other embodiments.

Fourth Embodiment

Figure 6A:
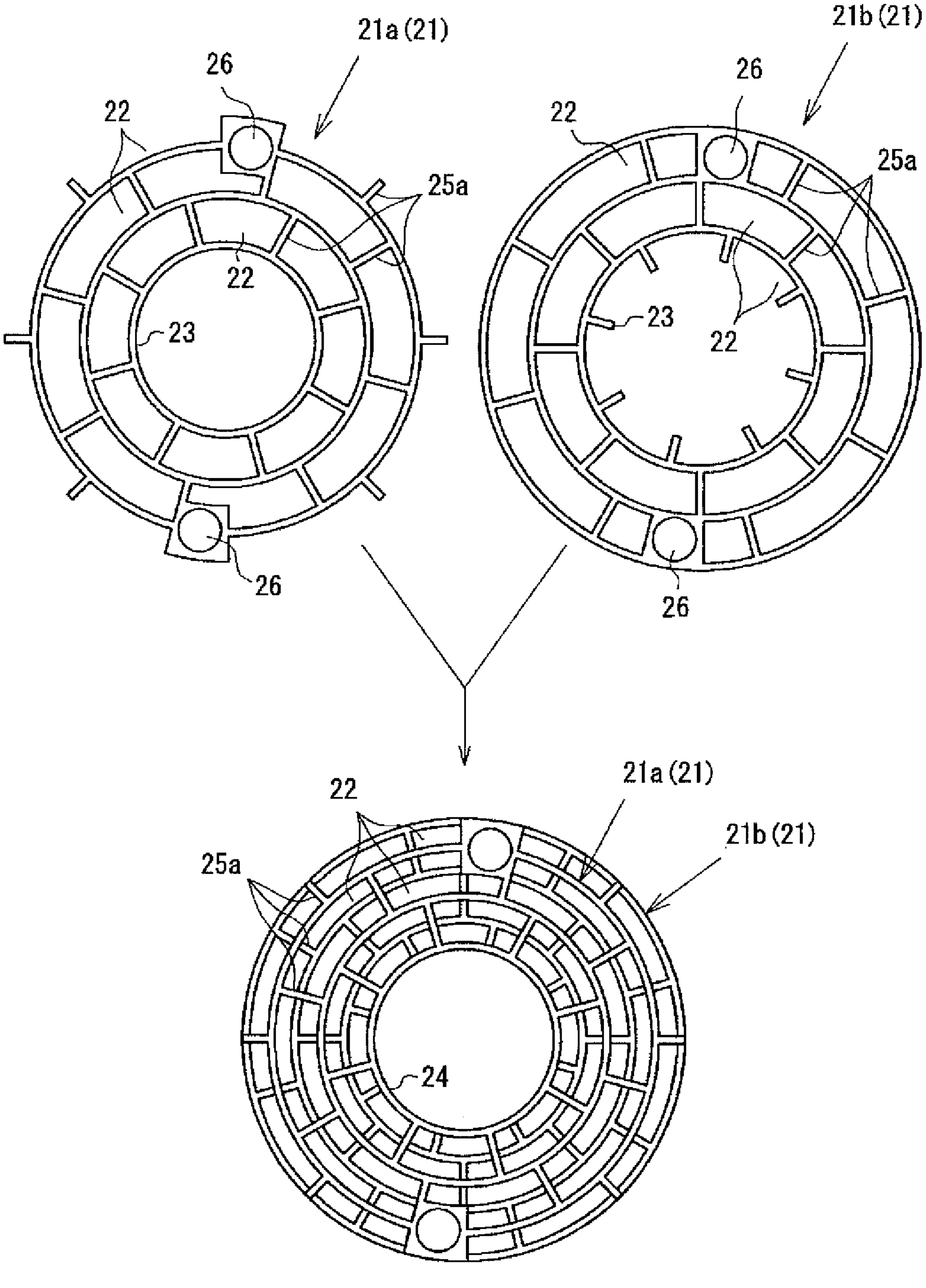
FIG. 6A is a plan view of mixing elements to constitute a mixing body in accordance with a fourth embodiment of the present invention.
Figure 6B:
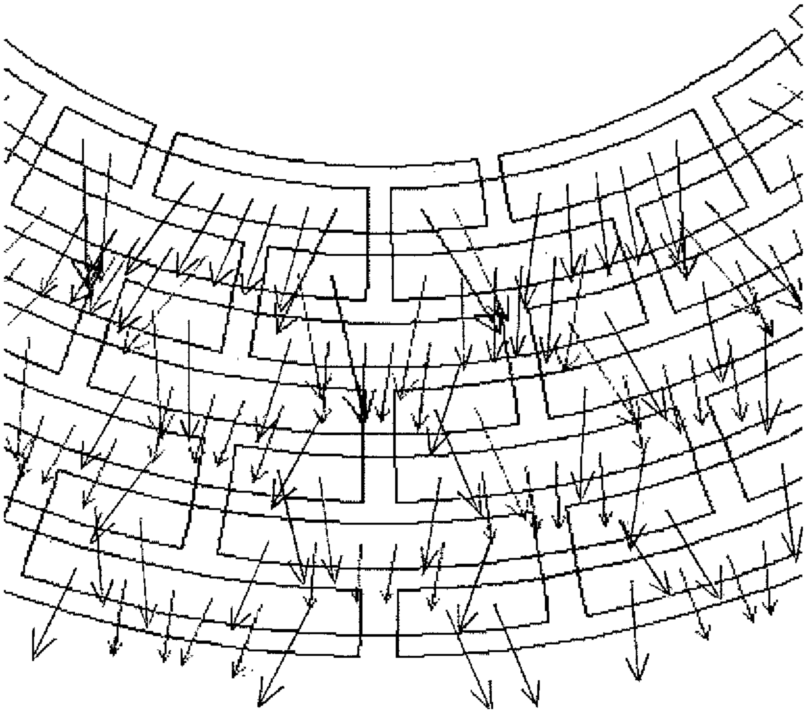
FIG. 6B is a partial plan view of the mixing elements stacked for showing a state of flow of the fluid within the mixing unit a computer analysis result.

FIG. 6A is a plan view of mixing elements 21*a* and 21*b* to constitute a mixing unit in a similar manner as shown in FIG. 1 or 2 in accordance with a fourth embodiment of the present invention, and FIG. 6B is a partial plan view of mixing elements 21*a* and 21*b* stacked for showing a state of flow of the fluid within the mixing unit by a computer analysis result. Mixing elements 21*a* and 21*b* of this fourth embodiment differ from mixing elements 21*a* and 21*b* of the first embodiment in that, in the state of the two types of mixing elements 21*a* and 21*b* stacked, the area of a certain portion where first through holes 22 overlap each other is not equal in the circumferential direction to the area of another portion adjacent to the above-mentioned portion. According to one or more embodiments of the present invention, mixing elements 21*a* and 21*b* have substantially same external or internal configurations, but may have different diameters. That is, according to one or more embodiments of the present invention, the diameter of mixing element 21*a* may be smaller than the diameter of mixing element 21*b*, or vice versa.

In order to realize the configuration described above, the two types of mixing elements 21*a* and 21*b* are configured such that, among the partition walls between first through holes 22, partition walls 25*a* extending in the radial direction are arranged at different angles with respect to an imaginary straight line passing through the center of mixing elements 21*a* and 21*b* and connecting bolt holes 26.

Even with the mixing unit including mixing elements 21*a* and 21*b* described above, the fluid is highly mixed as described above; in this case, in particular, the fluid passing through first through holes 22 is unevenly divided in the circumferential direction. Consequently, it is possible to further enhance the mixing efficiency.

FIG. 6B is a result obtained by analyzing, with a computer, a state of flow a fluid when the areas where first through holes 22 overlap each other are uneven in the circumferential direction (the structure in the fourth embodiment). As shown in FIG. 6B, it is found that the unevenness of the areas produces various types of flow of the fluid.

The other parts of the configuration of and the other effects of the mixing unit of this fourth embodiment are the same as those of mixing unit 1*a* of the first embodiment.

Fifth Embodiment

Figure 7:
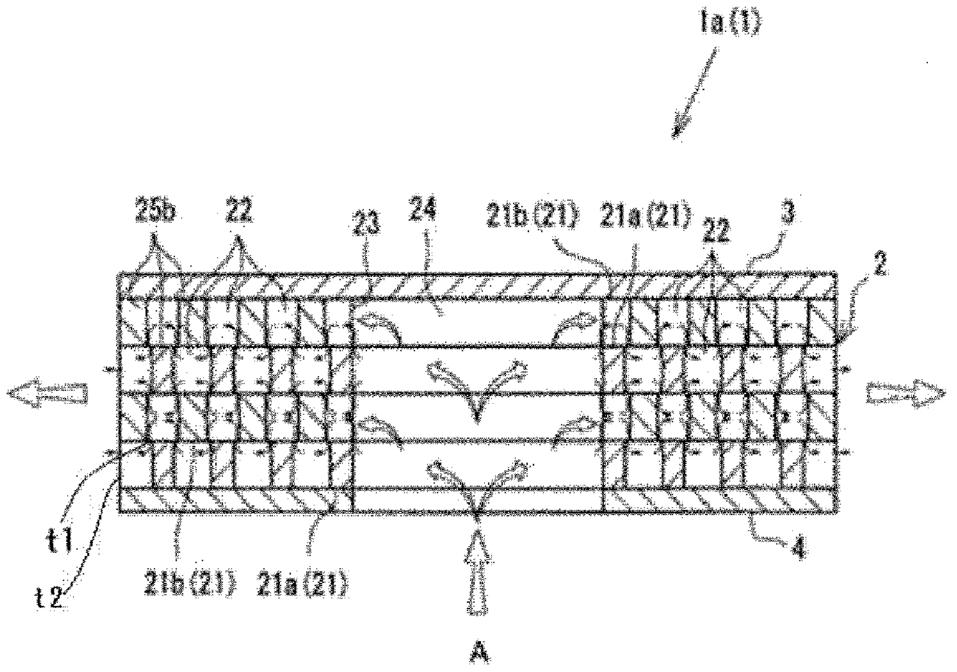
FIG. 7 is a side sectional side view of a mixing unit in accordance with a fifth embodiment of the present invention showing a state of flow of fluid within the mixing unit.

FIG. 7 is a side sectional side view of a mixing unit 1*a* including a first plate, a stacked member 2 having mixing elements 21*a* and 21*b* (here exemplary, four mixing elements), and a second plate 4 in accordance with a fifth embodiment of the present invention showing a state of flow of fluid A within mixing unit 1*a*. This mixing unit 1*a* differs from mixing unit 1*a* of the first embodiment in that, as shown in FIG. 7, a width t1 of a flow path, in the direction in which mixing elements 21*a* and 21*b* extend, that is formed in the portion where first through holes 22 overlap each other by the stacking of mixing elements 21*a* and 21*b* is narrower than a thickness t2 of a partition wall 25*b*, in the stacking direction, that is connected to the upstream side of the above-mentioned flow path and that is between the above-mentioned first through holes 22. In the example of FIG. 7, in particular, the width of the flow path is narrower than half of the thickness of partition wall 25*b*, and more specifically, is narrower than one-fourth thereof.

In mixing unit 1*a* configured as described above, when fluid A flows in the direction in which mixing elements 21*a* and 21*b* extend, fluid A likewise flows separately in the direction in which mixing elements 21*a* and 21*b* are stacked and in the direction along the extending surface extending in the direction of the extension. However, since a flow path along which fluid A flows from first through hole 22 of one mixing element 21*a* to first through hole 22 of mixing element 21*b* adjacent to the above-mentioned mixing element 21*a* is narrow, it is possible to provide a shearing force to the fluid, with the result that it is possible to enhance the degree of mixing of the fluid.

In the case where the width of the flow path is made narrower than one-fourth of the thickness of partition wall 25*b*, when the fluid flows through the flow path from one first through hole 22 into other two first through holes 22, each flow rate is increased to be twice or more as high as before, with the result that it is possible to further increase the effect of enhancing the degree of mixing of the fluid.

The other parts of the configuration of and the other effects of mixing unit 1*a* of this fifth embodiment are the same as those of mixing unit 1*a* of the first embodiment.

Sixth Embodiment

Figure 8A:
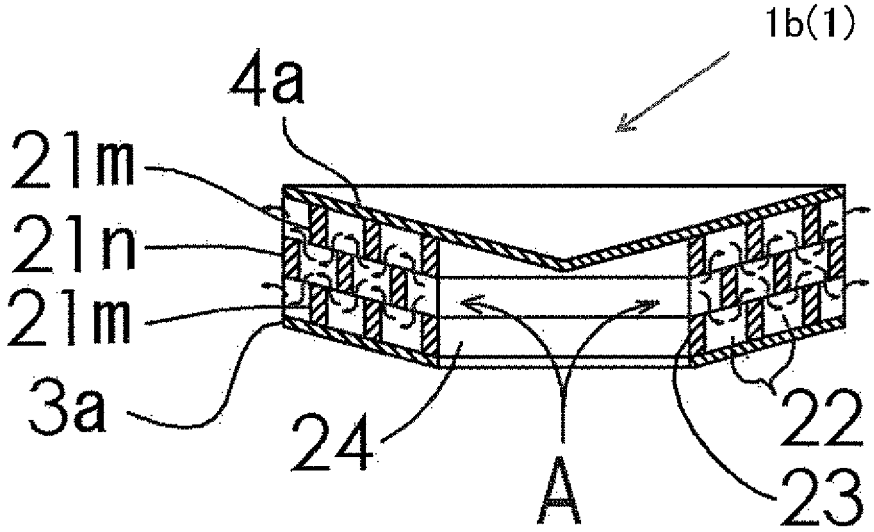
FIG. 8A is a side sectional side view of a mixing unit in accordance with a sixth embodiment of the present invention showing a state of flow of fluid within the mixing unit.

FIG. 8A is a side sectional side view of a mixing unit 1*b* in accordance with a sixth embodiment of the present invention showing a state of flow of a fluid A within mixing unit 1*b*. Mixing unit 1*b* includes a plurality of mixing elements 21*m* and 21*n* (here exemplary, three mixing elements) which are alternately stacked, a first plate 4*a*, and a second plate 3*a* having an opening portion 24. Mixing elements 21*m* and 21*n* have first through holes 22 and 23 and second through holes 24 in their center portions, in two types respectively, to provide flow paths for passing fluid A entering into second through holes 24 to outwards from an outer circumferential side of the mixing elements 21*m* and 21*n* as shown in FIG. 8A. Each of mixing elements 21*m* and 21*n* is configured to be a plate in a conical shape. The other parts of the configuration of and the other effects of the mixing unit of this sixth embodiment are the same as those of mixing unit 1*a* of the first embodiment.

Figure 8B:
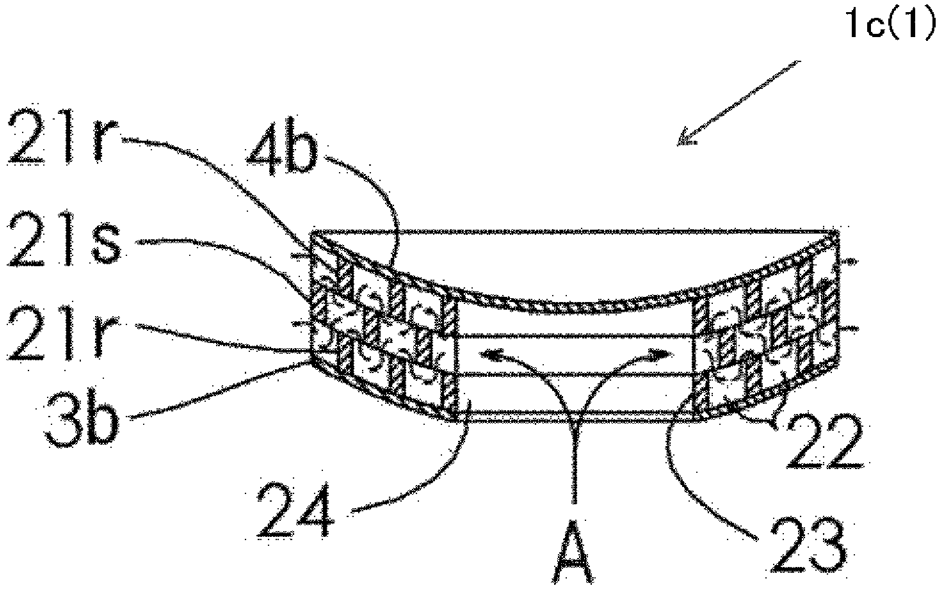
FIG. 8B is a sectional side view of a mixing unit modified from the mixing unit of FIG. 8A.

FIG. 8B is a sectional side view of a mixing unit 1*c* modified from mixing unit 1*b* of FIG. 8A, which includes a plurality of mixing elements 21*r* and 21*s* which are alternately stacked, a first plate 4*b*, and a second plate 3*b* having an opening portion 24. Mixing elements 21*r* and 21*s* have first through holes 22 and 23, and second through holes 24 in their center portions, in two types respectively, and are configured to be a plate in a partial ball shape. The other parts of the configuration of and the other effects of the mixing unit 1*c* of this sixth embodiment are the same as those of the mixing unit of the fifth or first embodiment.

Seventh Embodiment

Figure 9A:
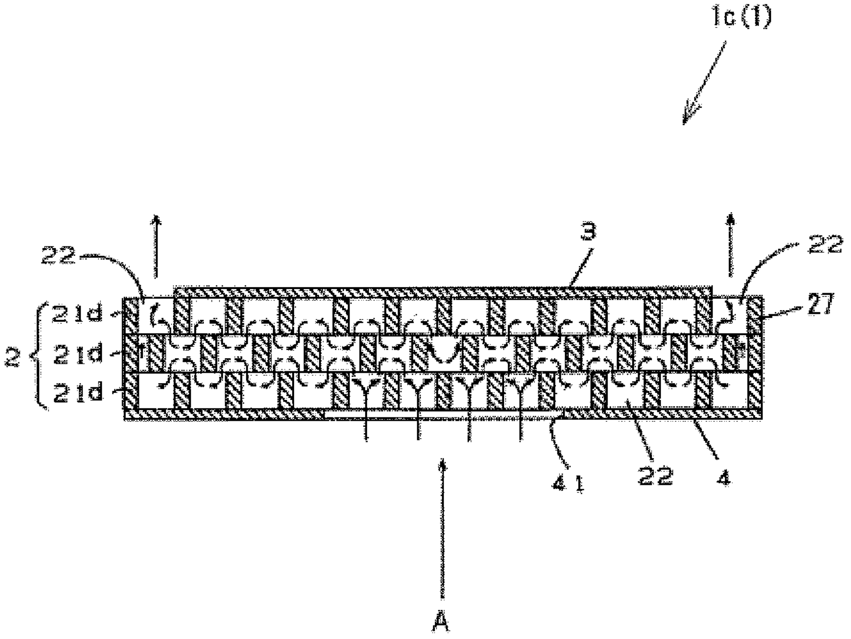
FIG. 9A is a sectional side view of a mixing unit in accordance with a seventh embodiment of the present invention showing a state of flow of fluid within the mixing unit.
Figure 9B:
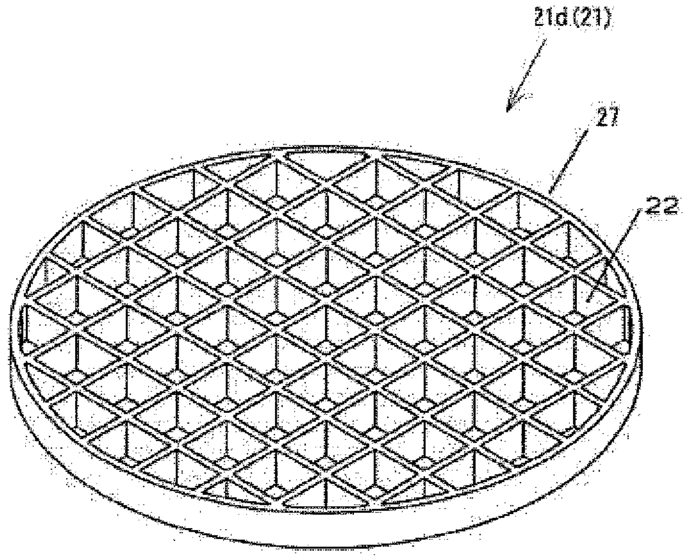
FIG. 9B is a perspective view of a mixing element employed in the mixing unit of FIG. 9A.
Figure 10A:
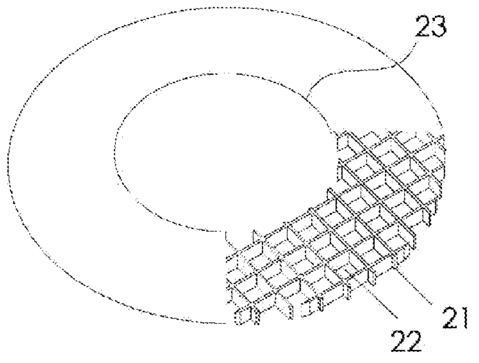
FIGS. 10A to 10D are perspective views of mixing elements as first modifications of the mixing element of FIG. 9B.
Figure 10B:
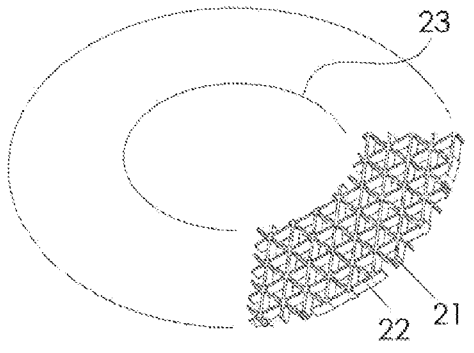
Figure 10C:
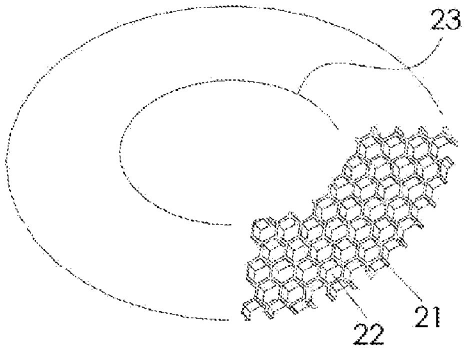
Figure 10D:
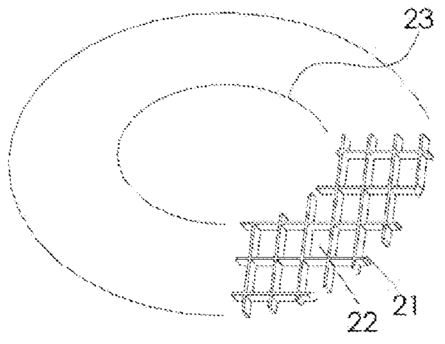

FIG. 9A is a cross-sectional view of a mixing unit 1*c* including a first plate 3, a stacked member 2 having a plurality of mixing elements 21*d* (here, three plates), and a second plate 4 in accordance with a seventh embodiment of the present invention showing how fluid A flows within mixing unit 1*c*, and FIG. 9B is a perspective view of mixing element 21*d*.

This mixing unit 1*c* differs from mixing unit 1*a* of the first embodiment in that, as shown in FIGS. 9A and 9B, a plurality of mixing elements 21*d* have first through holes 22 over the entire surface without the provision of the second through holes 23 in the center portion and a frame portion 27 (see FIG. 9B) that prevents first through holes 22 from being open to the outer circumferential portion. Each of first through holes 22 is formed in the shape of a quadrangle (see FIG. 9(*b*)). Furthermore, the diameter of first plate 3 in the outer circumferential shape is smaller than the diameter of mixing elements 21*d* (see FIG. 9A) such that first through holes 22 in the outer circumferential portion of mixing elements 21*d* stacked on first plate 3 are open.

Even with the mixing unit 1*c* configured as described above, fluid A made to flow into the mixing unit 1*c* with appropriate pressure flows into stacked member 2 through the opening portion 41 of the second plate 4. The fluid entering stacked member 2 is passed radially within stacked member 2 and is passed through first through holes 22 with which mixing elements 21*d* communicate. Here, since the flow is performed in the direction in which the mixing element 21*d* extends, and fluid A is repeatedly divided and combined while extending in the direction in which mixing elements 21*d* are stacked, fluid A is mixed. Finally, fluid A flows out through first through holes 22 that are open to the outer circumferential portion of first plate 3 arranged on one end of stacked member 2.

As described above, since, in mixing unit 1*c* of this seventh embodiment, first through holes 22 are formed over the entire surface of the mixing element 21*d*, it is unnecessary to provide the second through hole 23 in the center portion, with the result that it is easy to produce the mixing unit 1*c*.

The other parts of the configuration of and the other effects of the mixing unit 1*e* of this seventh embodiment are the same as those of mixing unit 1*a* of the first embodiment.

Mixing unit 1 of the present invention is not limited to those described in the first to seventh embodiments; many variations are possible.

(First Variation of Mixing Unit)

For example, first through holes 22 of mixing element 21 is not limited to be circular nor rectangular. As shown in FIGS. 10A to 10D, first through holes 22 of mixing element 21 as shown in FIGS. 1 and 2 may be formed in the shape of a polygon such as a square, a triangle, a hexagon or a rectangle. By forming first through holes 22 in the shape of a rectangle or a polygon to increase the aperture ratio of mixing element 21, it is possible to reduce the flow resistance of mixing unit 1 although the pitches between first through holes 22 of mixing elements 21*a* are substantially equal to each other, the present invention is not limited to this configuration. As shown in mixing elements 21*a* and 21*b* of FIG. 2, the size of and the pitch between first through holes 22 may be increased as the mixing element extends from the inner circumferential portion to the outer circumferential portion.

Although the outer circumferential shape of mixing elements 21 is substantially circular and the outer circumferential shape of first plate 3 and the second plate 4 is circular as shown in FIGS. 1 and 2, the present invention is not limited to this configuration. Any other shape that achieves the equivalent function may be employed. Although the second through holes 23 of mixing elements 21 are substantially circular and opening portion 41 of second plate 4 is circular as shown in FIG. 1, the present invention is not limited to this configuration. Any other shape that achieves the similar function may be employed. Although mixing elements 21 have the second through holes 23 in the center portion, second plate 4 has the opening portion 41 in the center portion and second through hole 23 and opening portion 41 are substantially equal in diameter to each other and are substantially concentric with each other, the present invention is not limited to this configuration, and any other shape that achieves the similar function may be employed.

Mixing unit 1 may be formed as follows. Mixing elements 21 having a plurality of first through holes 22 arranged in the same positions and having the same shape are used; first through holes 22 are displaced such that first through holes 22 overlap each other in the radial direction and the circumferential direction.

Two types of mixing elements having different inside and outside diameters are used, and thus first through holes 22 in the inner circumferential portion and the outer portion may be open.

(Second Variation of the Mixing Unit)

Figure 11A:
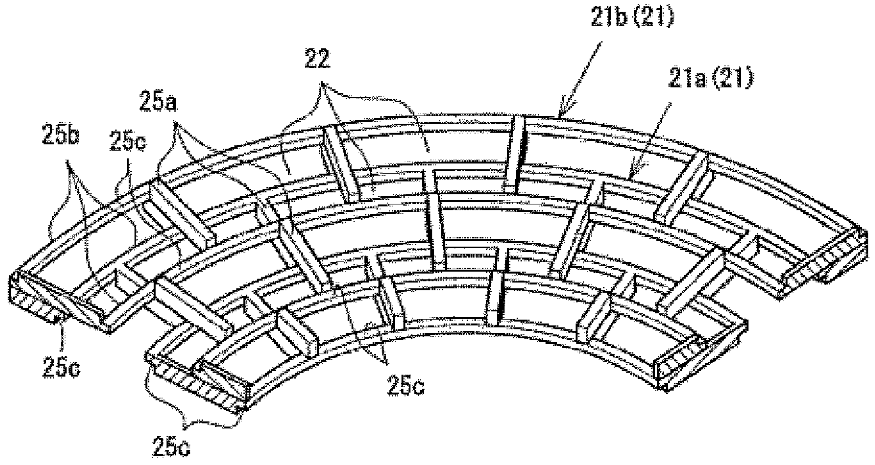
FIG. 11A is a perspective view of a main portion of a pair of mixing elements as a second modification of the mixing element of FIG. 9B.
Figure 11B:
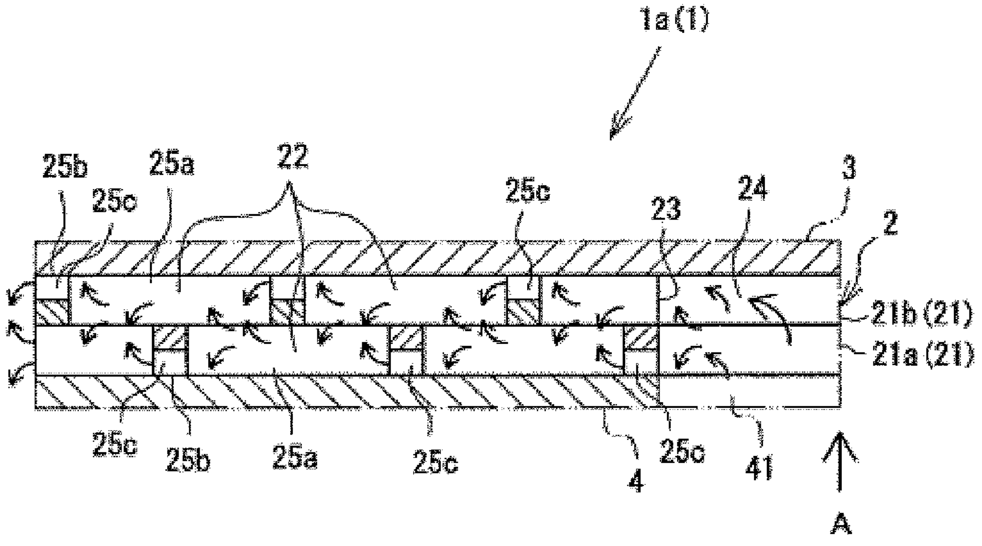
FIG. 11B is a cross-sectional view of a mixing unit employing the mixing elements of FIG. 11A showing a state of flow of fluid within the mixing unit.

FIG. 11A is a perspective view of a main portion in a state where one mixing element 21*a* and one mixing element 21*b* of the two types of mixing elements 21*a* and 21*b* are stacked, and FIG. 11B is a cross-sectional view showing the state of fluid A flowing within mixing elements 21*a* and 21*b*.

Even when only two mixing elements 21 and 21*b* are stacked, in these mixing elements 21*a* and 21*b*, two or more layers of the flow paths aligned in the stacking direction are provided.

Specifically, among the partition walls between first through holes 22 of mixing elements 21*a* and 21*b*, in the partition walls 25*b* extending in the direction intersecting the direction in which mixing elements 21*a* and 21*b* extend, cut portions 25*c* whose height is lower than that of the partition walls 25*a* extending in the radial direction of mixing elements 21*a* and 21*b* are formed. When the two mixing elements are stacked, mixing elements 21*a* and 21*b* are stacked with the sides where the cut portions 25*c* are not present in mixing elements 21*a* and 21*b* arranged to face the contact surface.

The shape of first through holes 22 of mixing elements 21*a* and 21*b*, that is, the shape of the partition walls, is the same as in the first embodiment of the mixing unit shown in FIGS. 1, 2 and 3. Among first through holes 22 of mixing elements 21*b* shown on the upper side of the figure, first through holes 22 on the inner circumferential edge are open to the inner circumference; among first through holes 22 of mixing elements 21*a* shown on the lower side of the figure, first through holes 22 on the outer circumferential edge are open to the outer circumference. Hence, partition walls 25*b* extending in the circumferential direction, which is the direction intersecting the direction in which mixing elements 21*a* and 21*b* extend, are displaced between stacked mixing elements 21*a* and 21*b* in the circumferential direction.

That is, in partition walls 25*b* extending in the circumferential direction, the position in the circumferential direction differs from the position in the stacking direction. In other words, each of the two types of mixing elements 21*a* and 21*b* stacked has a flow path that divides the fluid in the direction in which mixing elements 21*a* are stacked. Hence, unlike the case where one flow path that divides the fluid in the direction in which mixing elements 21*a* are stacked is present as shown in FIG. 10(*b*), two flow paths may be formed as shown in FIG. 11B.

In the configuration described above, even when a small number of mixing elements 21*a* and 21*b* stacked are provided, it is possible to provide a multilayer structure where two or more layers of the flow paths along which fluid A flows, with the result that it is possible to obtain a high mixing capability.

Although, in FIGS. 11A and 11B, the example where cut portions 25*c* are formed over partition walls 25*b* extending in the direction intersecting the direction in which mixing elements 21*a* and 21*b* extend has been shown, cut portions 25*c* may be formed partially or intermittently. Mixing elements 21*a* and 21*b* may be stacked such that partition walls 25*b* extending in the direction intersecting the direction in which mixing elements 21*a* and 21*b* where cut portions 25*c* of stacked mixing elements 21*a* and 21*b* are formed extend are in contact with each other. Even in this case, it is possible to form at least one flow path that divides the fluid in the direction in which mixing elements 21*a* and 21*b* are stacked. Furthermore, three or more layers of mixing elements 21*a* and 21*b* as described above may be stacked.

(Third Variation of the Mixing Unit)

Figure 12:
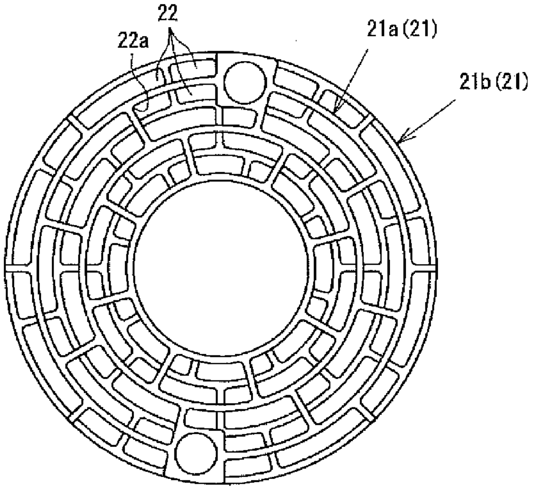
FIG. 12 is a plan view of mixing elements which are stacked as a third modification of the mixing element of FIG. 9B.

FIG. 12 is a plan view in a state where the two types of mixing elements 21*a* and 21*b* are stacked.

In these mixing elements 21*a* and 21*b*, in the corner portions of the substantially rectangular first through hole 22, rounded corner portions 22*a* are formed.

When rounded corner portions 22*a* are provided as described above, the fluid is unlikely to be left in the corner portions. Consequently, the leaving of the fluid in the mixing element is reduced, and thus it is possible to perform satisfactory mixing and washing.

(Fourth Variation of the Mixing Unit)

Mixing element 21, first plate 3, second plate 4 and the like may be divided into separate structures of various shapes. In this case, it is possible to easily produce even large mixing unit 1.

Figure 13A:
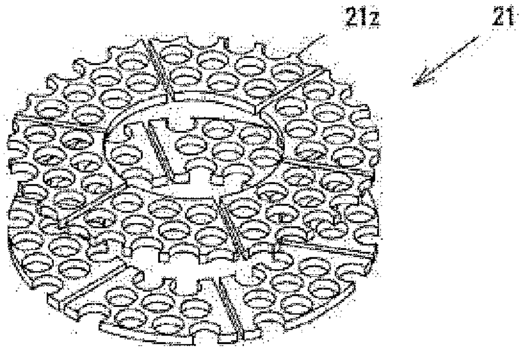
FIGS. 13A to 13C are plan views of mixing elements to be stacked as a fourth modification of the mixing element of FIG. 9B.
Figure 13B:
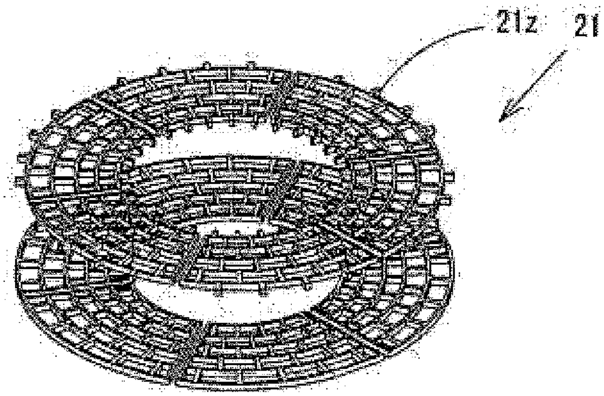
Figure 13C:
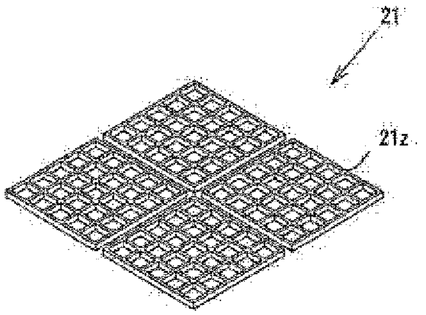

As shown in FIGS. 13A and 13B, as mixing element 21 has an annular shape, mixing element 21 may be divided into separate structures, each composed of a sector-shaped divided member 21*z*. When mixing element 21 is formed in the shape of a quadrangle as shown in FIG. 13C, mixing element 21 may be divided into separate structures, each composed of a rectangular divided member 21*z*.

(Fifth Variation of the Mixing Unit)

Figure 14:
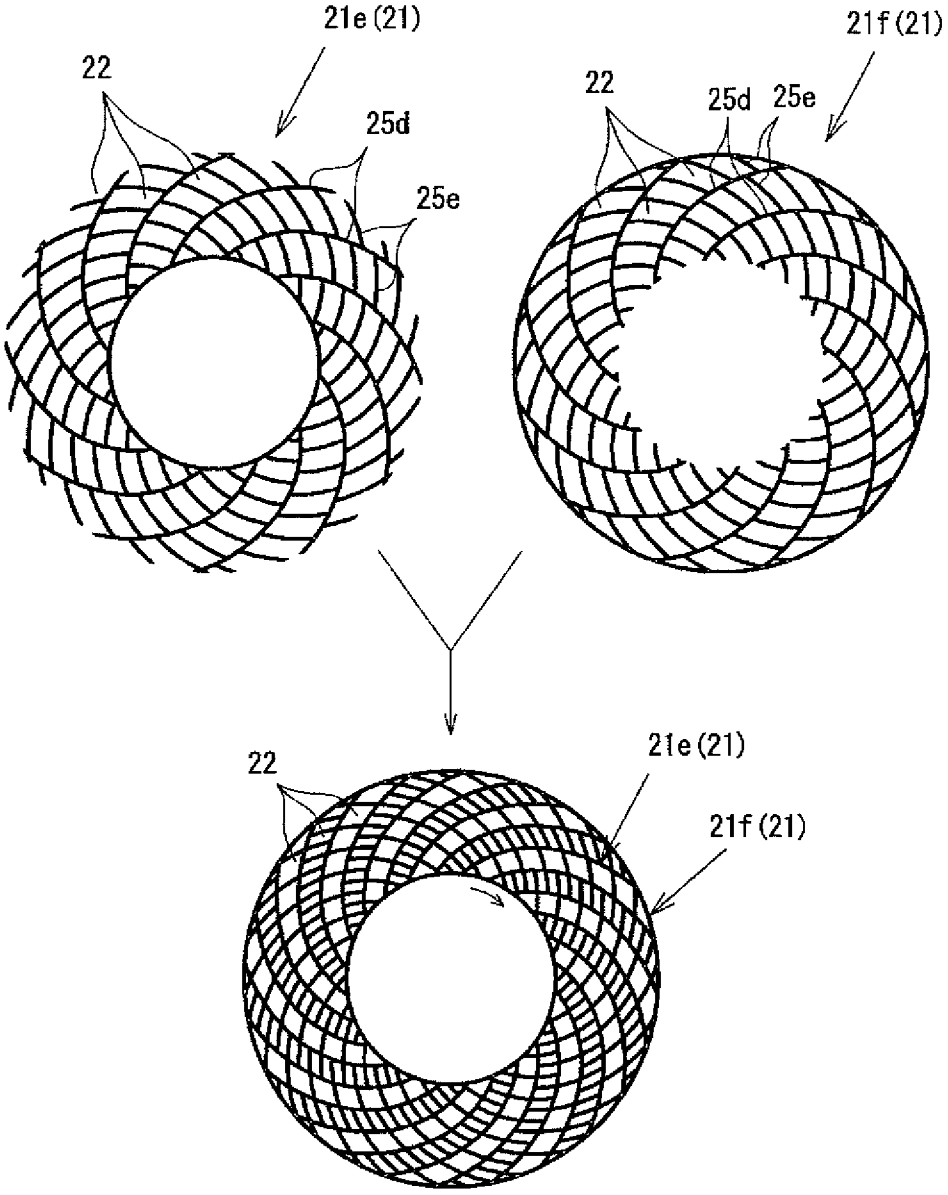
FIG. 14 shows plan views of a pair of mixing elements and their stacked mixing elements as a fifth modification of the mixing element of FIG. 9B.
Figure 15:
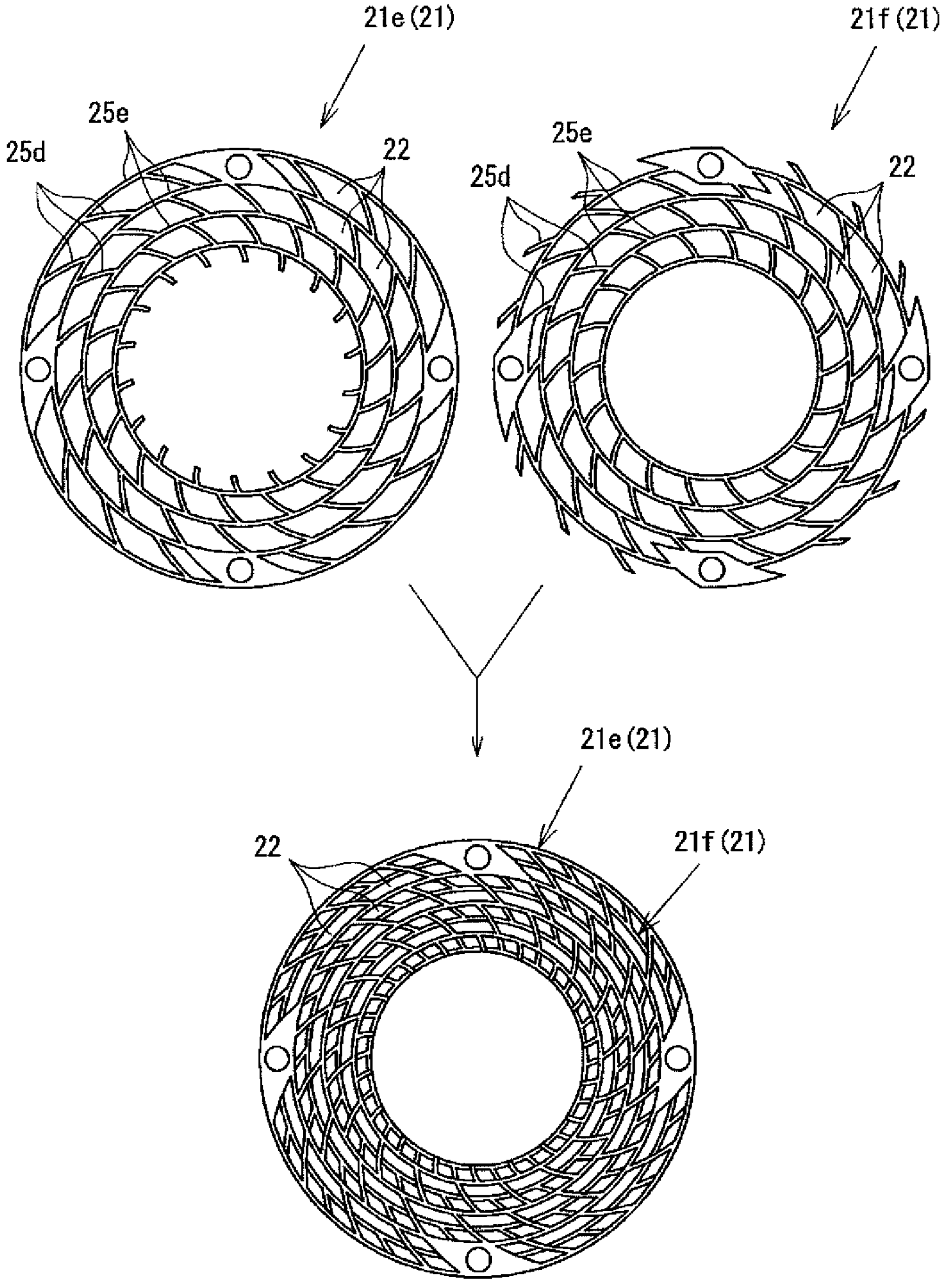
FIG. 15 shows plan views of a pair of mixing elements and their stacked mixing elements as a modification of the mixing element of FIG. 14.

As shown in FIGS. 14 and 15, first through holes 22 of mixing elements 21 may be non-linearly arranged in the direction in which mixing elements 21 extend.

FIG. 14 is a plan view showing the two types of mixing elements 21*e* and 21*f* and shows a state of mixing elements 21*e* and 21*f* stacked.

As shown in FIG. 14, first through holes 22 are non-linearly arranged from the center side of mixing elements 21*e* and 21*f* to the outer circumference. Specifically, among the partition walls between first through holes 22, partition walls 25*d* continuous from the center portion to the outer circumference extend in the form of a curve curving to one direction; more specifically, partition walls 25*d* extend substantially in the form of an involute curve. According to one or more embodiments of the present invention, "substantially in the form of an involute curve" means that an involute curve is included.

In addition to partition walls 25*d*, partition walls 25*e* that substantially perpendicularly interest partition walls 25*d* and that extend so as to connect partition walls 25*d* are provided.

The arrangements of partition walls 25*d* and 25*e* are made to differ between the two types of mixing elements 21*e* and 21*f*; among the partition walls, the positions of the partition walls extending in the direction intersecting the direction in which mixing elements 21*e* and 21*f* extend, that is, partition walls 25*d* and 25*e*, are displaced between the adjacent mixing elements 21*e* and 21*f*; the fluid is passed by being made to sequentially pass through first through holes 22 of the adjacent mixing elements 21*e* and 21*f* in the direction in which mixing elements 21*e* and 21*f* extend.

First through holes 22 are non-linearly arranged as described above, and thus it is possible to increase the path length of fluid. As compared with the case where first through holes 22 are linearly arranged. In other words, since the number of times the fluid passes through first through holes 22 may be increased, it is possible to satisfactorily mix the fluid.

Even when mixing elements 21*e* and 21*f* are small, it is possible to increase the path length and obtain high mixing effects, with the result that it is possible to reduce the size of the mixing unit.

As the non-linear configuration, a configuration where the curvature of a curve is increased toward the direction in which the mixing element extends or the like may be employed as necessary. In the direction in which mixing elements 21*e* and 21*f* extend, first through holes 22 may be spaced regularly along the same direction in the form of a substantially same curve or an involute curve; moreover, mixing elements 21*e* and 21*f* may be spaced irregularly.

FIG. 15 is a plan view showing the two types of mixing elements 21*e* and 21*f* and the state of mixing elements 21*e* and 21*f* stacked.

In mixing elements 21*e* and 21*f* shown in FIG. 15, among the partition walls between first through holes 22, partition walls 25*d* continuous from the center portion to the outer circumference extend substantially in the form of an involute curve curving to one direction, and partition walls 25*d* are coupled by partition walls 25*e* extending in the circumferential direction. Partition walls 25*e* extending in the circumferential direction are formed concentrically with respect to the center point of mixing elements.

In mixing elements 21*e* and 21*f* described above, it is possible to perform satisfactory mixing as described above; in particular, when the mixing unit is actively rotated to perform mixing, since a rotational force may be efficiently transmitted to the fluid, it is possible to enhance the mixing effects.

(Sixth Variation of the Mixing Unit)

The partition walls between first through holes 22 in the mixing element 21 described above may be formed in a shape other than a square as seen in cross section.

Figure 16A:
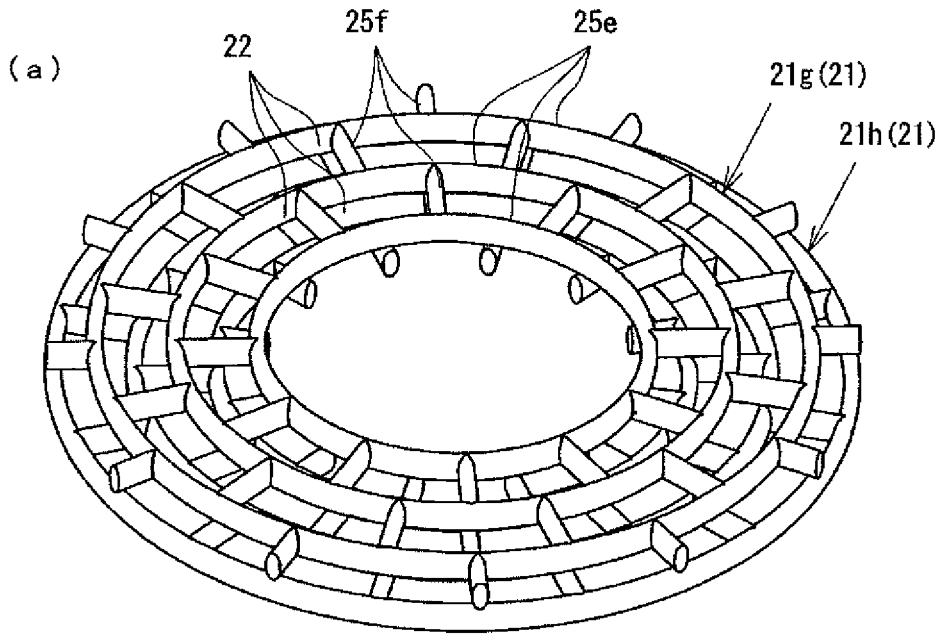
FIG. 16A is a perspective view of mixing elements which are stacked as a sixth modification of the mixing element of FIG. 9B.
Figure 16B:
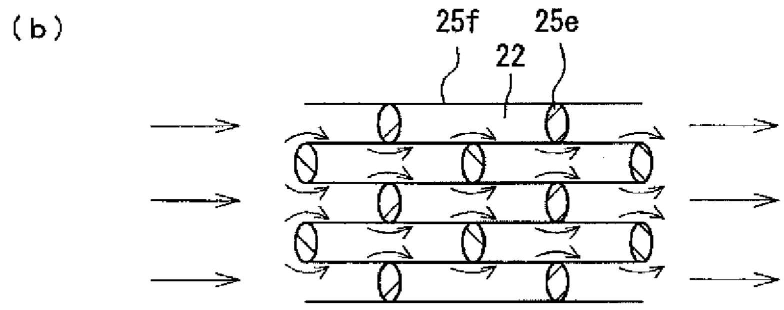
FIG. 16B is a partial cross-sectional schematic view of a mixing unit employing the mixing elements of FIG. 16A showing a state of flow of fluid within the mixing unit.

FIG. 16A is a perspective view in a state where two types of mixing elements 21*g* and 21*h* are stacked, and FIG. 16B is an illustrative diagram showing a state where the fluid flows within mixing elements 21*g* and 21*h*.

As shown in FIG. 16A, in mixing elements 21*g* and 21*h*, the cross-sectional shape of partition walls 25*f* extending in the radial direction and partition walls 25*e* extending in the circumferential direction is formed substantially in the shape of a vertically long ellipse. According to one or more embodiments of the present invention, "substantially in the shape of an ellipse" described above means that an ellipse is included.

The flow of the fluid within mixing elements 21*g* and 21*h* having partition walls 25*e* and 25*f* shaped as described above is the same as in, for example, the first embodiment of the mixing unit; as compared with partition walls whose end surfaces rise steeply, an impact at the time of collision with the fluid is reduced, and thus it is possible to make the fluid flow smoothly. This type of flow is suitable for a fermentation process that deals with yeast or the like.

The partition walls between first through holes 22 in mixing elements 21 may have a cross-sectional shape including a chamfered portion as seen in cross section.

Figure 17A:
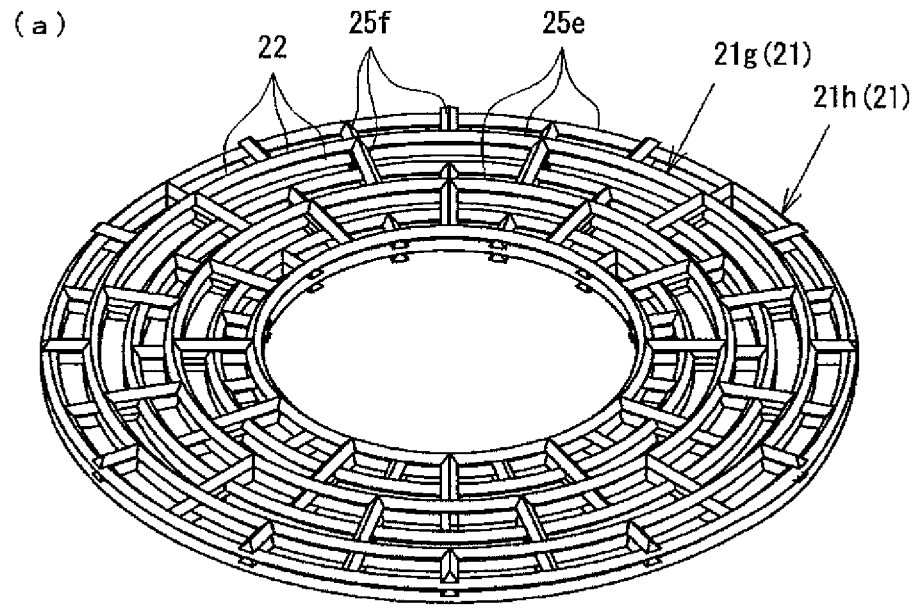
FIG. 17A is a perspective view of mixing elements which are stacked.
Figure 17B:
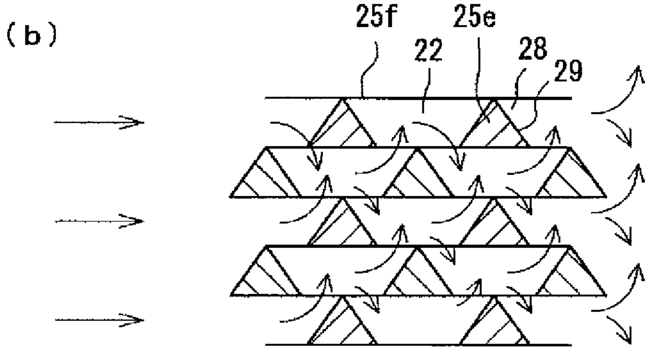
FIG. 17B is a partial cross-sectional schematic view of a mixing unit employing the mixing elements of FIG. 17A showing a state of flow of fluid within the mixing unit.

FIG. 17A is a perspective view in a state where the two types of mixing elements 21*g* and 21*h* are stacked, and FIG. 17B is an illustrative diagram showing a state where the fluid flows within mixing elements 21*g* and 21*h*.

As shown in FIG. 17A, in mixing elements 21*g* and 21*h*, the cross-sectional shape of partition walls 25*f* extending in the radial direction and partition walls 25*e* extending in the circumferential direction is formed in the shape of a triangle where the width of its upper portion is narrow and the width of its lower portion is wide. Hence, the surface opposite the direction in which mixing elements 21*g* and 21*h* extend is inclined in such a direction that, as the surface extends upwardly, the thickness of partition walls 25*e* and 25*f* is decreased. The inclined portion described above is the chamfered portion 28, and forms inclined surfaces 29.

In the flow of the fluid within mixing elements 21*g* and 21*h* having partition walls 25*e* and 25*f* shaped as described above, since the chamfered portions 28 are provided, as compared with partition walls whose end surfaces rise steeply, an impact at the time of collision with the fluid is reduced. Thus, it is possible to make the fluid flow smoothly.

Figure 18A:
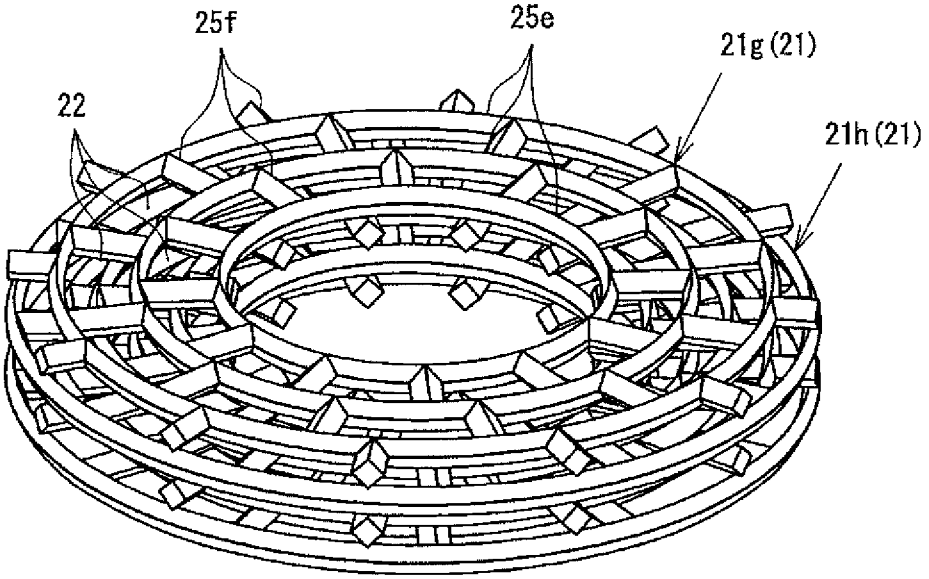
FIG. 18A is a perspective view of mixing elements which are stacked as a modification of the mixing elements of FIG. 17A.
Figure 18B:
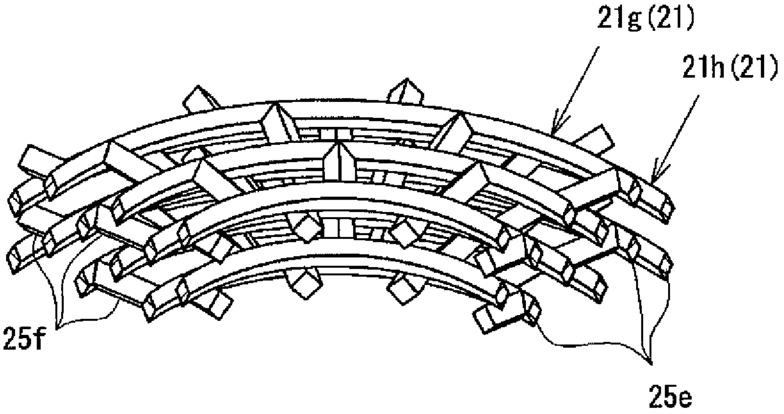
FIG. 18B is a partial enlarged perspective view of the stacked mixing elements of FIG. 18A showing its cross-sectional shape.
Figure 19A:
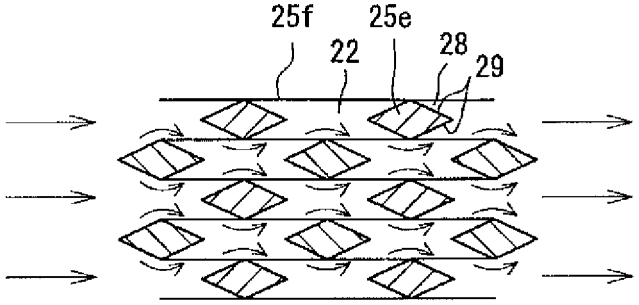
FIGS. 19A, 19B and 19C are cross-sectional schematic views showing states of flow of fluid within mixing units as further modifications the mixing unit of the FIG. 17B.

FIG. 18A is a perspective view in a state where the two types of mixing elements 21*g* and 21*h* are stacked, and FIG. 18B is a perspective view showing the cross-sectional shape of mixing elements 21*g* and 21*h*. FIG. 19A is an illustrative diagram showing a state where the fluid flows within mixing elements 21*g* and 21*h*.

As shown in FIG. 18A, in mixing elements 21*g* and 21*h*, the cross-sectional shape of partition walls 25*f* extending in the radial direction and partition walls 25*e* extending in the circumferential direction is formed substantially in the shape of a rhombus where corners are present in upper, lower, left and right portions. According to one or more embodiments of the present invention, "substantially in the shape of a rhombus" means that a rhombus is included.

Hence, the surface opposite the direction in which mixing elements 21*g* and 21*h* extend is inclined in such a direction that, as the surface extends upwardly or downwardly, the thickness of partition walls 25*e* and 25*f* is decreased. The inclined portion described above is the chamfered portion 28, and forms inclined surfaces 29.

In the flow of the fluid within mixing elements 21*g* and 21*h* having partition walls 25*e* and 25*f* shaped as described above, since the chamfered portions 28 are provided as shown in FIG. 19A, as compared with partition walls whose end surfaces rise steeply, an impact at the time of collision with the fluid is reduced. Thus, it is possible to make the fluid flow smoothly.

The angle of inclined surfaces 29 is set as necessary, and thus it is possible to adjust and control the direction in which the fluid flows.

Figure 19B:
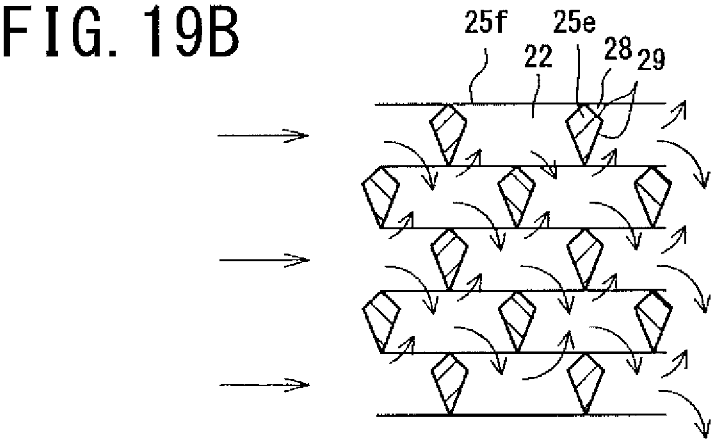
Figure 19C:
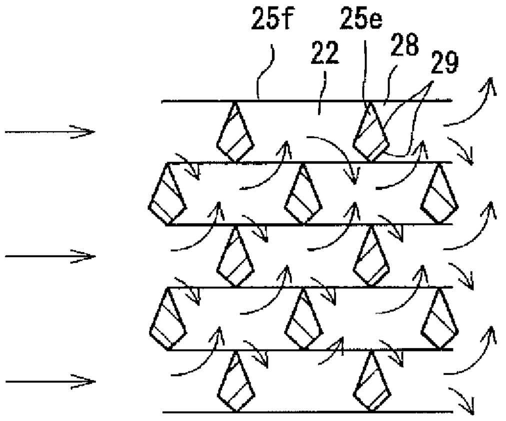

As shown in FIGS. 19B and 19C, the angles of the upper and lower inclined surface 29 are made to differ from each other, and thus it is possible to increase and decrease the magnitude of the flow of the fluid in the up/down direction (the stacking direction), with the result that it is possible to change the entire flow. For example, with consideration given to a direction in which satisfactory mixing may be performed and the like, the angle of the inclined surfaces 29, the distance between partition walls 25*e* and 25*f* and the like are set as necessary, and thus it is possible to realize desired mixing.

The control of the direction in which the fluid flows may be performed such as by setting the cross-sectional shape of partition walls 25*e* and 25*f* as necessary, inclining partition walls 25*e* and 25*f* of the cross-sectional shape as in the example described above or twisting partition walls 25*e* and 25*f*.

Figure 20A:
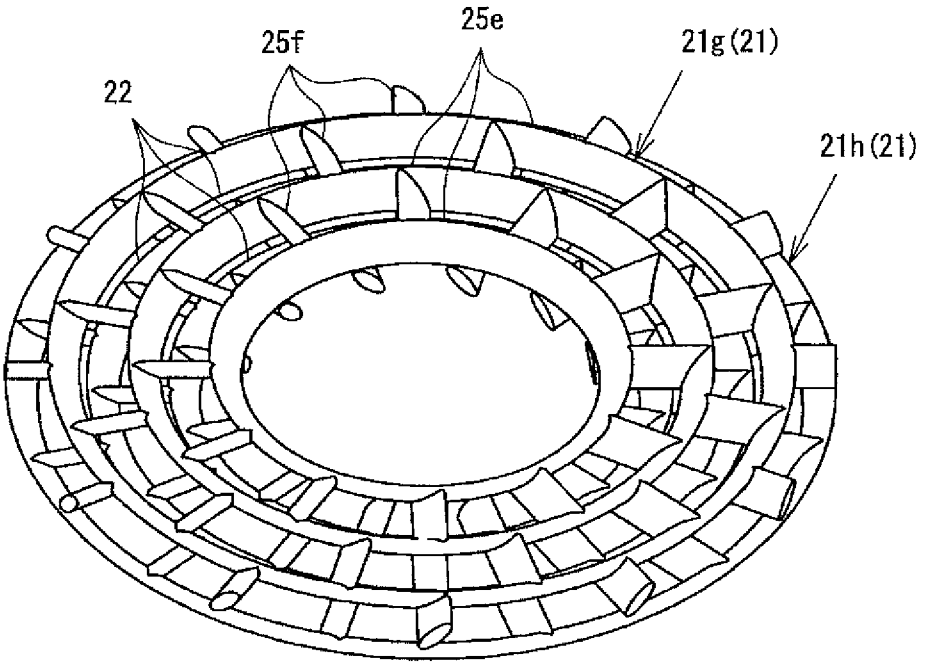
FIG. 20A is a perspective view of mixing elements which are stacked as a further modification of the mixing elements of FIG. 18A.
Figure 20B:
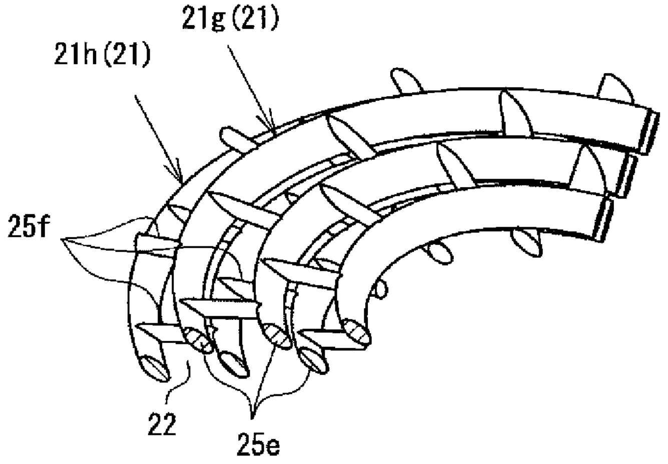
FIG. 20B is a partial enlarged perspective view of the stacked mixing elements of FIG. 20A showing its cross-sectional shape.

FIG. 20A is a perspective view in a state where the two types of mixing elements 21*g* and 21*h* are stacked, and FIG. 20B is a partial perspective view showing the cross-sectional shape of mixing elements 21*g* and 21*h*.

As shown in FIGS. 20A and 20B, the cross-sectional shape of partition walls 25*f* extending in the radial direction and partition walls 25*e* extending in the circumferential direction is formed substantially in the shape of an ellipse; as partition walls 25*e* extending in the circumferential direction extend upwardly, partition walls 25*e* are inclined so as to extend circumferentially; partition walls 25*f* extending in the radial direction are inclined to one of the leftward and rightward directions.

As mixing elements 21*g* and 21*h* are relatively moved, differences in the resistance between partition walls 25*e* and 25*f* are made, and thus directivity is given to the fluid within mixing elements 21*g* and 21*h* having partition walls 25*e* and 25*f* shaped as described above. Since the fluid is made to flow easily in the circumferential direction along partition walls 25*e* by partition walls 25*f* inclined to the circumferential direction and extending in the radial direction, it is possible to obtain spiral flow shown conceptually in FIG. 21 especially for use as an agitation impeller.

When the cross-sectional shape of partition walls 25*e* and 25*f* is formed in the shape of a rhombus, among the partition walls, the resistance of the partition walls extending from the center portion of mixing elements to the outer circumference to fluid and the resistance of the other partition walls to fluid are made to differ from each other, and thus it is possible to likewise achieve spiral flow.

Figure 22:
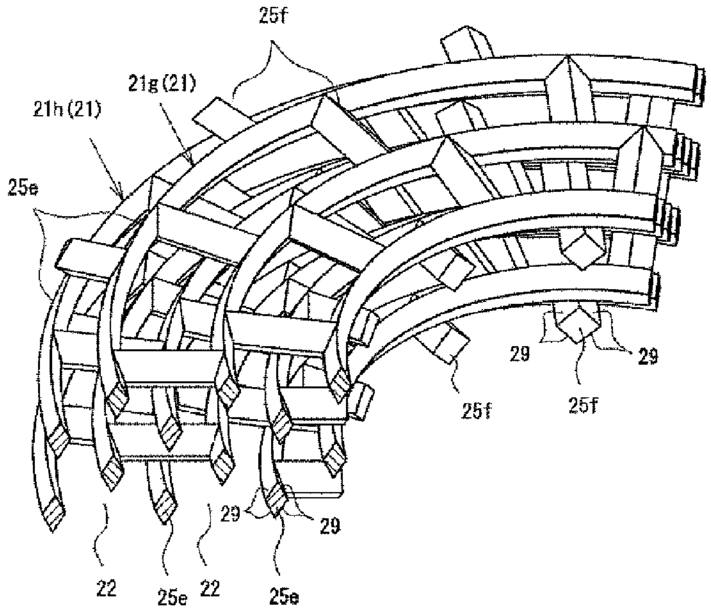
FIG. 22 is a partial cross-sectional perspective view showing a cross-sectional shape of mixing elements as a modification of the mixing elements of FIG. 20A.

FIG. 22 is a partial perspective view showing a cross-sectional shape of two types of mixing elements 21*g* and 21*h* in a state which the elements are stacked.

As shown in FIG. 22, partition walls 25*e* and 25*f* between first through holes 22 in mixing elements 21*g* and 21*h* have the inclined surfaces 29 whose upper and/or lower ends are narrower in width, and, with respect to the inclination angle of the inclined surfaces 29 described above, among the partition walls, the inclination angle of partition walls 25*f* extending in the radial direction from the center portion of mixing elements to the outer circumference is smaller than that of the inclination surface of the cross-sectional shape of the other partition walls 25*e* extending in the circumferential direction.

Figure 21:
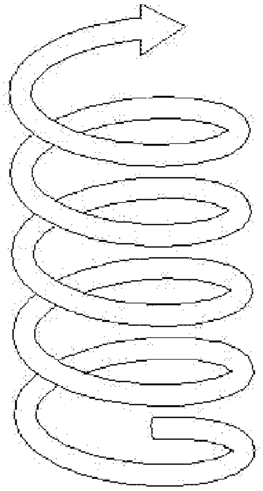
FIG. 21 is a conceptual diagram showing states of flow of fluid mixed by the mixing unit of FIG. 20A.

In the fluid within mixing elements 21*g* and 21*h* having partition walls 25*e* and 25*f* shaped as described above, the flow in the circumferential direction is promoted more than in the radial direction, and resistance is given to the flow of the fluid in the radial direction by partition walls 25*e* in the circumferential direction, with the result that it is possible to produce spiral flow as shown in FIG. 21.

(Seventh Variation of the Mixing Unit)

Since mixing elements 21 may be formed to have various cross-sectional shapes as described above, as necessary, a plurality of members may be stacked.

Figure 23A:
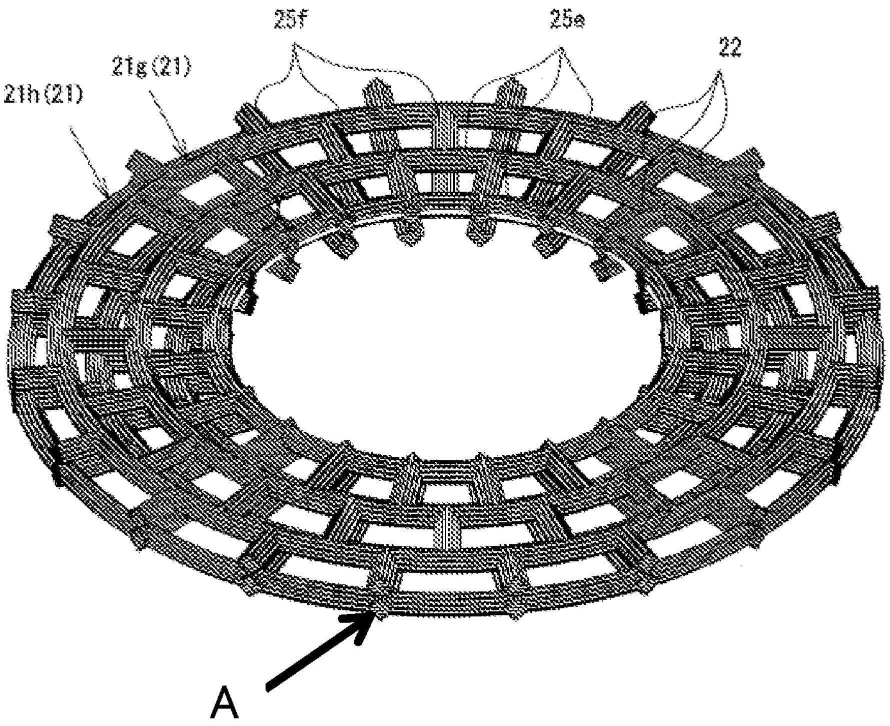
FIG. 23A is a perspective view of mixing elements of a mixing unit as a seventh modification of the mixing elements of FIG. 20A.
Figure 23B:
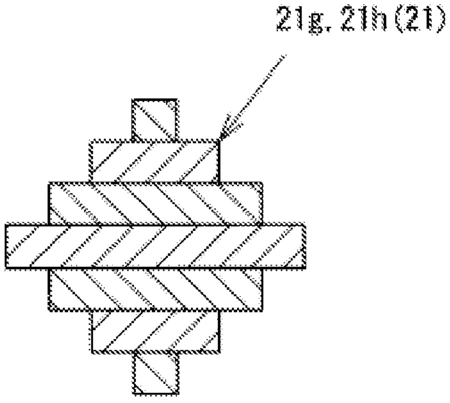
FIG. 23B is its partial cross-sectional view.

FIG. 23A is a perspective view of mixing elements 21*g* and 21*h* which are stacked, and FIG. 23B is a partial enlarged vertical cross-sectional view of a partition wall of the elements 21 (21*g* and 21*h*).

As shown in FIG. 23A, mixing elements 21*g* and 21*h* include partition walls 25*e* and 25*f* whose cross-sectional outline is substantially rhombic. As shown in FIG. 23B, partition walls 25*e* and 25*f* are configured by stacking a plurality of plate members (here, seven plate members) having different width dimensions. The plate members are fixed to each other such as by adhesion or welding as necessary.

By stacking a plurality of plate member as described above, it is possible to freely obtain mixing elements 21*g* and 21*h* having various cross-sectional shapes that cannot be formed by pressing or the like.

Although partition walls 25*e* and 25*f* shown in FIGS. 23A and 23B have ladder-shaped steps, it is possible to provide the partition wall having the inclined surfaces by chambering the plate members.

Eighth Embodiment

Figure 24A:
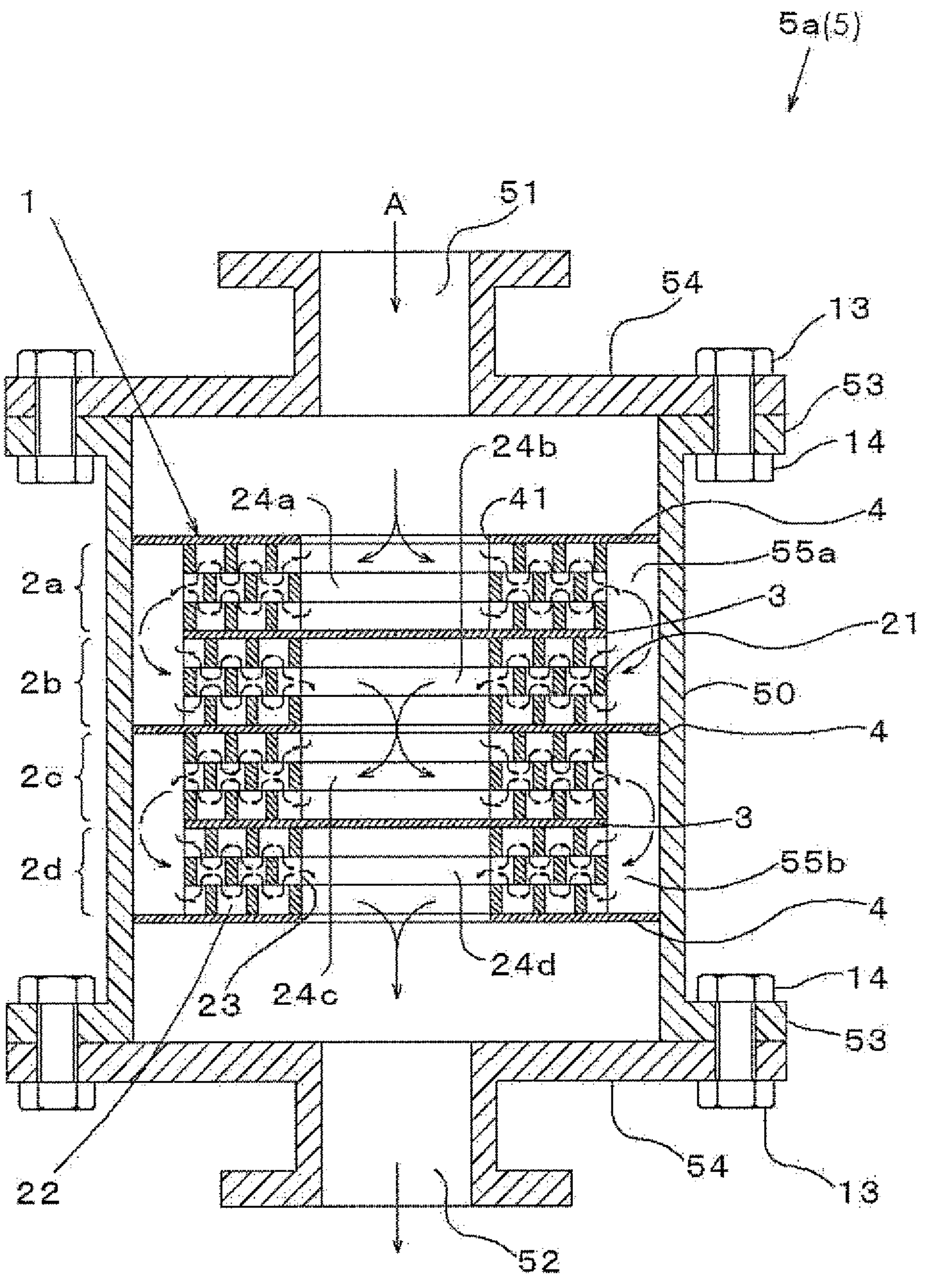
FIG. 24A is a cross-sectional view of a mixing device in accordance with an eighth embodiment of the present invention showing a state of flow of fluid within the mixing device.

FIG. 24A is a cross-sectional view of a mixing device 5*a* showing how fluid A flows within mixing device 5*a* in accordance with an eighth embodiment of the present invention.

In FIG. 24A, mixing device 5*a* includes flanges 54 having an inlet 51 and an outlet 52 and formed in the shape of an outer circumferential disc, a casing 50 having a flange 53 and formed in the shape of a cylinder to which flanges 54 are removably mounted, and a mixing unit 1 within casing 50. Mixing unit 1 includes four stacked members 2*a*, 2*b*, 2*c* and 2*d* in which a plurality of mixing elements 21 (here, three mixing elements) composed of discs described above are stacked.

In the side of inlet 51 of casing 50, a second plate 4 having an opening portion 41 in the center portion and an outside diameter substantially equal to the inside diameter of the casing 50 is provided, and first stacked member 2*a* having mixing elements 21 is provided on a bottom surface of second plate 4. On a bottom surface of first stacked member 2*a*, a first plate 3 having an outside diameter substantially equal to the outside diameter of mixing elements 21 is provided. Then, second stacked member 2*b*, second plate 4, third stacked member 2*c*, first plate 3, fourth stacked member 2*d* and second plate 4 are sequentially disposed.

In mixing device 5*a* shown in FIG. 24A, mixing unit 1 may be fixed within casing 50 with fixing units such as bolts and nuts.

Each of mixing elements 21 has a plurality of first through holes 22 and a substantially circular second through hole 23 in the center portion. The inside diameters of second through holes 23 of mixing elements 21 are substantially equal to the inside diameter of the opening portion 41 of second plates 4. Second through holes 23 are substantially concentric with opening portions 41 of second plates 4. Mixing elements 21 are stacked, and thus second through holes 23 constitute a first hollow portion 24*a*, a second hollow portion 24*b*, a third hollow portion 24*c* and a fourth hollow portion 24*d*, which are hollow space portions. Hollow portions 24*a* to 24*d* are hollow portions corresponding to stacked members 2*a* to 2*d*, respectively.

A first annular space portion 55*a* is formed between an inner circumferential portion of casing 50 and the outer circumferential portion of first stacked member 2*a* and second stacked member 2*b*. A second annular space portion 55*b* is formed between an inner circumferential portion of casing 50 and the outer circumferential portion of third stacked member 2*c* and fourth stacked member 2*d*.

Within stacked members 2*a* to 2*d*, first through holes 22 communicate with each other in a direction in which mixing element 21 extends, and part thereof are open to the inner circumferential surface and the outer circumferential surface of mixing elements 21.

First plate 3 and second plate 4 arranged on both end portions of each of the stacked members 2*a* to 2*d* and opposite each other close first through holes 22 in both end portions of each of stacked members 2*a* to 2*d* in the stacking direction. This prevents fluid A within stacked member 2 from flowing out through first through holes 22 in both end portions of each of stacked members 2*a* to 2*d* in the stacking direction. Fluid A is reliably passed within stacked members 2*a* to 2*d* in the direction in which each of mixing elements 21 extends.

In mixing device 5*a* configured as described above, for example, fluid A flows in through inlet 51 with appropriate pressure, and flows into first hollow portion 24*a*. Then, fluid A flows into first stacked member 2*a* through first through holes 22 open to inner circumferential surface of first hollow portion 24*a*, and is passed in the outer circumferential direction through first through holes 22 communicating with each other. Then, fluid A flows out through first through holes 22 open to the outer circumferential surface of first stacked member 2*a*, and flows into first annular space portion 55*a*.

Then, fluid A flows into second stacked member 2*b* through first through holes 22 open to the outer circumferential surface of second stacked member 2*b*, and is passed in the inner circumferential direction through first through holes 22 communicating with each other. Then, fluid A flows out through first through holes 22 open to the inner circumferential surface of second hollow portion 24*b*, and flows into second hollow portion 24*b*.

Thereafter, fluid A flows from third hollow portion 24*c* to third stacked member 2*c* to second annular space portion 55*b* to fourth stacked member 2*d* and to fourth hollow portion 24*d*, and flows out through outlet 52.

As described above, fluid A is passed through through holes 22 communicating with each other while flowing within stacked members 2*a* to 2*d* from the inner circumferential portion to the outer circumferential portion or from the outer circumferential portion to the inner circumferential portion in a meandering manner, with the result that fluid A is highly mixed. In this way, fluid A flows in through inlet 51 of mixing device 5*a*, is highly mixed and flows out through outlet 52.

In mixing device 5*a* described above, first plate 3 and second plate 4 are arranged on both end portions of each of stacked members 2*a* to 2*d* and opposite each other to allow the direction in which fluid A flows within stacked member 2 to be changed from the inner circumferential portion to the outer circumferential portion or vice versa, that is, from the outer circumferential portion to the inner circumferential portion. Thus, fluid A is passed through a larger number of first through holes 22 communicating with each other, with the result that the degree of mixing may be further increased.

Even in mixing device 5, each of the hollow portions 24*a* to 24*d* is sufficiently larger in size than first through holes 22, and second through holes 23 of mixing elements 21 constituting hollow portion 24 are substantially equal in inside diameter to each other, and are substantially concentric with each other. Hence, the flow resistance to fluid A flowing through hollow portions 24*a* to 24*d* is smaller than that of fluid A flowing through stacked members 2*a* to 2*d*, and so the loss of pressure is also smaller. Therefore, even when a large number of mixing elements 21 are stacked, fluid A substantially uniformly reaches the inner circumferential portions of mixing elements 21 regardless of the position in the mixing direction, and substantially uniformly flows within stacked members 2*a* to 2*d* from the inner circumferential portion to the outer circumferential portion or vice versa, that is, from the outer circumferential portion to the inner circumferential portion.

Fluid A flows from annular space portions 55*a* and 55*b* into stacked members 2*b* and 2*d* in the same manner as hollow portions 24*a* and 24*d* described above.

Furthermore, since, in mixing device 5*a* described above, fluid A may be mixed within casing 50 having inlet 51 and outlet 52, it is possible to use mixing device 5*a* as an in-line static mixing device and mix fluid A continuously.

Moreover, since the outer circumferential shapes of mixing element 21, first plate 3 and second plate 4 are circular and thus casing 50 may be cylindrical, it is possible to increase the pressure resistance of casing 50. Thus, it is possible to mix fluid A at a high pressure.

Instead of mixing unit 1, mixing elements 21*d* of FIG. 9B in which second through holes are not provided as in mixing unit 1*c* of FIG. 9*c* may be used.

Figure 24B:
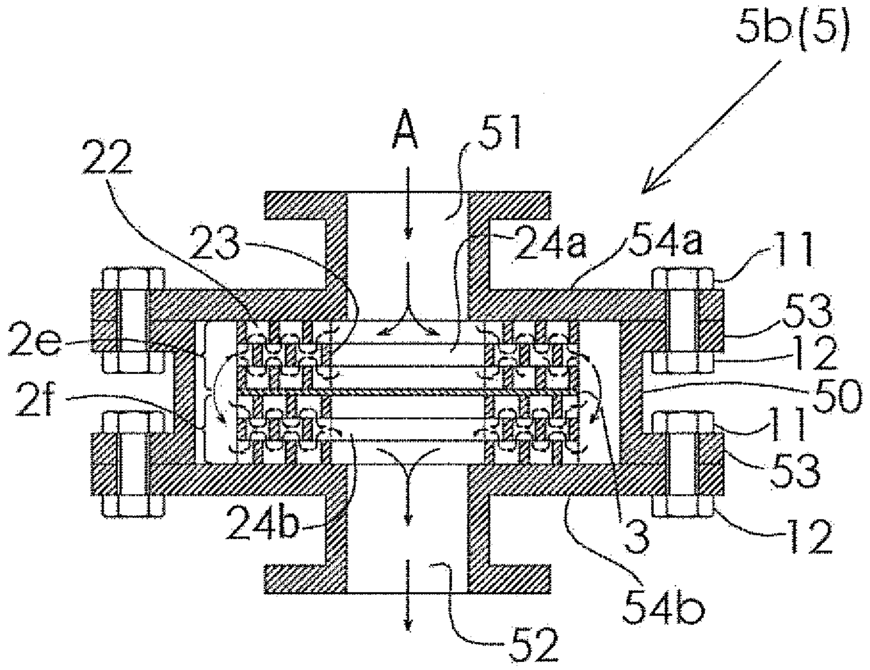
FIGS. 24B and 24C are cross-sectional views of the mixing devices as modifications of the device of FIG. 24A.

FIG. 24B is a cross-sectional view of a mixing device 5*b* wherein each of flanges 54*a* and 54*b* serves as a second plate, and shows how fluid A flows within mixing device 5*b* as a modification of this eighth embodiment of the present invention. Mixing device 5*b* includes a first plate 3, and a pair of stacked members 2*e* and 2*f* which are stacked to sandwich first plate. Opposite surfaces of stacked members 2*e* and 2*f* contacting first plate 3 are in contact with inner surfaces of flange 54*a* and 54*b* respectively. An inlet 51 disposed on flange 54*a* communicates with a hollow portion 24*a* of stacked unit 2*e*, and an outlet 52 disposed on flange 54*b* communicates with a hollow portion 24*b* of stacked unit 2*f*.

Figure 24C:
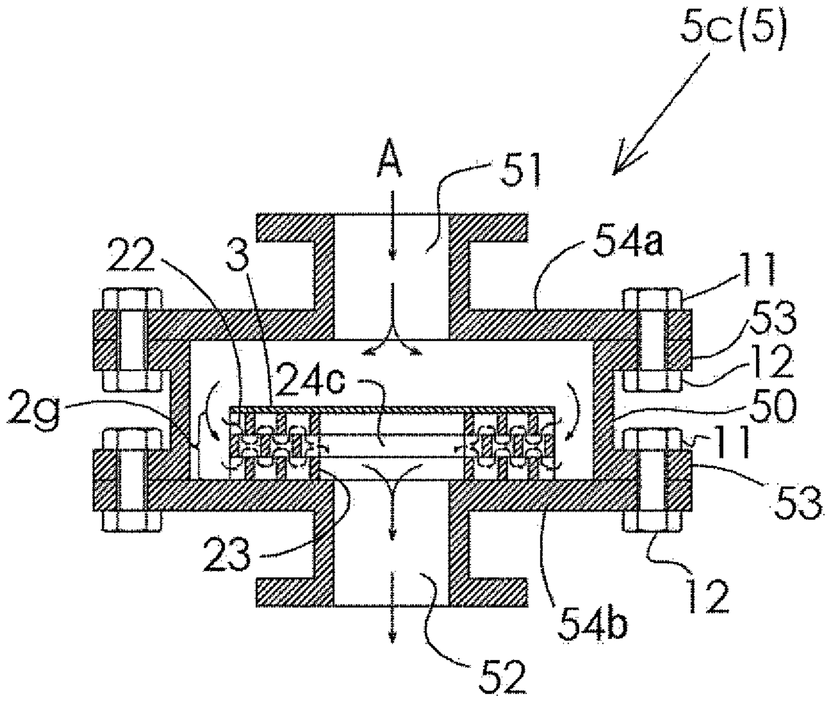

FIG. 24C is a cross-sectional view of a mixing device 5*c* as a further modification of the eighth embodiment of the present invention. Mixing device 5*c* includes a casing 50, a pair of flanges 54*a* and 54*b*, a stacked member 2*g*, and a first plate 3 disposed on one surface of stacked member 2*g*. Other opposite surface of stacked member 2*g* comes in contact with an inner surface of flange 54*b*, and outlet 52 communicates with a hollow portion 24*c* of stacked member 2*g*.

In the above described mixing devices 5*b* and 5*c* of FIGS. 24B and 24C, flanges 54*a* and 54*b* serve same components as second plates 4, whereby fluid A flows within stacked members 2*c* to 2*g* from the inner circumferential portion to the outer circumferential portion or vice versa, that is, from the outer circumferential portion to the inner circumferential portion, and is mixed by passing through first through holes 22.

As in the variations of the mixing unit, mixing device 5 (5*a* to 5*c*) according to the present invention is not limited to the embodiments of the mixing devices described above. Variations are possible within the scope of the present invention, and it is possible to practice variations.

Ninth Embodiment

Figure 25A:
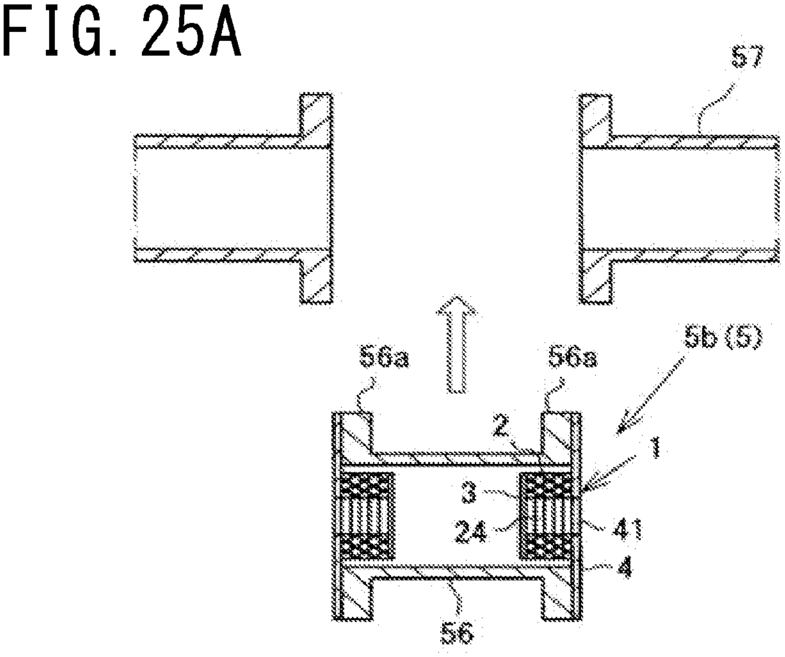
FIG. 25A is a cross-sectional view of mixing device in accordance with a ninth embodiment of the present invention.
Figure 25B:
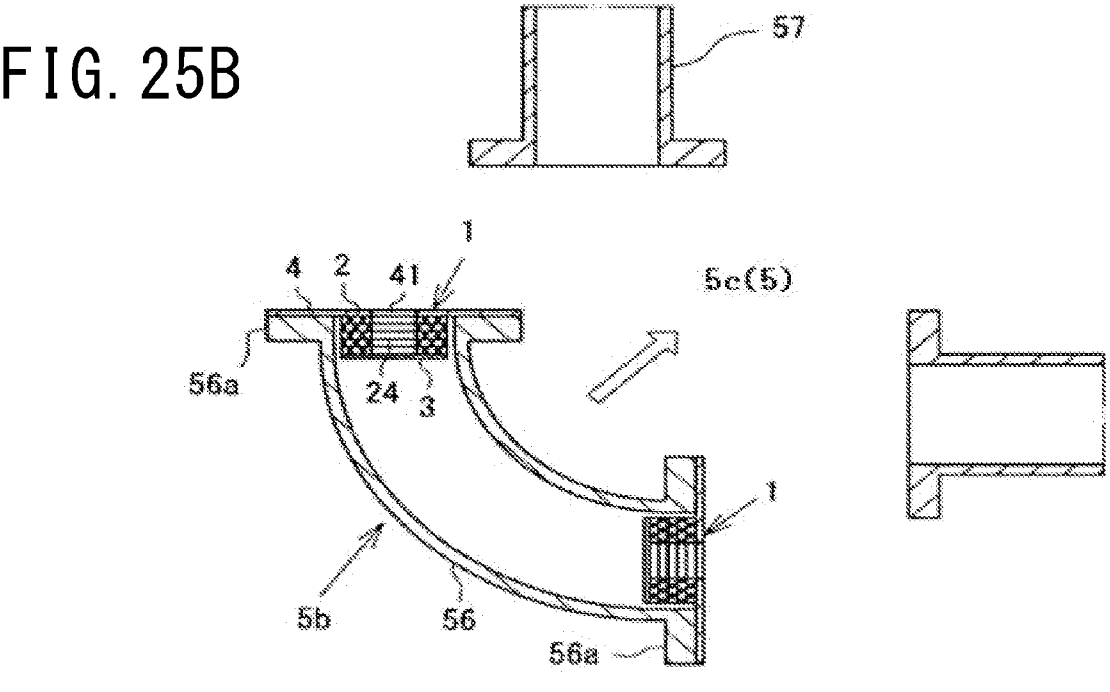
FIG. 25B is a cross-sectional view of mixing device as a modification of the mixing device of FIG. 25A.

FIG. 25A is a cross-sectional view of a mixing device 5*b* having a mixing unit 1 disposed within a tube member 56 through which a fluid flows, and FIG. 25B is a cross-sectional view of a mixing device 5*c* having a pair of mixing units 1 disposed within a tube member 56 in accordance with a ninth embodiment of the present invention. FIG. 25A shows a linear type of mixing device 5*b*, and FIG. 25B shows a curved type of mixing device 5*c*.

In each of mixing devices 5*b* and 5*c*, mixing unit 1 is provided within a tube member 56 connected to a pipe line 57 so as not to protrude in the longitudinal direction of tube member 56. In other words, a first plate 3 of the mixing unit is formed to have the same size as the outer circumference of a stacked member 2, and a second plate 4 is formed to have a size corresponding to flange 56*a* of tube member 56. An opening portion 41 of a second plate 4 is equal in size to a hollow portion 24 of stacked member 2.

In order for mixing unit 1 to be fixed to tube member 56, first plate 3 of mixing unit 1 is inserted into tube member 56, and second plate 4 is joined to the outer side surface of flange 56*a*.

As shown in the figures, mixing unit 1 may be provided at each end of tube member 56 or may be provided at one end. Mixing unit 1 may be provided in an intermediate portion of tube member 56 in the longitudinal direction.

Since in mixing device 5*b* configured as described above, the mixing unit 1 does not protrude in the longitudinal direction of the tube member 56, mixing device 5*b* may be used by being attached to the pipe line 57 that has been already provided. Thus, it is possible to mix fluid within a piping system as necessary. It is also easy to perform maintenance.

Since mixing unit 1 has mixing effects as described above, it is possible to sufficiently perform mixing, it is not necessary to provide a mixing device separately and it is also possible to save space.

In addition to the example described above, mixing device 5 of the present invention may be configured as follows.

The outer circumferential shapes of mixing element 21, first plate 3 and second plate 4 are not limited to be circular. This is because, even if the outer circumferential shapes are not circular, there is no problem at all in practicing the invention.

A fluid that is mixed is not limited to a gas or a liquid; it may be a solid mixture consisting of a liquid and a powder and granular material or the like.

With respect to applications, in addition to an application for making the concentration of a fluid uniform, for example, the mixing device can also be used for mixing the same type of fluid having different temperatures so that the fluid has a uniform temperature.

Since the mixing device does not need a large space or may be provided in a pipe line, for example, the mixing unit 1 or mixing device 5 can also be used in a place, such as a diesel automobile or an exhaust gas line, where an installation space is limited.

Tenth Embodiment

Figure 26A:
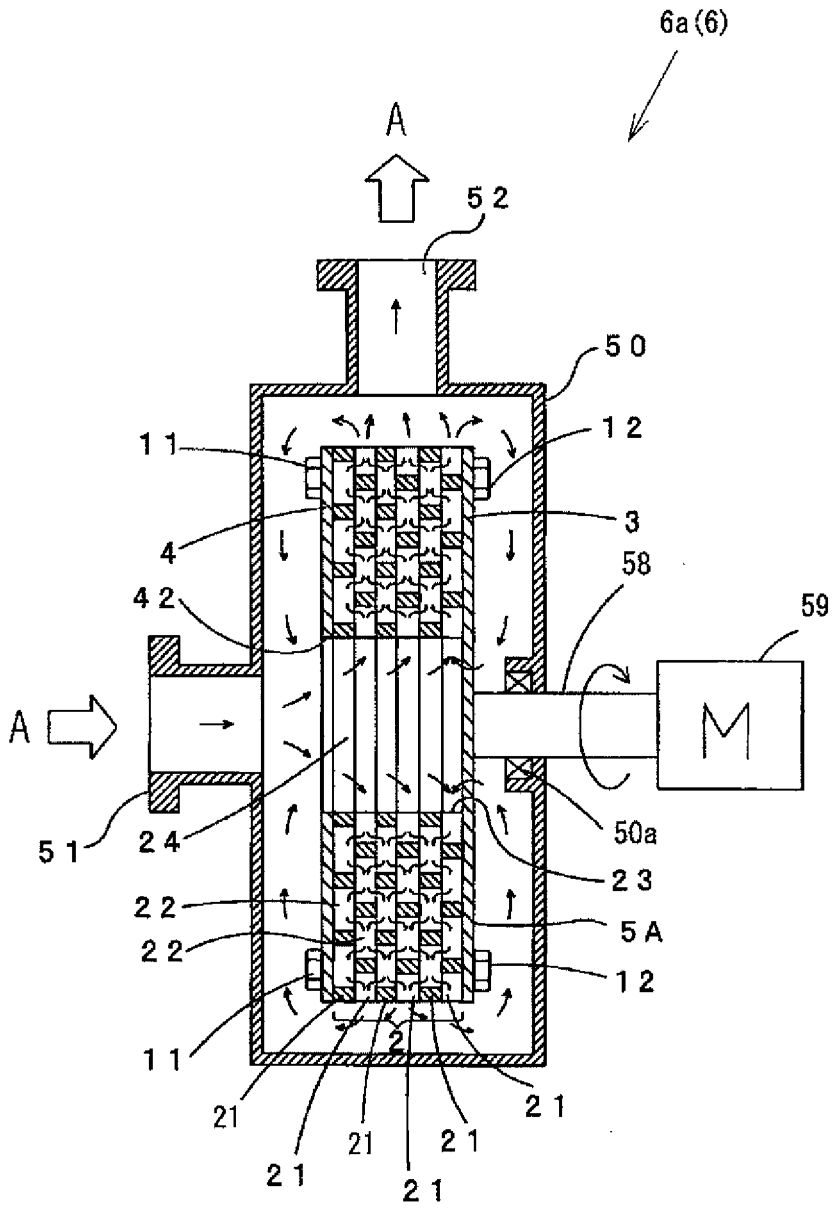
FIG. 26A is a cross-sectional view of a pump mixture in accordance with a tenth embodiment of the present invention.

FIG. 26A is a cross-sectional view showing a pump mixer 6*a* in accordance with a tenth embodiment of the present invention, showing flow of fluid A within the pump mixer.

As shown in FIG. 26A, pump mixer ba includes a mixing unit 1 having a cylindrical external shape, a cylindrical casing 50, a rotation shaft 58 and an electric motor 59 serving as a drive source. Electric motor 59 drives and rotates mixing unit 1; in the tenth embodiment, electric motor 59 is driven to rotate by the supply of electric power from an unillustrated power supply. While rotation shaft 58 is coupled to electric motor 59, rotation shaft 58 supports mixing unit 1*a* seal member 50*a* is provided to a portion in which rotation shaft 58 slides with respect to casing 50 so as to prevent the leakage of fluid A within pump mixer ba.

Casing 50 has an inlet 51 and an outlet 52 formed in the shape of a flange; fluid A is sucked into pump mixer 6*a* through inlet 51 and is discharged through outlet 52.

Figure 26B:
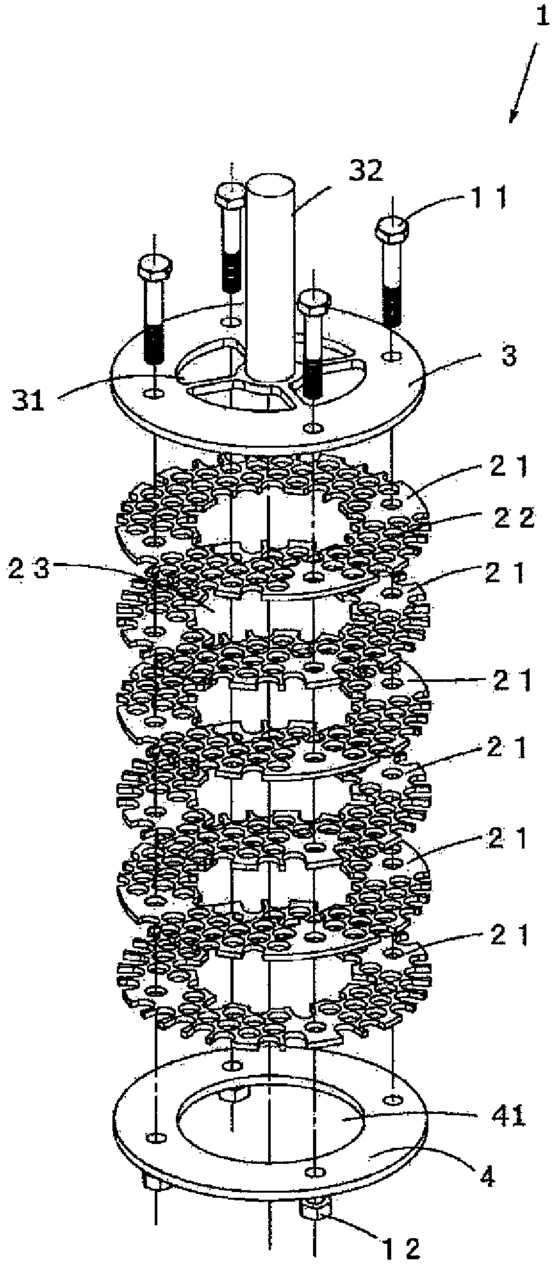
FIG. 26B is an exploded perspective view the mixing unit employed in the pump mixture of FIG. 26A.

As shown in FIG. 26B, mixing unit 1 has an axis portion 32 connected to the rotation shaft 58. Axis portion 32 is provided at the center of first plate 3; an opening portion 31 is formed around axis portion 32. As with opening portion 41 of second plate 4, opening portion 31 is a portion through which the fluid flows. Mixing unit 1 is configured as described above.

When the mixing unit 1 is driven to rotate by electric motor 59, fluid A sucked through inlet 51 of pump mixer 6*a* flows into hollow portion 24 having a cylindrical shaped hole through opening portions 31 of first plate 3 and opening portion 41 of second plate 4 of mixing unit 1. Then, fluid A flows into stacked member 2 through first through holes 22 in mixing elements 21 open to the inner circumferential portion of hollow portion 24.

A force acting outwardly in a radial direction resulting from the centrifugal force is applied to fluid A that has flowed into stacked member 2. Fluid A receiving the force is radially passed through first through holes 22 communicating with each other within stacked member 2 from the inner circumferential portion to the outer circumferential portion, and is discharged outwardly from the outer circumferential portion of stacked member 2 through first through holes 22 open to the outer circumferential portion. Fluid A that has flowed out is discharged from pump mixer 6*a* through outlet 52.

Part of fluid A that has flowed out of mixing unit 1 flows again into hollow portion 24 through the opening portion 31 of first plate 3 and opening portion 41 of second plate 4, further flows into stacked member 2 and flows out from the outer circumferential portion of stacked member 2, with the result that fluid A circulates within stacked member 2 of mixing unit 1.

Then, while fluid A substantially radially flows through first through holes 22 communicating with each other within stacked member 2 from the inner circumferential portion to the outer circumferential portion, the fluid is repeatedly dispersed, combined, reversed and subjected to turbulent flow, eddying flow, collision and the like, and thus the fluid is highly mixed.

Although, in tenth embodiment, casing 50 is cylindrical, the present invention is not limited to this configuration. The opening portion 31 may be omitted in first plate 3.

When the required degree of mixing is low, the clearance between mixing unit 1 and inlet 51 is reduced as in a conventional centrifugal pump and thus the flow rate of fluid A circulating within the pump mixer 6*a* may be reduced.

Figure 27A:
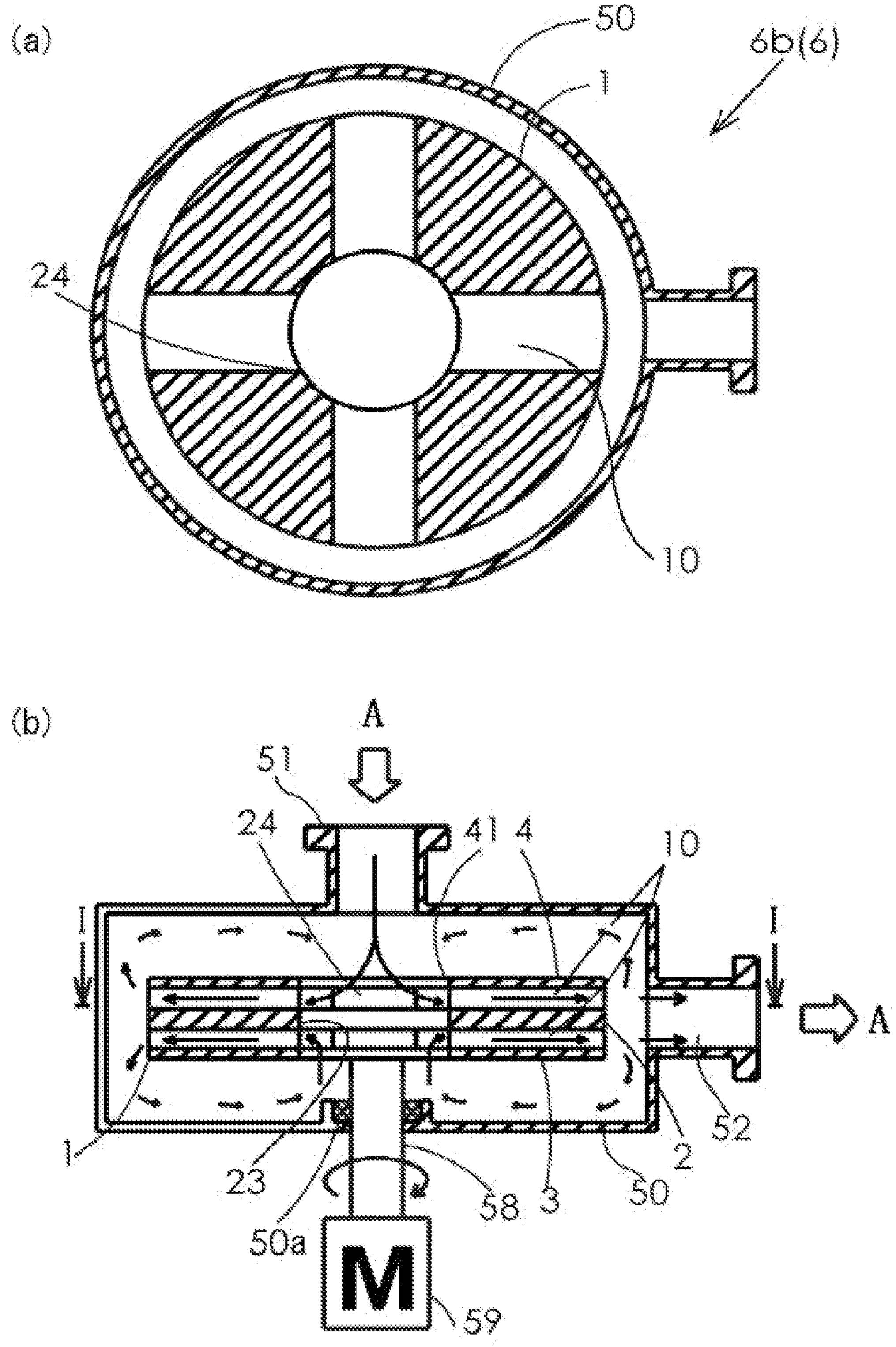
FIG. 27A shows a sectional plan view of a pump mixture as a modification of the pump mixture of FIG. 26A and its cross sectional view.

FIG. 27A shows a plan sectional view and a cross sectional view of a pump mixer 6*b* as a modification of pump mixer 6*a* of FIG. 26A. Pump mixer 6*b* includes a casing 50 and a mixing unit 1 disposed within casing 50*a*. Mixing unit 1 includes a cylindrical shaped hollow portion 24 passing through in a coaxial (vertical) direction of mixing unit 1, and four flow paths 10 in two layers radially expanding from hollow portion 24 to circumferential direction thereof which are closed by first plate 3 and second plate 4.

In pump mixer 6*b*, fluid A taken into mixing unit 1 from an inlet 51 by rotation of mixing unit 1 is mixed by passing flow paths 10 from hollow portion 24 of mixing unit 1 to the external circumferential portion. A part of fluid A passing out from the external circumferential portion of mixing unit 1 re-enters into hollow portion 24 to be re-circulated, and remaining part of fluid A is fed out through outlet 52 outwardly.

Figure 27B:
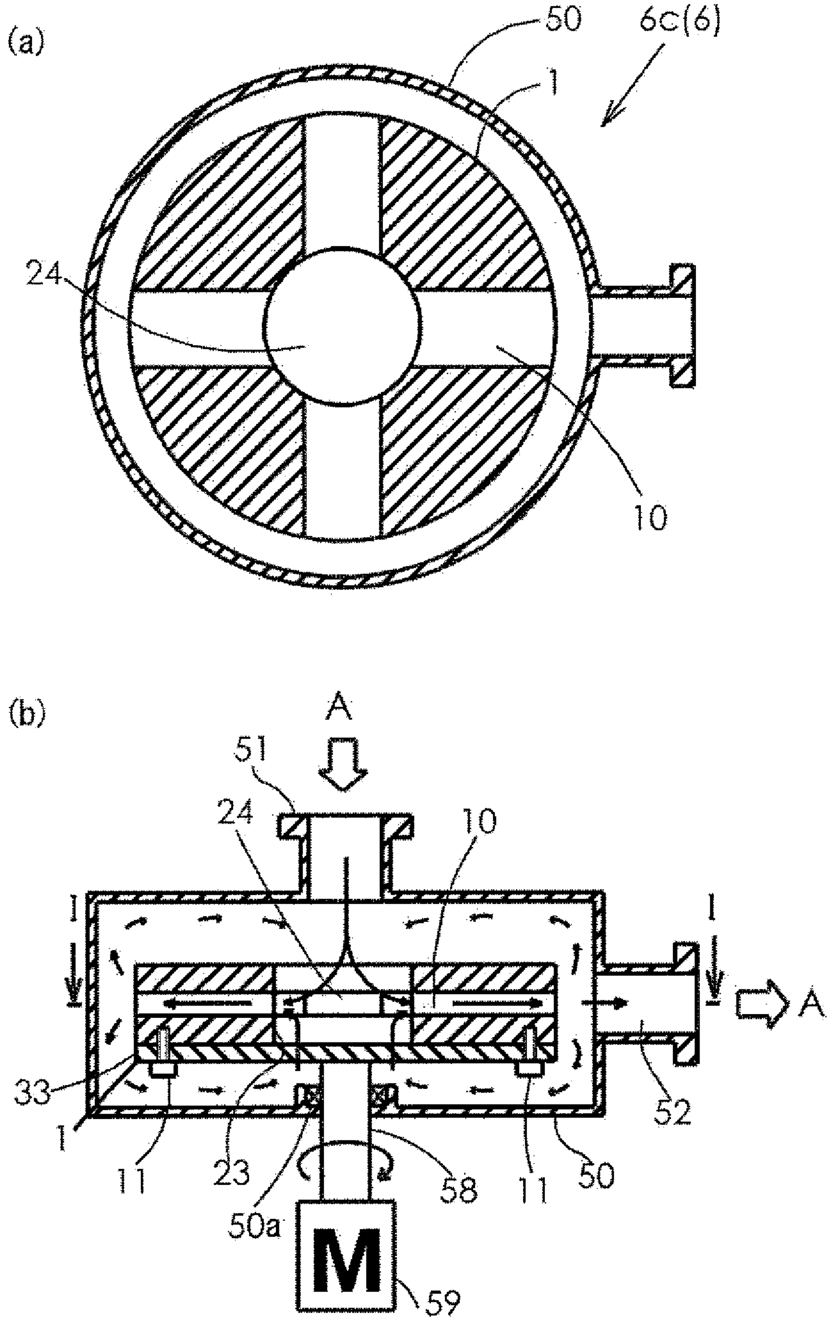
FIG. 27B shows a sectional plan view of a pump mixture as another modification of the pump mixture of FIG. 26A and its cross sectional view.

FIG. 27B shows a plan sectional view and a cross sectional view of a pump mixer 6*c* as another modification of pump mixer 6*a* of FIG. 26A. Pump mixer 6*c* includes casing 50 and mixing unit 1, but mixing unit 1 has four flow paths 10 in a single layer. Mixing unit 1 may be a mixing body formed as a single unit.

Figure 28A:
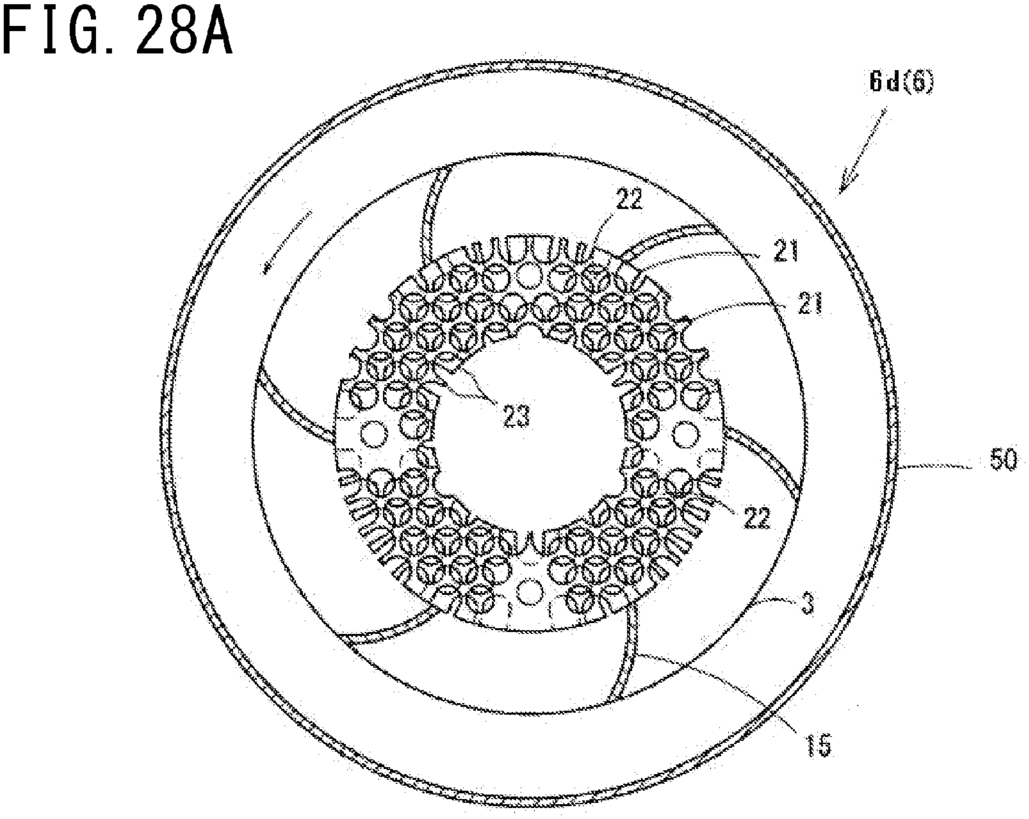
FIG. 28A is a cross-sectional plane view of a pump mixer as a modification of a tenth embodiment of the present invention.
Figure 28B:
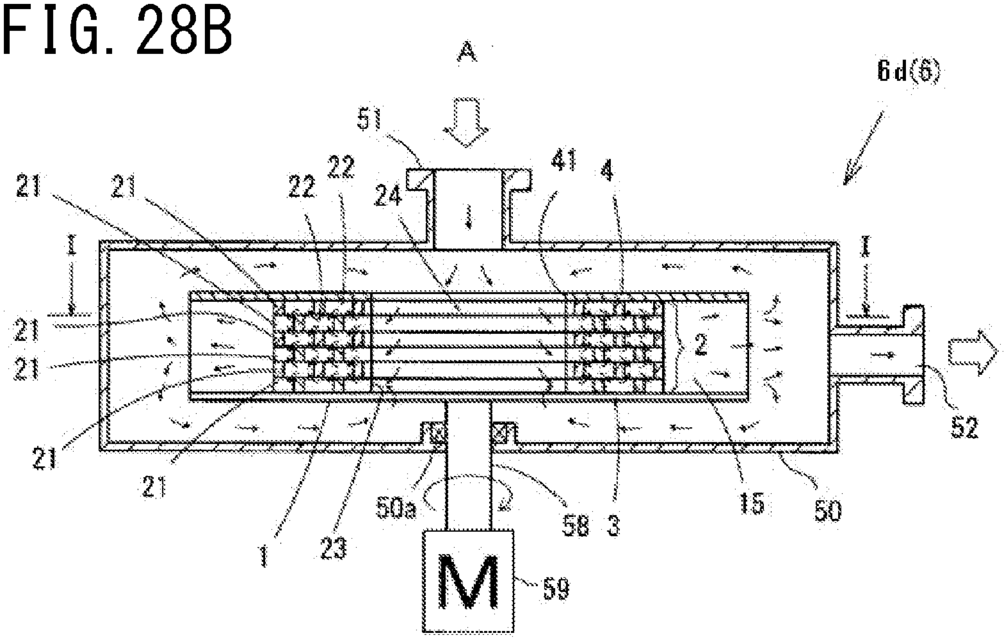
FIG. 28B is a cross-sectional view of the pump mixer of FIG. 28A showing how a fluid flows within the pump mixer.

FIGS. 28A and 28B are diagrams showing a pump mixer 6*d* as still another modification of the tenth embodiment of the present invention. FIG. 28A is a cross-sectional view taken along line I-I of FIG. 28B which is a cross-sectional view showing how fluid A flows within the pump mixer 6*d*.

The pump mixer 6*d* differs from the pump mixer 6*a* of FIG. 26A in that the outer circumferential shape of first plate 3 and second plate 4 is larger than that of mixing elements 21, and that blades 15 (here, six blades) extending in the direction in which mixing elements 21 are stacked are provided in the outer circumferential portion of stacked member 2, that is, in a space formed by first plate 3 and the second plate 4.

When mixing unit 1 rotates, fluid A that has flowed out of the outer circumferential portion of stacked member 2 flows out of the mixing unit 1 by receiving a force from blades 15. Since the ends of blades 15 are closed by first plate 3 and second plate 4, fluid A that has flowed out of the outer circumferential portion of stacked member 2 efficiently receives the force from blades 15, and thus it is possible to increase the pressure of fluid A discharged from pump mixer 6*d*.

As mixing elements of the mixing unit 1, mixing elements 21*e* and 21*f* shown in FIG. 15 are used, and thus fluid A is mixed and receives the force efficiently.

Although blades 15 are provided in the space formed by first plate 3 and second plate 4, the present invention is not limited to this configuration. For example, another disc may be attached to mixing unit 1 to fix blades 15. Although blades 15 are provided to extend in a direction perpendicular to the direction in which mixing elements 21 extend, the present invention is not limited to this configuration. Blades 15 may be inclined as long as the effects of the present invention are achieved. The shape of blades 15 is set as necessary.

The other parts of the configuration of and the other effects of pump mixer 6*d* according to this modification of the pump mixer 6 are the same as those of pump mixer 6*a* of FIG. 26A according to the tenth embodiment. According to one or more embodiments of the present invention, two or more number of inlets (51) may be employed in that respectively intake different external flows A.

Eleventh Embodiment

Figure 29:
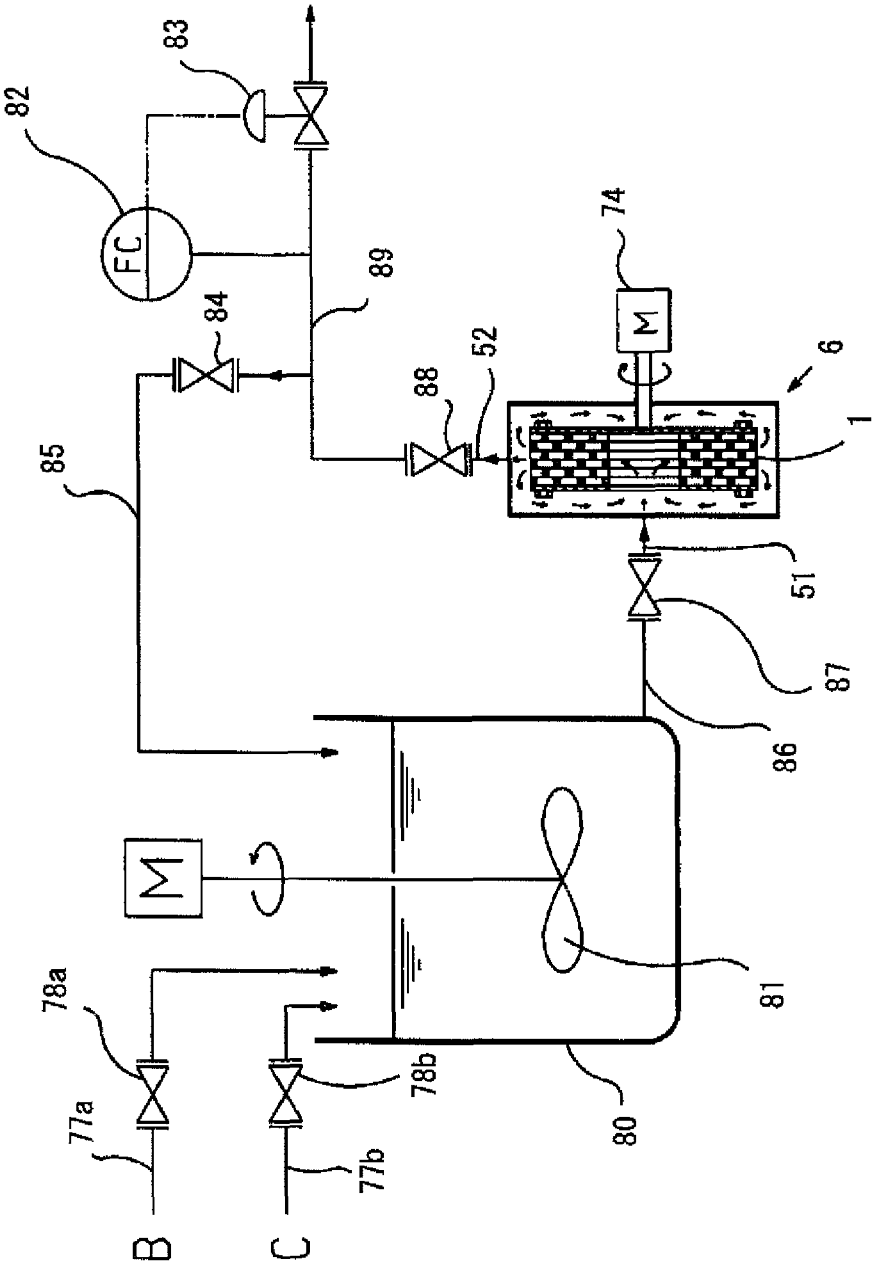
FIG. 29 is a schematic diagram showing a configuration of a mixing system in accordance with an eleventh embodiment of the present invention.

FIG. 29 is a diagram showing a configuration of a mixing system for mixing fluid with a pump mixer 6 in accordance with an eleventh embodiment of the present invention. In this example of use, the fluid is continuously mixed by pump mixer 6 and is fed out.

A fluid B and a fluid C are fed to a fluid storage vessel 80 from pipe lines 77*a* and 77*b* through valves 78*a* and 78*b*, respectively. Fluid storage vessel 80 is provided with an agitation impeller 81 for agitating fluids B and C somewhat uniformly. A nozzle 86 is provided on a lower portion of fluid storage vessel 80, and is connected to inlet 51 of pump mixer 6 through a valve 87. Outlet 52 of pump mixer 6 is connected to a feed-out line 89 through a valve 88. Feed-out line 89 branches off to a circulation line 85 communicating with fluid storage vessel 80. Circulation line 85 is provided with a valve 84 for controlling the flow rate of circulated fluid.

In this example of use, in order for the mixing to be performed on fluids B and C, fluids B and C are stored in fluid storage vessel 80, and are somewhat uniformly agitated by agitation impeller 81. Then, electric motor 74 is driven to rotate mixing unit 1, and fluids B and C are sucked from inlet 51 by the pump action resulting from the rotation.

Within pump mixer 6, the sucked fluids B and C are radially passed through first through holes 22 communicating with each other within stacked member 2 constituting mixing unit 1 from the inner circumferential portion to the outer circumferential portion, with the result that fluids B and C are mixed. Mixed fluids B and C are discharged from outlet 52 of pump mixer 6, are controlled by a flow rate controller 82 and a flow rate control valve 83 and are fed out of the system through feed-out line 89.

Feed-out line 89 branches off to the circulation line 85 communicating with the fluid storage vessel 80, and part of the fluids B and C discharged from the pump mixer 6 is returned to the fluid storage vessel 80. Since the circulation line 85 is provided in this way and thus the fluids B and C are returned from the fluid storage vessel 80 to the pump mixer 6 where the fluids B and C are repeatedly mixed, the degree of mixing of the fluids B and C is increased, and the fluids B and C may be fed out of the system.

Since the degree of opening of outlet valve 88 arranged in outlet 52 of pump mixer 6 is adjusted and thus it is possible to adjust the flow rate of fluid circulating within stacked member 2 of mixing unit 1 within pump mixer 6, it is possible to adjust the degree of mixing of fluids B and C by pump mixer 6.

Moreover, since the degree of opening of valve 84 arranged in circulation line 85 is adjusted and thus it is possible to adjust the flow rate of fluid circulating through the circulation system including fluid storage vessel 80 and pump mixer 6, it is also possible to adjust the degree of mixing of fluids B and C. In this case, valve 88 and valve 84 may be automatically controlled valves.

Twelfth Embodiment

Returning to FIG. 30, there is shown a perspective exploded view of an agitation impeller 7*a* in accordance with a twelfth embodiment of the present invention. FIG. 31 is a cross-sectional view of an agitation device 60 including a mixing vessel 63 and agitation impeller 7*a* of FIG. 30 arranged within mixing vessel 63, showing how fluid A circulates within agitation impeller 7*a* and a mixing vessel 63.

Figure 30:
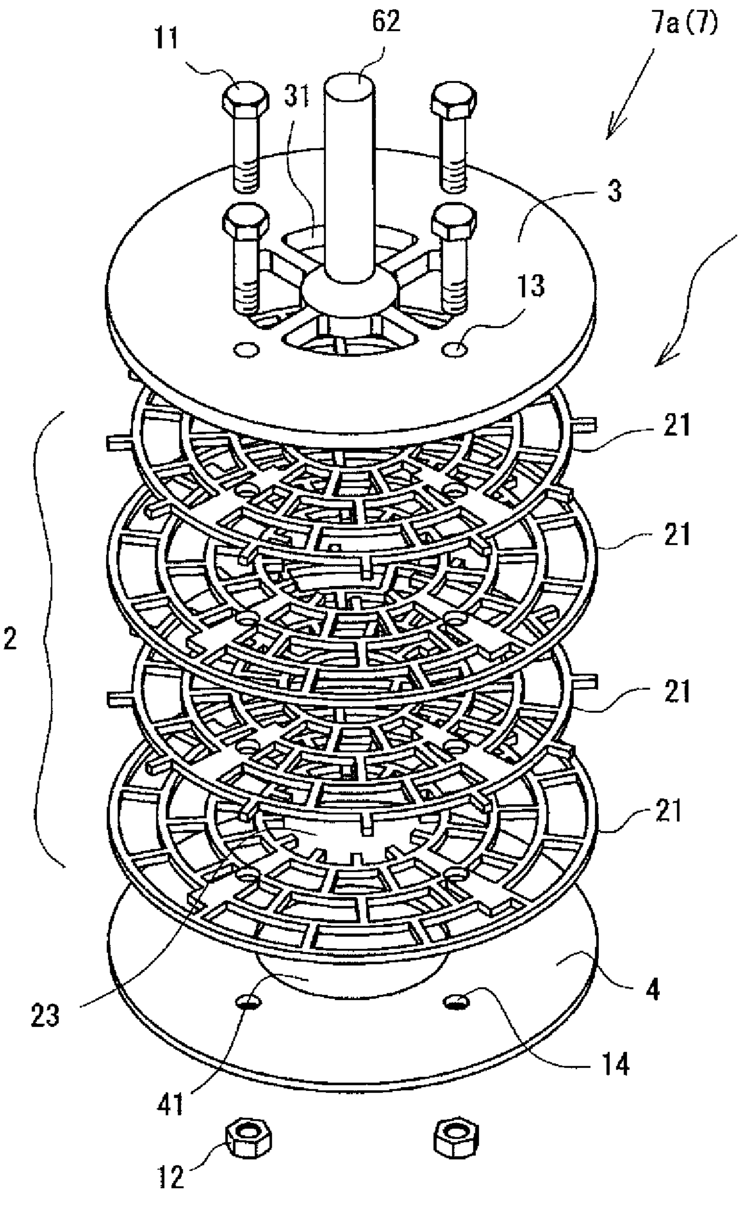
FIG. 30 is an exploded perspective view of an agitation impeller in accordance with a twelfth embodiment of the present invention.

As shown in FIG. 30, agitation impeller 7*a* has the mixing unit 1, and mixing unit 1 is configured by sandwiching stacked member 2, in which a plurality of substantially disc-shaped mixing elements are stacked, between first plate

3 and second plate 4 with fastening members composed of four bolts 11 and nuts 12 appropriately arranged.

First plate 3 is a disc that has holes 13 for the bolts and four opening portions 31 through which fluid A flows in, and has a rotation shaft 62 fitted thereto. Second plate 4 has holes 14 for the bolts and a circular opening portion 41 in the center portion through which fluid A flows out. First plate 3 and second plate 4 are substantially equal in outside diameter to mixing elements 21.

Mixing elements 21 have a plurality of first through holes 22, and have substantially circular second through holes 23 in the center portion through which fluid A circulating within mixing vessel 63 flows in. Second through holes 23 in mixing elements 21 are substantially equal in inside diameter to and are substantially concentric with the opening portion 41 in the second plate 4. Mixing elements 21 are stacked, and thus second through holes 23 form hollow portion 24.

The other parts of the configuration of mixing unit 1 of agitation impeller 7*a* are the same as those of mixing unit 1*a* or 1*b* according to the foregoing embodiments of the mixing unit.

Figure 31A:
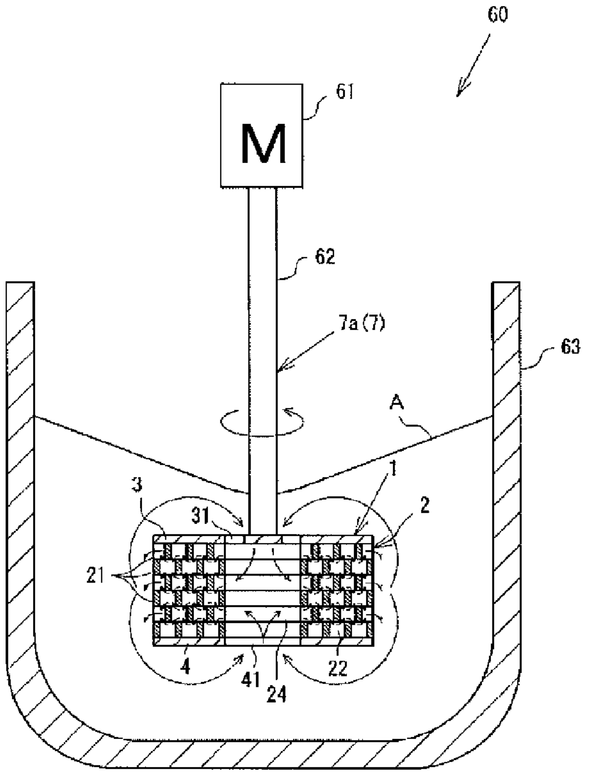
FIG. 31A is a cross-sectional view of an agitation device employing the impeller of FIG. 30 in a used state.

As shown in FIG. 31A, when agitation impeller 7*a*, that is, mixing unit 1 fitted to rotation shaft 62 is driven to rotate by a drive motor 61 to which electric power is supplied from an unillustrated power supply, a force acting outwardly in a radial direction resulting from the centrifugal force is applied to fluid A within stacked member 2 of mixing unit 1. Fluid A receiving the force is substantially radially passed through first through holes 22 communicating with each other within stacked member 2 from the inner circumferential portion to the outer circumferential portion, and is discharged outwardly from first through holes 22 open to the outer circumferential surface.

On the other hand, fluid A within mixing vessel 63 is sucked into hollow portion 24 within stacked member 2 through opening portion 41 in second plate 4 on the lower end of and four opening portions 31 in first plate 3 on the upper end of mixing unit 1. The sucked fluid A flows into stacked member 2 through first through holes 22 open to the inner circumferential surface of hollow portion 24. Then, a force acting outwardly in a radial direction due to the centrifugal force resulting from the rotation operation of mixing unit 1 is applied to sucked-fluid A, and sucked-fluid A is discharged outwardly from first through holes 22 open to the outer circumferential surface.

Then, when fluid A substantially radially flows within stacked member 2 from the inner circumferential portion to the outer circumferential portion, fluid A is passed through first through holes 22 communicating with each other, with the result that fluid A is highly mixed.

Since the fluid may be mixed by being sucked from the upper and lower portions of agitation impeller 7*a*, it is possible to expect to effectively perform mixing.

In agitation impeller 7*a* described above, since the number of mixing elements 21 stacked is increased to increase the number of through holes 22 within mixing unit 1 through which the fluid is passed and which communicate with each other, it is possible to reduce a time period during which the fluid is mixed within mixing vessel 63.

Agitation impeller 7 of the present invention is not limited to the configuration described above.

(Variations of the Agitation Impeller)

Figure 31B:
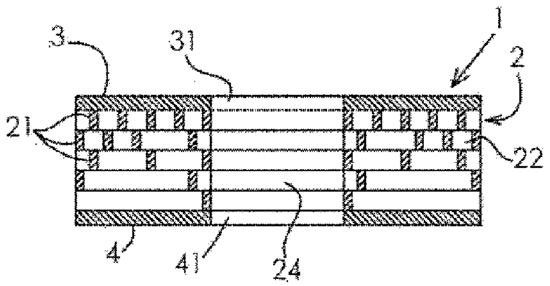
FIGS. 31B and 31C are side sectional views of mixing units as modifications of mixing elements as shown FIG. 31A.
Figure 31C:
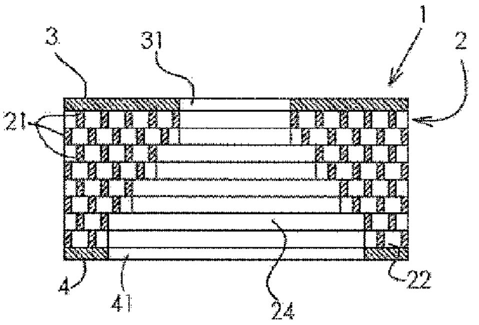

FIGS. 31B and 31C are side sectional views of mixing units 1 as modifications of mixing elements 21*g* and 21*h* of FIG. 31A. In FIG. 31B, A stacked member 2 sandwiched by first plate 3 having an opening 31 and a second plate 4 having an opening 41 consists of a plurality of mixing elements 21 each having first through holes 22 and a second through hole 24 providing a cylindrical hollow (24) communicating with openings 31 and 41. The number of partition walls extending in the circumferential direction of each mixing element 21 providing first through holes 22 in a higher position is designed to be larger than that in a lower position where diameter of each second through hole 24 is designed to be equal to those of openings 31 and 41 as shown in FIG. 31B. The resistance against fluid flowing in the radial direction of fluid increase as the number of partition walls in the circumferential direction of each mixing element 21 increases. Thus designed mixing elements 21 may decrease the volume of flowing in an upper position of mixing unit 1 but decrease it in a lower position, whereby, for example, the volume of circulating fluid flowing in upper and lower portion of an agitation device circulating may be controlled when mixing unit 1 is employed in the agitation device. Mixing unit 1 of FIG. 31C differs from mixing unit 1 of FIG. 31B in that the diameter of second through hole 24 (inner hole) of each mixing element 21 is designed to be different, narrower than that in a lower position, but other construction is same as that of FIG. 31B. As shown in FIGS. 31B and 31C, each mixing element 21 has partition walls extending around the hollow portion 24, and a number of partition walls is different for each of the mixing elements 21.

Figure 32:
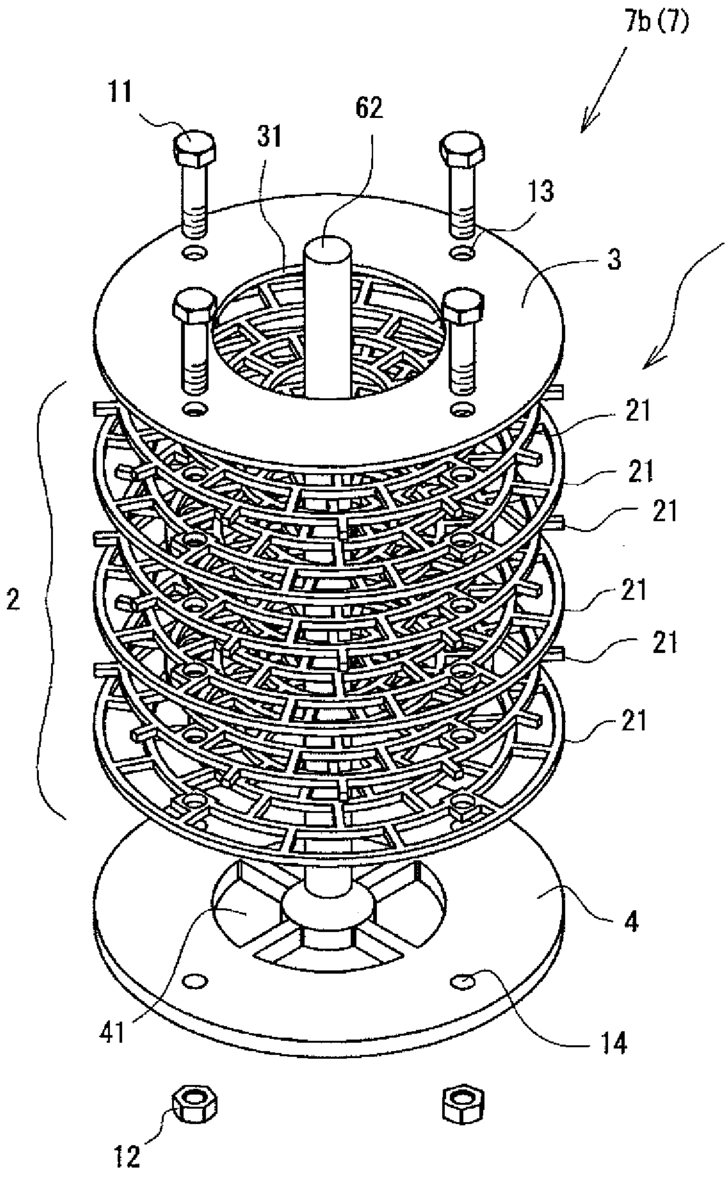
FIG. 32 is an exploded perspective view of an agitation impeller as a modification of the agitation impeller of FIG. 30.

In FIG. 32, there is shown an agitation impeller 7*b* including a rotation shaft 62 which may be provided on an end side of a mixing unit 1, that is, on second plate 4 as a variation of the agitation impeller shown in FIG. 30. In thus configured agitation impeller 7*b*, it is possible to suck a larger amount of fluid in the upper portion of the mixing vessel than the fluid in the lower portion of the mixing vessel.

Figure 33A:
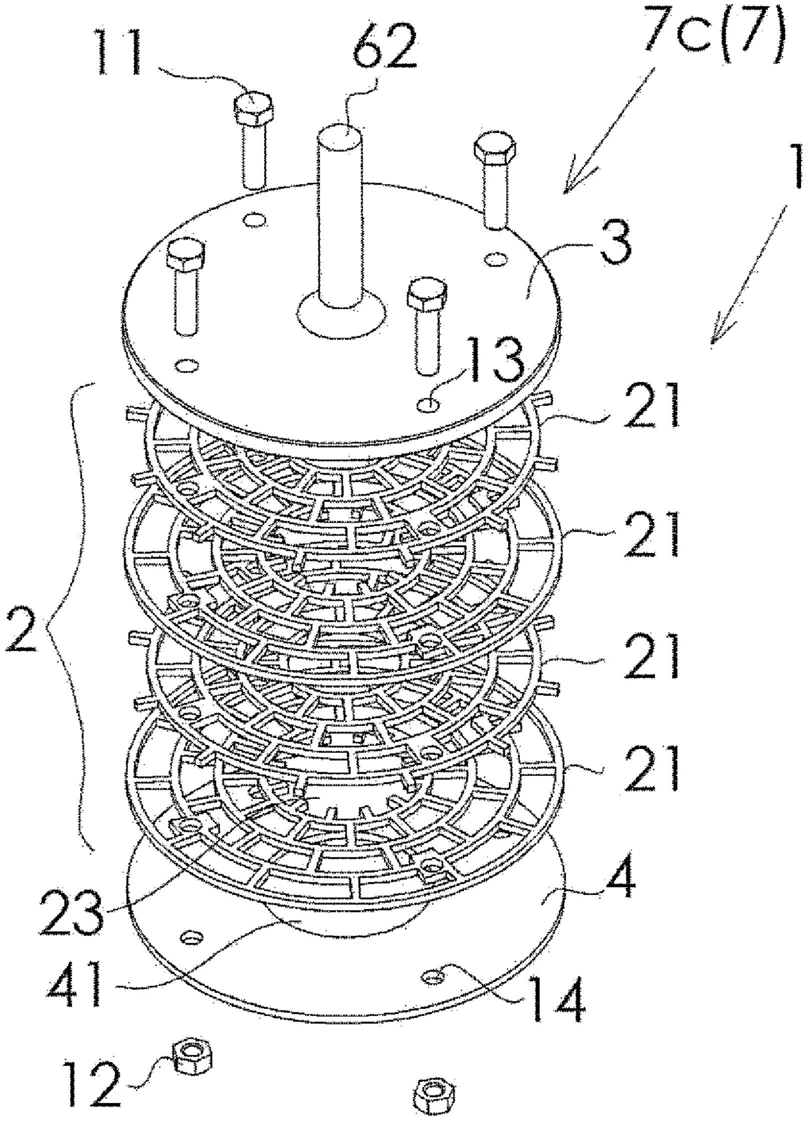
FIG. 33A is a cross-sectional view of an agitation device employing an agitation impeller modified from the agitation impeller of FIG. 30.
Figure 33B:
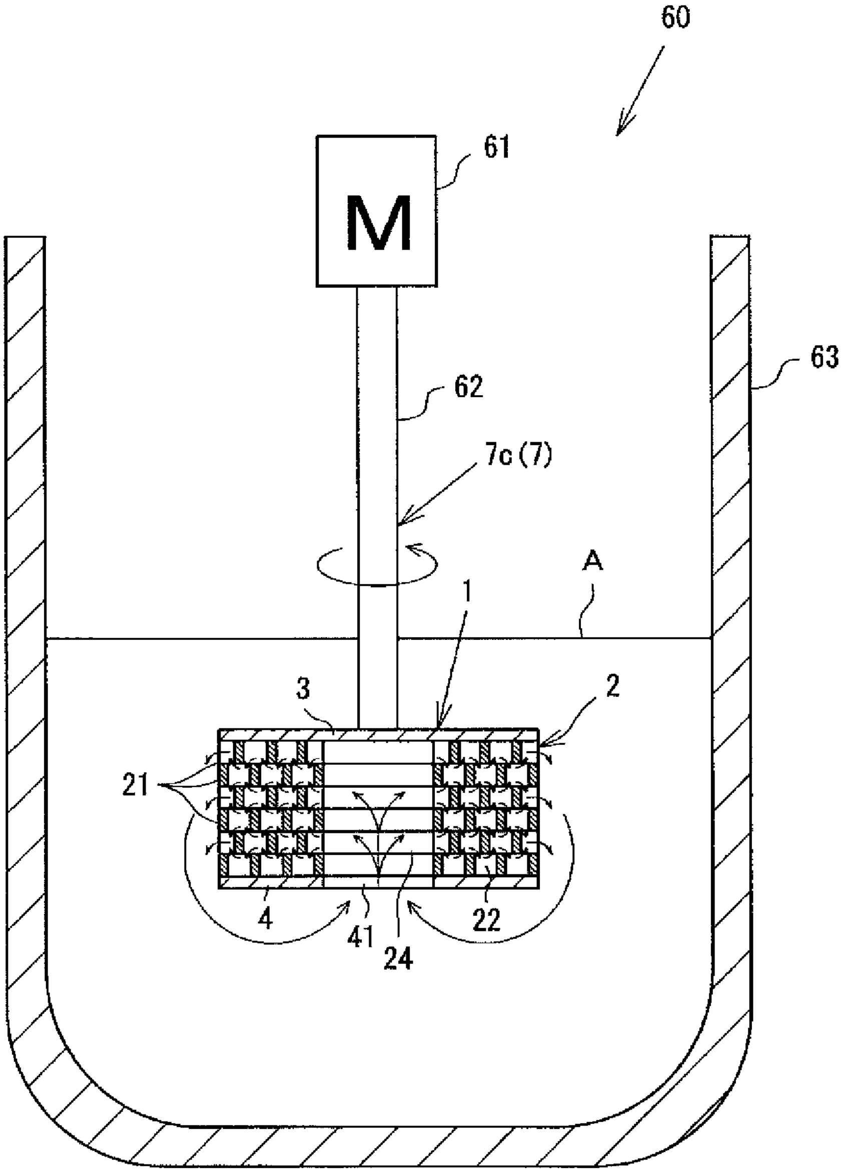
FIG. 33B is a cross-sectional view of an agitation device employing the agitation impeller of FIG. 33A.

Agitation impeller 7*b* may be modified as shown in FIG. 33A. In FIG. 33A, there is shown an agitation impeller 7*c* in which any opening portion may not be formed in first plate 3 of mixing unit 1, that is, first plate 3 may be closed. In other words, first plate 3 present near the fluid surface is closed. FIG. 33B is a cross-sectional view of an agitation device 60 including a mixing vessel 63 and agitation impeller 7*a* of FIG. 33A arranged within mixing vessel 63, showing how fluid A circulates within agitation impeller 7*c* and mixing vessel 63.

In this configuration, since the fluid flows in only from below at the time of the rotation, it is possible to mix the fluid by raising up particles and the like deposited within mixing vessel 63. The surface of fluid A within mixing vessel 63 is unlikely to be frothed. When a fluid, such as a paint, in which bubbles are desired to be prevented from being mixed at the time of agitation is agitated, this configuration is suitably used.

Figure 34:
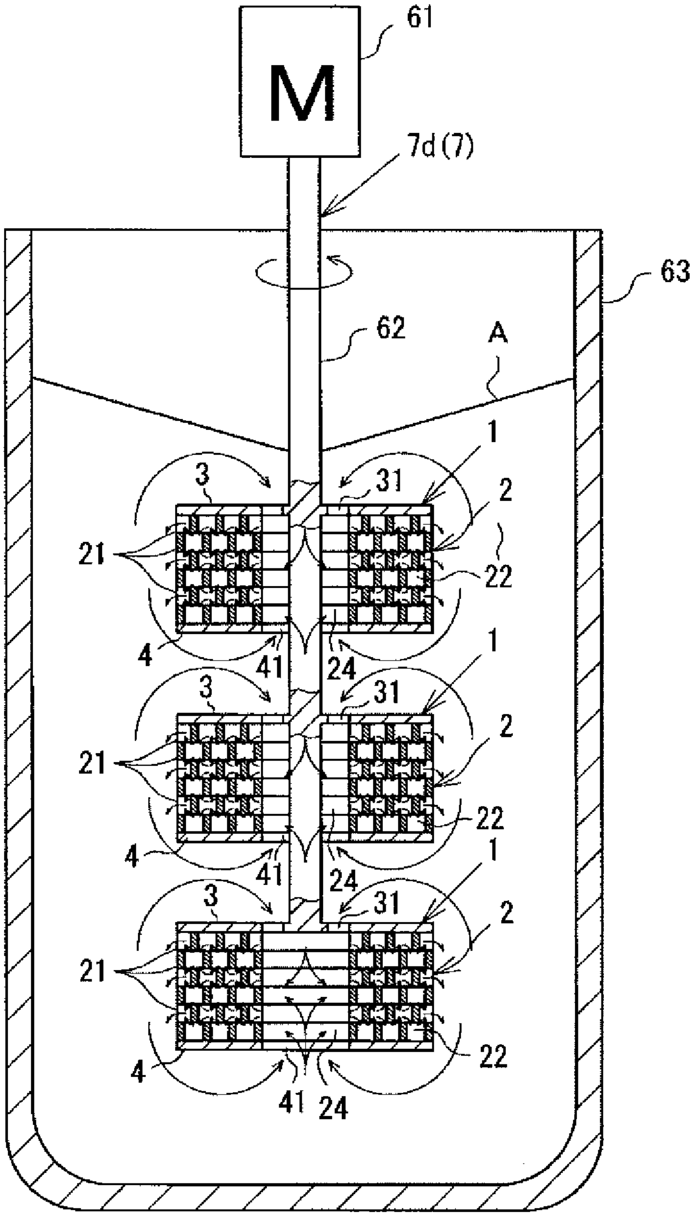
FIG. 34 is a cross-sectional view of an agitation device as a modification of the agitation device of FIG. 33B.

FIG. 34 is a cross-sectional view of an agitation device 60 including a mixing vessel 63 and a further modified agitation impeller 7*d* as another modification of agitation device. Agitation impeller 7*d* includes a rotation shaft 62 which is provided with a plurality of mixing units 1, and an appropriate space is provided between mixing units 1.

Since agitation impeller 7*d* configured as described above has a plurality of mixing units 1, it is possible to suck the fluid from the upper and lower portions of each of mixing units 1. Hence, it is possible to perform agitation even when mixing vessel 63 is deep.

Figure 35A:
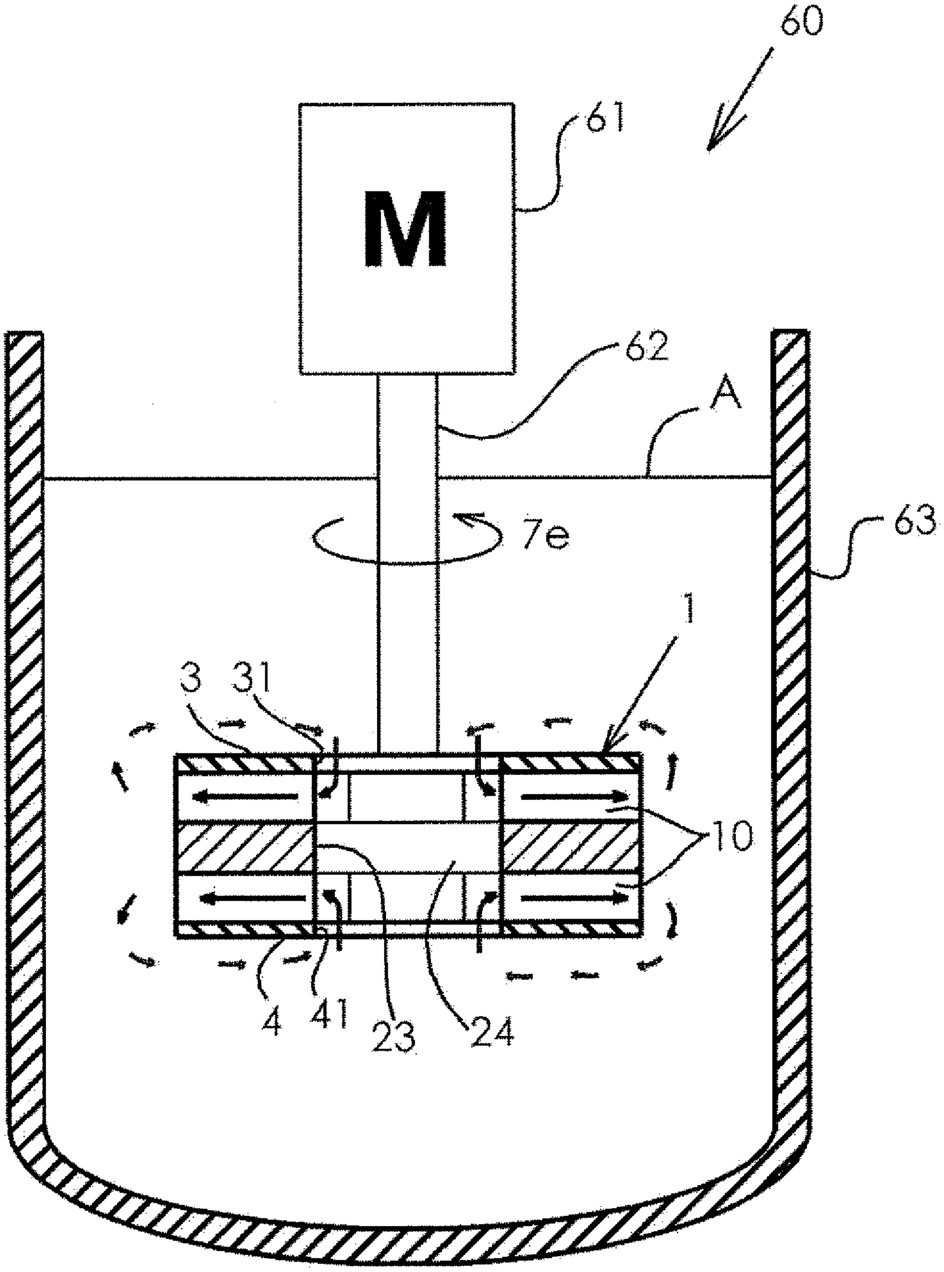
FIG. 35A is a sectional view of an agitation device including an agitation impeller which is modified from agitation impeller of FIG. 30.
Figure 35B:
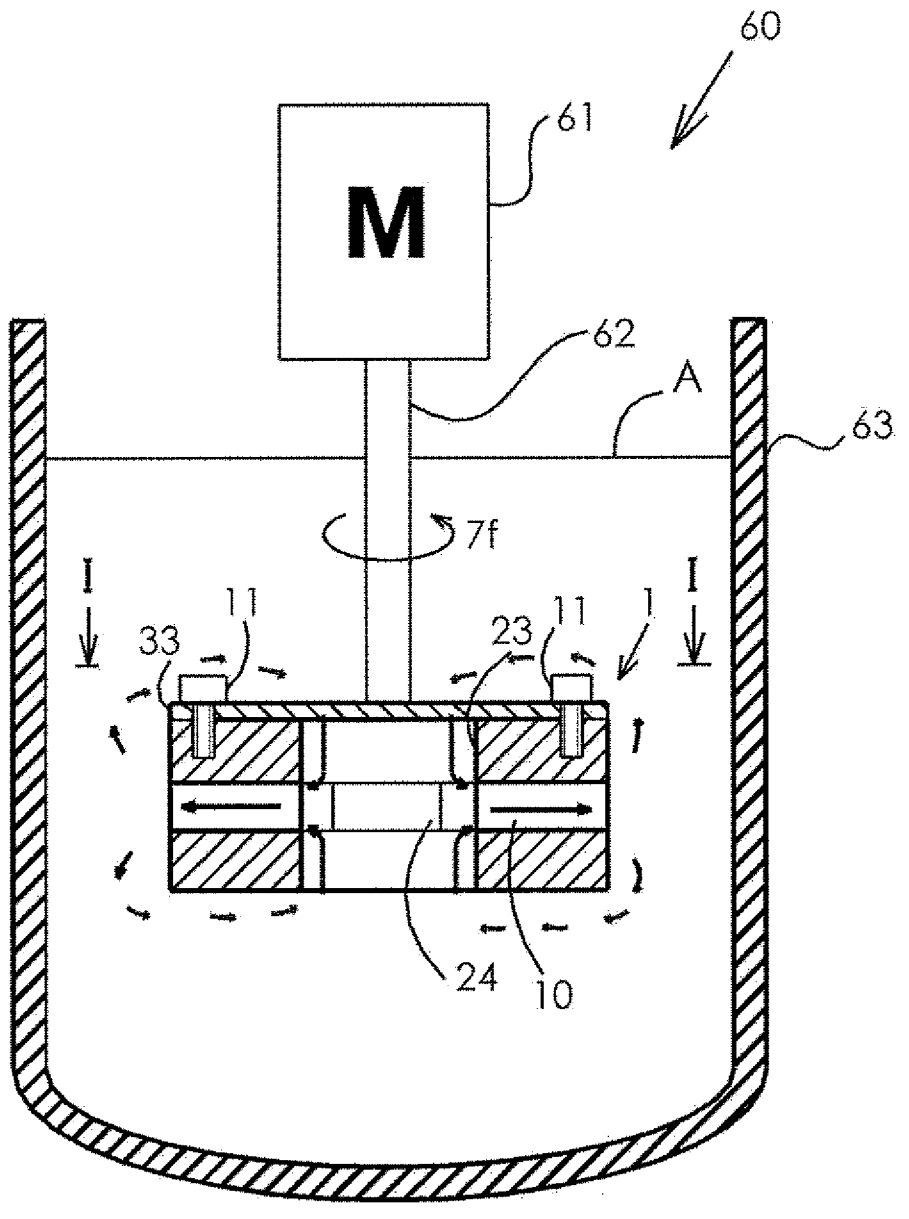
FIG. 35B is a sectional side view of an agitation device modified from the agitation device of FIG. 35A.

FIGS. 35A and 35B show further modifications of agitation impellers which may be used in agitation devices. FIG. 35A shows a cross sectional view of an agitation device 60 including an agitation impeller 7*e* which has a different configuration from that of FIG. 30 but a mixing unit 1 similar to that of FIG. 27A. Mixing unit 1 of FIG. 35A includes a cylindrical shaped hollow portion 24 at its center location passing through in a coaxial (vertical) direction of mixing unit 1, and four flow paths 10 crossing in each of two layers radially expanding from hollow portion 24 to circumferential direction thereof which are formed by a member 23, and closed by first plate 3 having a first through hole 31 and a second plate 4 having a second through hole.

Even in agitation impeller having this simplified configuration, a fluid A sucked into mixing unit 1 through a through hole 41 of second plate 4 by rotation of mixing unit 1 is mixed by passing flow paths 10 from hollow portion 24 of mixing unit 1 to the external circumferential portion. A part of fluid A passing out from the external circumferential portion of mixing unit 1 re-enters into hollow portion 24 through first and second through holes to be re-circulated.

According to one or more embodiments of the present invention, mixing unit 1 may be a single unit drilled to provide flow paths 10, through holes 31 and 41, and hollow portion 24.

FIG. 35B shows a cross sectional view of an agitation device 60 including an agitation impeller 7*f* which is modified from that of FIG. 35A, in which a mixing unit 1 similar to that of FIG. 27B. Mixing unit 1 of FIG. 35B differs from unit 1 of FIG. 35A in that four crossing flow paths 10 are disposed in a single layer in a middle of mixing unit 1. Other components or functions are same as those of FIG. 25A.

Figure 36:
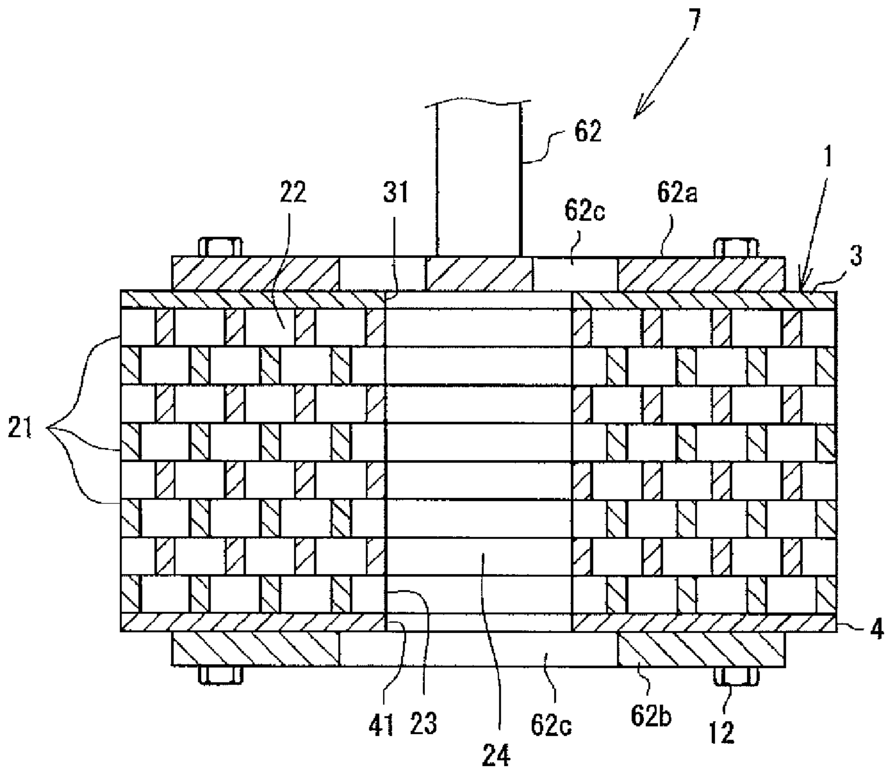
FIG. 36 is a cross sectional view of an agitation impeller as another modification.

FIG. 36 is a cross-sectional view showing the portions of a mixing unit 1 of an agitation impeller 7 as another modification of the above-described agitation impellers. In this mixing unit 1, agitation impeller 7 is configured not by providing a rotation shaft 62 directly on a first plate 3 but by using a fixing plate 62*a* provided an end of rotation shaft 62 and an auxiliary plate 62*b* which forms a pair with fixing plate 62*a* to sandwich mixing unit 1 and which is fixed with bolts 11 and nuts 12.

Opening portions 62*c* are formed in positions corresponding to second through holes 23 of mixing elements 21 in fixing plate 62*a* and auxiliary plate 62*b*. Likewise, opening portions 41 and 31 are formed in positions corresponding to second through holes 23 of mixing elements 21 in first plate 3 and second plate 4.

In agitation impeller 7 configured as described above, since first plate 3 and second plate 4 close through holes 22 at both ends of stacked member 2 in the stacking direction to form one unit, one type of rotation shaft 62 having fixing plate 62*a* and auxiliary plate 62*b* is provided, and thus it is possible to obtain agitation impeller 7 that corresponds to mixing units 1 having different sizes and structures.

Thirteenth Embodiment

Figure 37:
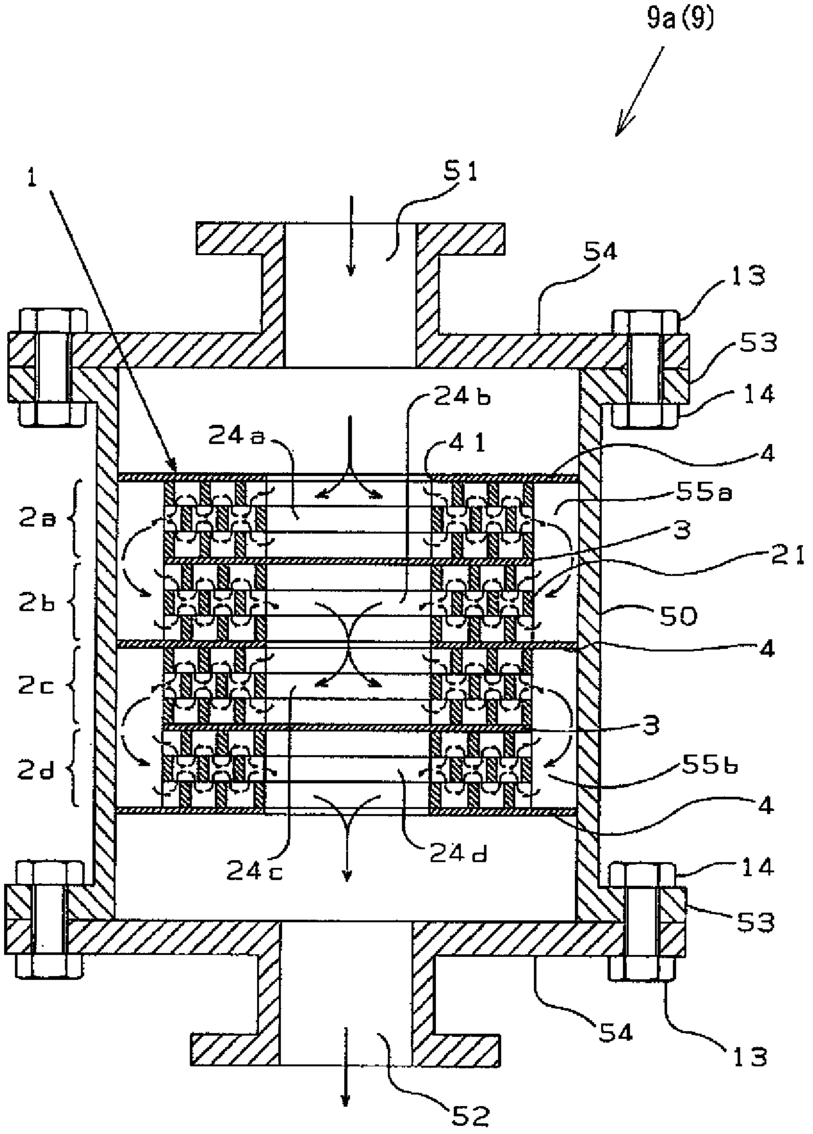
FIG. 37 is a cross-sectional view of a reaction device in accordance with a thirteenth embodiment of the present invention.

FIG. 37 is a cross-sectional view showing an internal structure of a reaction device 9*a* in accordance with a thirteenth embodiment of the present invention, showing how a fluid flows therein.

Since the structure of reaction device 9*a* shown in FIG. 37 is the same as that of mixing device 5*a* shown in FIG. 24A, the same symbols are used, and their detailed description will not be repeated.

In this reaction device 9*a*, when a plurality of types of fluid that are to undergo reaction are made to flow in through inlet 51, the fluid is passed, one after another, within stacked members 2*a* to 2*d* and annular space portions 55*a* and 55*b*, and flows toward the outlet 52. While the fluid is passed through the stacked members 2*a* to 2*d* and annular space portions 55*a* and 55*b*, the fluid is highly mixed as described above.

In other words, the fluid that is a reaction raw material is satisfactorily mixed. Hence, the reaction is promoted, and thus it is possible to rapidly obtain a desired reaction product. Since the fluid is mixed while the fluid is being passed within reaction device 9*a*, it is possible to satisfactorily mix not only the reaction raw material but also the reaction product.

Figure 38:
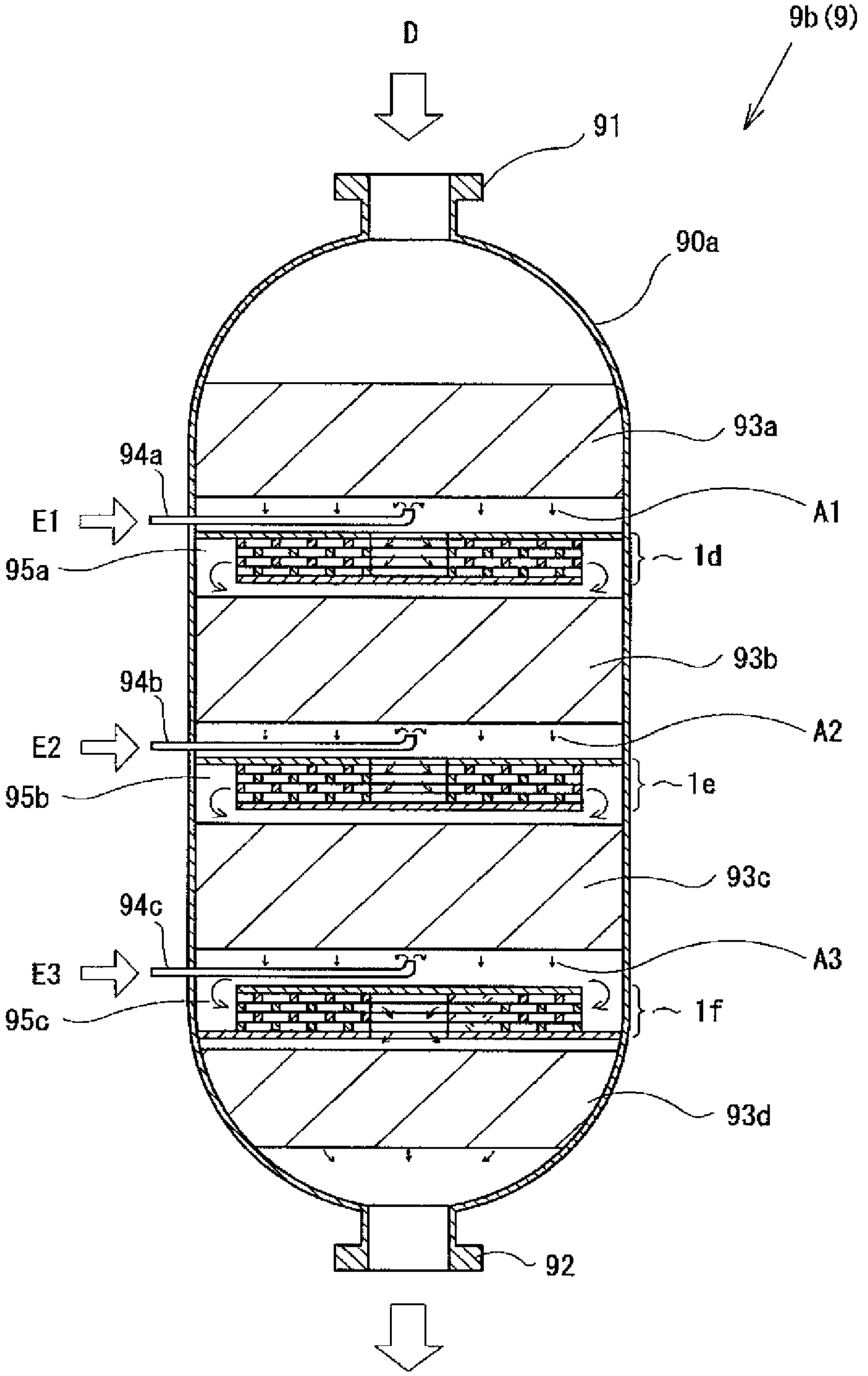
FIG. 38 is a cross-sectional view of a reaction device as a modification of the device of FIG. 37.
Figure 39A:
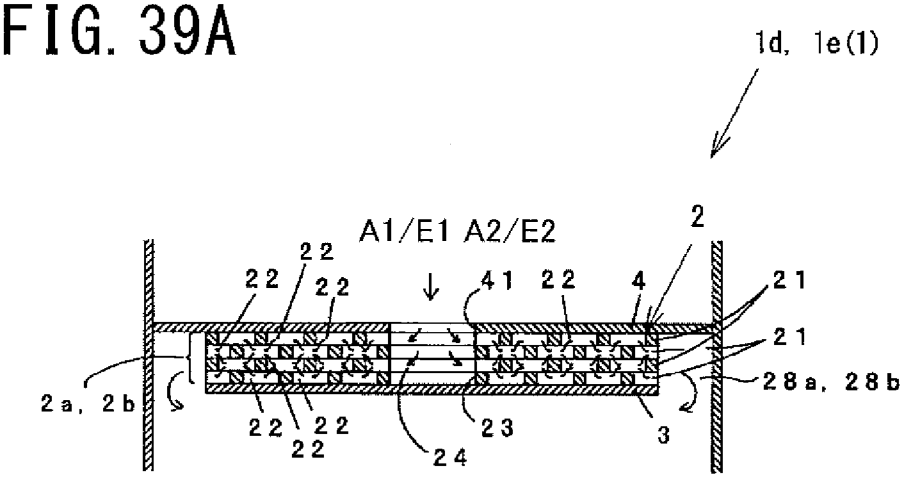
FIGS. 39A and 39B are partial cross-sectional views of mixing units employed in the reaction device of FIG. 38.
Figure 39B:
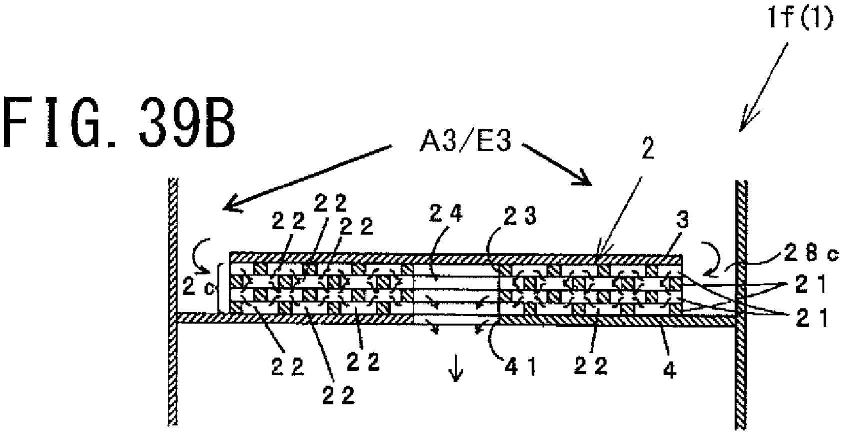

FIG. 38 is a cross-sectional view of a reaction device 9*b* within mixing units 1*d* to 1*f* are arranged as a modification of this thirteenth embodiment, showing how a fluid D and a fluid E flow within a reaction device 9*b*. FIGS. 39A and 39B are cross-sectional views showing how the fluid D and the fluid E flow within mixing units 1*d* to 1*f* arranged in reaction device 9*b*.

In reaction device 9*b*, catalyst layers 93*a* to 93*d* are provided within a substantially cylindrical vessel 90*a* having an inlet 91 and an outlet 92, and mixing units 1*d* to if and cooling gas feed nozzles 94*a* to 94*c* are arranged between catalyst layers 93*a* to 93*d*.

In this embodiment, reaction device 9*b* may be desirably used as a methanol synthesis reactor that involves a heterogeneous exothermic reaction; for example, a preheated high-temperature raw gas (fluid D) is fed from inlet 91, and low-temperature raw gases (fluids E1 to E3) that are not preheated are fed from the cooling gas feed nozzles 94*a* to 94*c*.

As shown in FIGS. 39A and 39B, mixing units 1*d* to if are configured by sandwiching stacked member 2 (2*a* to 2*c*), in which a plurality of substantially disc-shaped mixing elements 21 are stacked, between first plate 3 and second plate 4 with appropriate fixing means, and mixing units 1*d* to 1*f* are further fixed within vessel 90*a* with predetermined fixing means.

First plate 3 is a circular plate; the outside diameter of first plate 3 is substantially equal to the outside diameter of mixing elements 21. Second plate 4 is a circular plate having a circular opening portion 41 substantially in the center portion through which fluids D and E flows in; opening portion 41 is substantially equal in inside diameter to second through holes 23 of mixing elements 21, and the outside diameter of opening portion 41 is substantially equal to the inside diameter of vessel 90*a*. The overlapped state of first through holes 22 in mixing elements 21 constituting the mixing units 1*d* to if is the same as that of mixing units 1*a*, 1*b* and 1*c* of foregoing embodiments.

With respect to the mixing units 1*d* to if described above, for example, in mixing unit 1*d* as shown in FIG. 39A a high-temperature fluid A1 that has flowed from inlet 91 of reaction device 9*a* with appropriate pressure and that has passed through first catalyst layer 93*a* along with a fluid E1 fed from cooling gas feed nozzle 94*a* flows into a hollow portion 24 through opening portion 41 of second plate 4. Fluids A1 and E1 that have flowed in flow into a stacked member 2*a* through first through holes 22 in mixing element 21 communicating with hollow portion 24, and repeatedly flow in and out between first through holes 22 communicating with each other, with the result that fluids A1 and E1 are mixed. The mixed fluids A1 and E1 flow out of stacked member 2*a* through first through holes 22 in mixing element 21 communicating with an outside space portion 95*a* (FIG. 38) of stacked member 2*a*.

As described above, when fluids A1 and E1 are passed through first through holes 22 communicating with each other within stacked member 2*a* from the inner circumferential portion to the outer circumferential portion, they are dispersed, combined, reversed and subjected to turbulent flow, eddying flow, collision and the like, and thus fluids A1 and E1 are highly mixed. Then, the highly mixed fluids A1 and E1 are fed to downstream catalyst layer 93*b*, and thus the reaction rate in the catalyst layer 93*b* is increased.

Likewise, even with the mixing unit 1*e*, fluids A2 and E2 are highly mixed.

On the other hand, in mixing unit 1*f*, in contrast to mixing units 1*d* and 1*e*, first plate 3 is arranged on the upper portion of stacked member 2*c* and second plate 4 is arranged on the lower portion thereof. Even with mixing unit 1*c* configured as described above, fluids A3 and E3 flow into stacked member 2*c* through first through holes 22 in mixing element 21 communicating with an outside space portion 95*c* (FIG. 38) of stacked member 2*c*, and flow out through first through holes 22 in mixing element 21 communicating with a hollow portion 24, with the result that the fluids A3 and E3 are highly mixed.

As described above, in mixing unit 1 according to the thirteenth embodiment, second plate 4, stacked member 2 and first plate 3 may be stacked in this order in the direction in which the gas flows or, by contrast, first plate 3, stacked member 2 and the second plate 4 may be stacked in this order (see FIGS. 38 and 39(*a*) and 38(*b*)).

By freely selecting the number of mixing elements 21 stacked, it is easy to control the loss of pressure of the mixing units 1*d* to 1*f*. For example, since the fluid A3 is obtained by adding the fluids E1 and E2 to the fluid A1, the flow rate of fluid flowing into mixing unit 1*f* is larger than the flow rate of fluid flowing into the mixing unit 1*d*. In this case, by increasing the number of mixing elements 21 stacked in the mixing unit if more than the number of mixing elements stacked in the mixing unit 1*d*, it is easy to decrease the loss of pressure of the mixing unit 1*f*.

Fourteenth Embodiment

Figure 40:
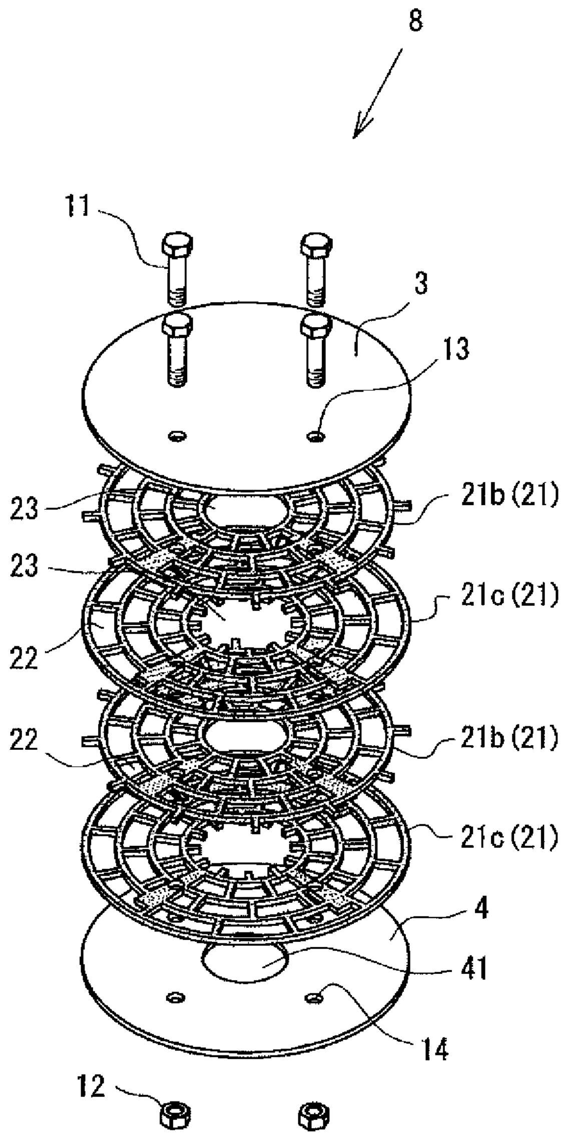
FIG. 40 is an exploded perspective view of a catalyst unit in accordance with a fourteenth embodiment of the present invention.

FIG. 40 is an exploded perspective view of a catalyst unit 8 in accordance with a fourteenth embodiment of the present invention.

The configuration of catalyst unit 8 is the same as that of the mixing units 1*a* to 1*f* in the foregoing embodiments except that mixing elements 21 have a catalytic ability.

In other words, mixing elements 21 forming catalyst unit 8 are formed of material having a catalytic action or have catalyst layers on their surfaces. The type of catalyst is selected as necessary according to a desired reaction.

In the catalyst unit 8 formed as described above, while the fluid passes through first through holes 22 within catalyst unit 8 one after another, the mixing of a reaction raw material and a reaction product is promoted. Since the promotion of mixing of the reaction raw material promotes the reaction, it is possible to rapidly perform a desired reaction.

According to one or more embodiments of the present invention, the program for manufacturing a mixing unit 1 according to one or more embodiments of the present invention may be stored on a non-transitory computer readable medium. Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 41:
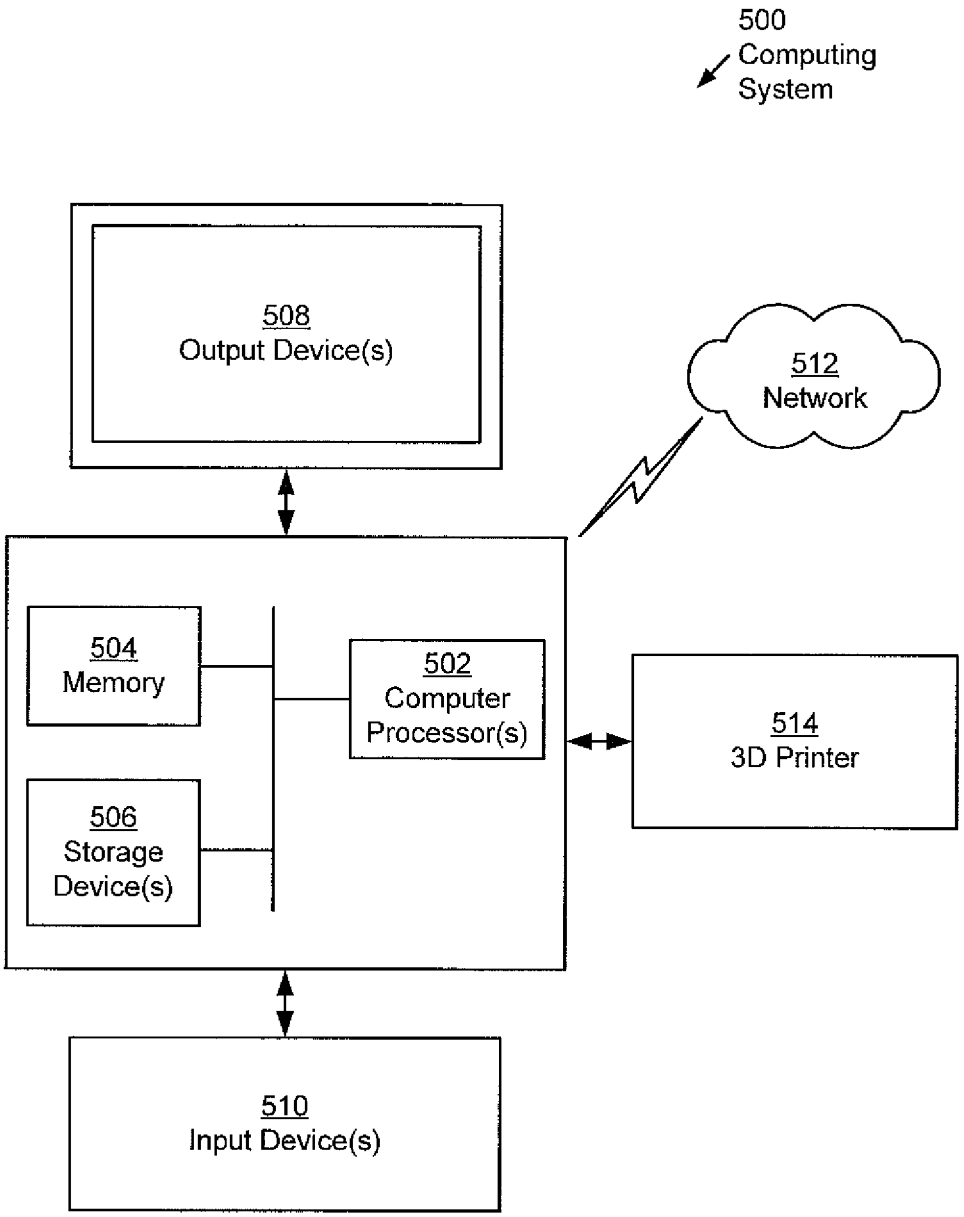
FIG. 41 is a schematic diagram showing a computing system that may be employed in manufacturing a mixing unit according to one or more embodiments of the present invention.

For example, as shown in FIG. 41, the computing system 500 may include one or more computer processor(s) 502, associated memory 504 (e.g., random access memory (RAM), cache memory, flash memory, etc.), one or more storage device(s) 506 (e.g., a hard disk, an optical drive such as a compact disk (CD) drive or digital versatile disk (DVD) drive, a flash memory stick, etc.), and numerous other elements and functionalities. The computer processor(s) 502 may be an integrated circuit for processing instructions. For example, the computer processor(s) may be one or more cores, or micro-cores of a processor. The computing system 500 may also include one or more input device(s) 510, such as a touchscreen, keyboard, mouse, microphone, touchpad, electronic pen, or any other type of input device. Further, the computing system 500 may include one or more output device(s) 508, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 500 may be connected to a network 512 (e.g., a local area network (LAN), a wide area network (WAN) such as the Internet, mobile network, or any other type of network) via a network interface connection (not shown). The input and output device(s) may be locally or remotely (e.g., via the network 512) connected to the computer processor(s) 502, memory 504, and storage device(s) 506. Many different types of computing systems exist, and the aforementioned input and output device(s) may take other forms. Further, the computing system 500 may include one or more 3D printers 514 that may manufacture a mixing unit 1 according to one or more embodiments of the present invention.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 500 may be located at a remote location and connected to the other elements over a network 512. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

According to one or more embodiments of the present invention, a mixing unit comprises a stacked member comprising mixing elements that are stacked in a stacking direction and that extend in an extending direction, a first plate, and a second plate disposed opposite the first plate. The stacked member is sandwiched between the first plate and the second plate. Each of the mixing elements comprises first through holes. The second plate comprises an opening portion that communicates with the first through holes in the stacked member.

According to one or more embodiments of the present invention, the mixing elements are arranged such that the first through holes in one of the mixing elements communicates with the first through holes in an adjacent one of the mixing elements to allow fluid to be passed in the extending direction to provide a flow path that divides the fluid in the stacking direction.

According to one or more embodiments of the present invention, the first plate comprises a surface in contact with the stacked member that blocks a fluid flow from the stacked member, each of the mixing elements comprises a partition wall that forms the first through holes, the mixing elements are arranged such that a part of the partition wall of one of the mixing elements extending in a direction crossing the extending direction is differently positioned with respect to an adjacent one of the mixing elements to provide a flow path for passing fluid within one of the first through holes in the one of the mixing elements to one of the first through holes in the adjacent one of the mixing elements in the extending direction and to divide the fluid in the stacking direction, the opening portion of the second plate is an inlet or an outlet of the fluid, and an outer circumferential side of the stacked member is an outlet or inlet of the fluid.

According to one or more embodiments of the present invention, the mixing elements are arranged such that the first through holes in one of the mixing elements communicates with the first through holes in an adjacent one of the mixing elements to allow fluid to be passed in the extending direction, and the first through hole in the one of the mixing elements overlaps the first through hole in the adjacent one of the mixing elements, whereby the fluid is unevenly divided in the extending direction.

According to one or more embodiments of the present invention, the first through holes in each of mixing elements are non-linearly arranged in the extending direction, and the mixing elements are arranged such that the first through holes in one of the mixing elements communicate with the first through holes in an adjacent one of the mixing elements to allow fluid to be passed in the extending direction.

According to one or more embodiments of the present invention, the mixing elements are arranged such that the first through holes in one of the mixing elements communicate with the first through holes in an adjacent one of the mixing elements to allow fluid to be passed in the extending direction, and each of the mixing elements comprises a partition wall between the first through holes.

According to one or more embodiments of the present invention, the partition wall of each of the mixing elements has a cross-sectional shape that is substantially an ellipse.

According to one or more embodiments of the present invention, the partition wall in each of the mixing element has a cross-sectional shape that is substantially a polygon.

According to one or more embodiments of the present invention, the mixing elements are arranged such that the first through holes in one of the mixing elements communicates with the first through holes in an adjacent one of the mixing elements to allow fluid to be passed in the extending direction to provide a flow path that divides the fluid in the stacking direction, each of the mixing elements comprises a second through hole that is larger than the first through holes, the mixing elements are arranged such that the second through hole forms a hollow portion in the stacking direction, and the opening portion of the second plate communicates with the first through holes through the hollow portion.

According to one or more embodiments of the present invention, the mixing elements are arranged such that a part of the partition wall of one of the mixing elements extending in a direction crossing the extending direction is differently positioned with respect to an adjacent one of the mixing elements to provide a flow path for passing fluid within one of the first through holes in the one of the mixing elements to one of the first through holes in the adjacent one of the mixing elements in the extending direction and to divide the fluid in the stacking direction, each of the mixing elements comprises a second through hole that is larger than the first through holes, the mixing elements are arranged such that the second through hole forms a hollow portion in the stacking direction, and the opening portion of the second plate communicates with the first through holes through the hollow portion.

According to one or more embodiments of the present invention, each of the mixing elements comprises a partition wall between the first through holes, the partition wall in each of the mixing elements is inclined with respect to the stacking direction, and, in each of the mixing elements, an inclination angle of the inclined surface of the partition wall extending from a center portion of the mixing element to an outer circumference is wider than the inclined surface of a cross-sectional shape of another partition wall.

According to one or more embodiments of the present invention, the mixing elements are plate shaped, and are stacked to form a multilayer structure.

According to one or more embodiments of the present invention, a mixing device comprises a mixing unit, and a casing that accommodates the mixing unit and that comprises an inlet and an outlet. The first plate of the mixing unit has an outer shape smaller than an inner shape of the casing. The second plate of the mixing unit has an outer shape substantially equal to the inner shape of the casing. An outer side surface of the second plate is substantially in contact with an inner side surface of the casing.

According to one or more embodiments of the present invention, the second plate serves as an inlet or an outlet.

According to one or more embodiments of the present invention, a pump mixer comprises a mixing unit, a rotational axis that supports the mixing unit to be driven to rotate; and a casing that houses the mixing unit therein, comprising: a suction port disposed in an end surface thereof, and a discharge port. When the mixing unit is driven to rotate, fluid is sucked through the suction port, passed into the mixing unit, passed out through an outer circumferential portion of the mixing unit, and discharged through the discharge port.

According to one or more embodiments of the present invention, a fluid mixing method for mixing fluid by a pump mixer comprises sucking fluid within a housing having a mixing unit therein, through a suction port disposed in an end surface of the housing, guiding the fluid though an opening portion of a hollow part of the mixing unit that is around a rotational axis that supports the mixing unit to be driven to rotate, guiding the fluid within the hollow part toward the periphery through a flow path of the mixing unit that communicates with a periphery of the mixing unit by the rotation of the mixing unit to mix the fluid within the housing, and discharging the mixed fluid from a discharge port disposed on an outer circumferential portion of the housing.

According to one or more embodiments of the present invention, the flow path of the mixing unit is bent.

According to one or more embodiments of the present invention, a pump mixer comprises a casing comprising a suction port that sucks fluid, and a discharge port that discharges fluid mixed within the casing, a mixing unit supported by the housing for a rotatable movement around a rotational axis within the casing, and having a hollow part provided with an opening port around the rotational axis, and a flow path disposed within the mixing unit communicating the hollow part with a periphery of the mixing unit.

According to one or more embodiments of the present invention, an agitation impeller comprises a mixing unit, and a rotation shaft for supporting the mixing unit for a rotatable movement of the mixing unit.

According to one or more embodiments of the present invention, a reaction device comprises a vessel comprising an inlet and an outlet for reacting fluid within the vessel, and a mixing unit. The first plate of the mixing unit has an outer shape smaller than an inner shape of the vessel. The second plate of the mixing unit has substantially a same outer shape as the inner shape of the vessel. An outer side surface of the second plate is substantially in contact with an inner side surface of the vessel.

According to one or more embodiments of the present invention, a catalyst unit comprises a mixing unit, and mixing elements of the mixing unit have a catalytic ability.

According to one or more embodiments of the present invention, a fluid mixing method comprises passing fluid between a plurality of stacked mixing elements sandwiched between a first layer and a second layer, each of which comprises an extending surface, along the extending surfaces of the mixing elements, dividing the fluid in a stacking direction in which mixing elements are stacked, merging the fluid after being divided in the stacking direction, dividing the fluid in an extending direction along the extending surface of the mixing element, merging the fluid after being divided in the extending direction, and discharging the fluid that is merged in the stacking and the extending directions.

According to one or more embodiments of the present invention, a mixing unit comprises a mixing body comprising a flow path therein, a first layer, and a second layer disposed opposite the first layer. The mixing body is sandwiched between the first layer and the second layer. The second layer comprises an opening portion that communicates with the flow path of the mixing body.

According to one or more embodiments of the present invention, the flow path includes an opening portion on a periphery of the mixing unit that is different from the first and second layers.

According to one or more embodiments of the present invention, the flow path is a flow through-path that divides a flow in a plurality of directions within the mixing body.

According to one or more embodiments of the present invention, the mixing body comprises a plurality of flow paths within the mixing body which cross within the mixing body.

According to one or more embodiments of the present invention, the flow path comprises a first flow path that feeds a fluid within the mixing body, and a second flow path that feeds out the fluid from the mixing body, and a periphery of the mixing body comprises an opening communicating with the second flow path.

According to one or more embodiments of the present invention, a manufacturing method for a mixing unit comprises forming mixing elements having a substantially same external configuration and extending in an extending direction, each of which comprises first through holes; forming a first layer member having a substantially same external configuration as that of the mixing elements; forming a second layer member having a substantially same external configuration as that of the mixing elements and comprising an opening portion; and stacking the second layer member, the mixing elements, and the first layer member in a stacking direction. The mixing elements form a stacked member. The first layer member is disposed opposite the second layer member. The opening portion of the second layer member is communicated with at least one of the first through holes of the stacked member. The mixing elements are arranged such that at least one of the first through holes of one of the mixing elements communicates with at least one of the first through holes in an adjacent one of the mixing elements to allow fluid to be passed in the extending direction to provide a flow path that divides the fluid in the stacking direction.

According to one or more embodiments of the present invention, forming the mixing elements comprises stacking a plurality of thin plates to form each of the mixing elements, and the stacked thin plates are stacked to form the stacked member.

According to one or more embodiments of the present invention, mixing elements are formed by etching, punching, or laser cutting.

According to one or more embodiments of the present invention, a program stored on a non-transitory computer-readable medium causes a computer to perform forming mixing elements having a substantially same external configuration and extending in an extending direction, each of which comprises first through holes; forming a first layer member having a substantially same external configuration as that of the mixing elements; forming a second layer member having a substantially same external configuration as that of the mixing elements and comprising an opening portion, arranging the first layer member opposite the second layer member; stacking the second layer member, the mixing elements, and the first layer member in a stacking direction, wherein the mixing elements form a stacked member; communicating the opening portion of the second layer member with at least one of the first through holes of the stacked member, and arranging the mixing elements such that at least one of the first through holes of one of the mixing elements is communicated with at least one first through hole in an adjacent one of the mixing elements to allow fluid to be passed in the extending direction to provide a flow path that divides the fluid in the stacking direction.

According to one or more embodiments of the present invention, a program stored on a non-transitory computer-readable medium causes the computer to set a flow speed of a fluid passing through in a direction to be equal to a flow speed of a fluid passing through in the extending direction.

According to one or more embodiments of the present invention, a program stored on a non-transitory computer-readable medium causes the computer to set a flow speed of a fluid passing through in a direction to be not equal to a flow speed of a fluid passing through in the extending direction.

According to one or more embodiments of the present invention, mixing elements are arranged such that the first through holes in one of the mixing elements communicates with the first through holes in an adjacent one of the mixing elements to allow fluid to be passed in the extending direction, each of the mixing elements comprises a second through hole that is larger than the first through holes, the mixing elements are arranged such that the second through hole forms a hollow portion in the stacking direction, each of the mixing elements comprises partition walls extending around the hollow portion, and a number of partition walls is different for each of the mixing elements.

According to one or more embodiments of the present invention, an inner diameter of the second through hole of each of the mixing elements is substantially equal.

According to one or more embodiments of the present invention, an inner diameter of the second through hole of each of the mixing elements is different.

According to one or more embodiments of the present invention, a mixed fluid formed by mixing different types of fluid by a pump mixer, by: combining the different types of fluid to form a combined fluid; sucking the combined fluid within a housing having a mixing unit therein, through a suction port disposed in an end surface of the housing; guiding the combined fluid though an opening portion of a hollow part of the mixing unit that is around a rotational axis that supports the mixing unit to be driven to rotate, guiding the combined fluid within the hollow part toward the periphery through a flow path of the mixing unit that communicates with a periphery of the mixing unit by the rotation of the mixing unit to mix the combined fluid within the housing to form the mixed fluid, and discharging the mixed fluid from a discharge port disposed on an outer circumferential portion of the housing.

According to one or more embodiments of the present invention, a mixed fluid formed by mixing different types of fluids by combining the different types of fluids to form a combined fluid; passing the combined fluid between a plurality of stacked mixing elements sandwiched between a first layer and a second layer, each of which comprises an extending surface, along the extending surfaces of the mixing elements; dividing the combined fluid in a stacking direction in which mixing elements are stacked; merging the combined fluid after being divided in the stacking direction, dividing the combined fluid in an extending direction along the extending surface of the mixing element; merging the fluid after being divided in the extending direction, to form the mixed fluid; and discharging the mixed fluid that is combined in the stacking and the extending directions.

According to one or more embodiments of the present invention, a designing method for a mixing unit comprises forming mixing elements having a substantially same external configuration and extending in an extending direction, each of which comprises first through holes; forming a first layer member having a substantially same external configuration as that of the mixing elements; forming a second layer member having a substantially same external configuration as that of the mixing elements and comprising an opening portion; arranging the first layer member opposite the second layer member; stacking the second layer member, the mixing elements, and the first layer member in a stacking direction, wherein the mixing elements form a stacked member; communicating the opening portion of the second layer member with at least one of the first through holes of the stacked member; and arranging the mixing elements such that at least one of the first through holes of one of the mixing elements is communicated with at least one first through hole in an adjacent one of the mixing elements to allow fluid to be passed in the extending direction to provide a flow path that divides the fluid in the stacking direction.

According to one or more embodiments of the present invention, a designing method comprises setting a flow speed of a fluid passing through in a direction to be equal to a flow speed of a fluid passing through in the extending direction.

According to one or more embodiments of the present invention, a designing method comprises setting a flow speed of a fluid passing through in a direction to be not equal to a flow speed of a fluid passing through in the extending direction.

According to one or more embodiments of the present invention, a designing method for a pump mixer comprises forming a mixing unit, forming a casing comprising a suction port that sucks fluid, and a discharge port that discharges fluid mixed within the casing, forming a mixing unit supported by the housing for a rotatable movement around a rotational axis within the casing, and having a hollow part provided with an opening port around the rotational axis, and forming a flow path disposed within the mixing unit communicating the hollow part with a periphery of the mixing unit.

The embodiments disclosed above should be considered to be illustrative in all respects and not restrictive. The scope of the present invention is indicated not by the embodiments described above but by the scope of claims, and includes meaning equivalent to the scope of claims and all modifications and variations within the scope.

For example, although the example where the two types of mixing elements described above are provided and they are alternately stacked has been described, for example, three or more types of elements may be provided. Instead of stacking the types of elements one by one, the types of elements may be irregularly stacked.

Although the embodiments discussed above have been described mainly with consideration given to the mixing and the reaction of a liquid and a gas as the fluid, the "fluid" of the present invention is not limited to what has been described above but includes a multiphase flow consisting of at least two or more types of liquids including a gas and a mist and solids such as a powder and granular material. The liquid may be a fluid such as a highly viscous liquid, a low viscous liquid, a Newtonian fluid or a non-Newtonian fluid. While "different types of fluids" includes fluids are different in composition, "different types of fluids" may also include fluids that have different ratios or temperatures of the same materials therein. For example, a salt water solution and a more dense salt water solution, or different temperature liquids or gases, are considered to be "different types of fluids."

Various types of mixing units and devices have been described as one or more embodiments of the present invention. One skilled in the art would appreciate that such units, device, and elements that constituent the units and devices may be manufactured by various types of manufacturing processes, e.g., employing a 3D printing, an injection molding, and a press molding.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A mixing unit comprising:

a stacked member comprising mixing elements that are stacked in a stacking direction and that extend in an extending direction;

a first plate; and a second plate disposed opposite the first plate, wherein the stacked member is sandwiched between the first plate and the second plate, wherein each of the mixing elements comprises first through holes, and wherein the second plate comprises an opening portion that communicates with the first through holes in the stacked member.

2. The mixing unit according to claim 1, wherein the mixing elements are arranged such that the first through holes in one of the mixing elements communicates with the first through holes in an adjacent one of the mixing elements to allow fluid to be passed in the extending direction to provide a flow path that divides the fluid in the stacking direction.

3. The mixing unit according to claim 2, wherein the mixing elements are further arranged to provide a flow path that combines the divided fluid in the stacking direction.

4. The mixing unit according to claim 1, wherein the first plate comprises a surface in contact with the stacked member that blocks a fluid flow from the stacked member, wherein each of the mixing elements comprises a partition wall that forms the first through holes, wherein the mixing elements are arranged such that a part of the partition wall of one of the mixing elements extending in a direction crossing the extending direction is differently positioned with respect to an adjacent one of the mixing elements to provide a flow path for passing fluid within one of the first through holes in the one of the mixing elements to one of the first through holes in the adjacent one of the mixing elements in the extending direction and to divide the fluid in the stacking direction, wherein the opening portion of the second plate is an inlet or an outlet of the fluid, and wherein an outer circumferential side of the stacked member is an outlet or inlet of the fluid.

5. The mixing unit according to claim 1, wherein the mixing elements are arranged such that the first through holes in one of the mixing elements communicates with the first through holes in an adjacent one of the mixing elements to allow fluid to be passed in the extending direction, and wherein the first through hole in the one of the mixing elements overlaps the first through hole in the adjacent one of the mixing elements, whereby the fluid is unevenly divided in the extending direction.

6. The mixing unit according to claim 1, wherein the first through holes in each of mixing elements are non-linearly arranged in the extending direction, and wherein the mixing elements are arranged such that the first through holes in one of the mixing elements communicate with the first through holes in an adjacent one of the mixing elements to allow fluid to be passed in the extending direction.

7. The mixing unit according to claim 1, wherein the mixing elements are arranged such that the first through holes in one of the mixing elements communicate with the first through holes in an adjacent one of the mixing elements to allow fluid to be passed in the extending direction, wherein each of the mixing elements comprises a partition wall between the first through holes.

8. The mixing unit according to claim 7, wherein the partition wall of each of the mixing elements has a cross-sectional shape that is substantially an ellipse.

9. The mixing unit according to claim 7, wherein the partition wall in each of the mixing element has a cross-sectional shape that is substantially a polygon.

10. The mixing unit according to claim 1, wherein the mixing elements are arranged such that the first through holes in one of the mixing elements communicates with the first through holes in an adjacent one of the mixing elements to allow fluid to be passed in the extending direction to provide a flow path that divides the fluid in the stacking direction, wherein each of the mixing elements comprises a second through hole that is larger than the first through holes, wherein the mixing elements are arranged such that the second through hole forms a hollow portion in the stacking direction, and wherein the opening portion of the second plate communicates with the first through holes through the hollow portion.

11. The mixing unit according to claim 10, wherein each of the mixing elements comprises a partition wall between the first through holes, wherein the partition wall in each of the mixing elements is inclined with respect to the stacking direction, and wherein, in each of the mixing elements, an inclination angle of the inclined surface of the partition wall extending from a center portion of the mixing element to an outer circumference is wider than the inclined surface of a cross-sectional shape of another partition wall.

12. A mixing device comprising:

the mixing unit of claim 10; and a casing that accommodates the mixing unit and that comprises an inlet and an outlet, wherein the first plate of the mixing unit has an outer shape smaller than an inner shape of the casing, wherein the second plate of the mixing unit has an outer shape substantially equal to the inner shape of the casing, and wherein an outer side surface of the second plate is substantially in contact with an inner side surface of the casing.

13. The mixing device according to claim 12, wherein the second plate serves as an inlet or an outlet.

14. An agitation impeller comprising:

the mixing unit of claim 10; and a rotation shaft for supporting the mixing unit for a rotatable movement of the mixing unit.

15. The mixing unit of claim 1, wherein the mixing elements are arranged such that a part of a partition wall of one of the mixing elements extending in a direction crossing the extending direction is differently positioned with respect to an adjacent one of the mixing elements to provide a flow path for passing fluid within one of the first through holes in the one of the mixing elements to one of the first through holes in the adjacent one of the mixing elements in the extending direction and to divide the fluid in the stacking direction, wherein each of the mixing elements comprises a second through hole that is larger than the first through holes, wherein the mixing elements are arranged such that the second through hole forms a hollow portion in the stacking direction, and wherein the opening portion of the second plate communicates with the first through holes through the hollow portion.

16. The mixing unit according to claim 1, wherein the mixing elements are plate shaped, and are stacked to form a multilayer structure.

17. A pump mixer comprising:
the mixing unit of claim 1;
a rotational axis that supports the mixing unit to be driven to rotate; and
a casing that houses the mixing unit therein, comprising: a suction port disposed in an end surface thereof, and a discharge port,
wherein, when the mixing unit is driven to rotate, fluid is sucked through the suction port, passed into the mixing unit, passed out through an outer circumferential portion of the mixing unit, and discharged through the discharge port.

18. A reaction device comprising:
a vessel comprising an inlet and an outlet for reacting fluid within the vessel; and
the mixing unit of claim 1,
wherein the first plate of the mixing unit has an outer shape smaller than an inner shape of the vessel,
wherein the second plate of the mixing unit has a substantially same outer shape as the inner shape of the vessel, and
wherein an outer side surface of the second plate is substantially in contact with an inner side surface of the vessel.

19. A catalyst unit comprising: the mixing unit of claim 1, wherein mixing elements of the mixing unit have a catalytic ability.

20. A manufacturing method for the mixing unit according to claim 1, the method comprising:
forming mixing elements having a substantially same external configuration and extending in an extending direction, each of which comprises first through holes;
forming a first layer member having a substantially same external configuration as that of the mixing elements;
forming a second layer member having a substantially same external configuration as that of the mixing elements and comprising an opening portion; and
stacking the second layer member, the mixing elements, and the first layer member in a stacking direction,
wherein the mixing elements form a stacked member,
wherein the first layer member is disposed opposite the second layer member,
wherein the opening portion of the second layer member is communicated with at least one of the first through holes of the stacked member,
wherein the mixing elements are arranged such that at least one of the first through holes of one of the mixing elements communicates with at least one of the first through holes in an adjacent one of the mixing elements to allow fluid to be passed in the extending direction to provide a flow path that divides the fluid in the stacking direction.

21. The manufacturing method according to claim 20,
wherein the forming the mixing elements comprises stacking a plurality of thin plates to form each of the mixing elements,
wherein the stacked thin plates are stacked to form the stacked member.

22. The manufacturing method according to claim 20, wherein the mixing elements are formed by etching, punching, laser cutting, or 3D printing.

23. A program stored on a non-transitory computer-readable medium that causes a computer to perform the following steps to manufacture the mixing unit of claim 1:
forming mixing elements having a substantially same external configuration and extending in an extending direction, each of which comprises first through holes;
forming a first layer member having a substantially same external configuration as that of the mixing elements;
forming a second layer member having a substantially same external configuration as that of the mixing elements and comprising an opening portion;
arranging the first layer member opposite the second layer member;
stacking the second layer member, the mixing elements, and the first layer member in a stacking direction, wherein the mixing elements form a stacked member;
communicating the opening portion of the second layer member with at least one of the first through holes of the stacked member; and
arranging the mixing elements such that at least one of the first through holes of one of the mixing elements is communicated with at least one first through hole in an adjacent one of the mixing elements to allow fluid to be passed in the extending direction to provide a flow path that divides the fluid in the stacking direction.

24. The program stored on a non-transitory computer-readable medium according to claim 23,
wherein the program further causes the computer to perform: setting a flow speed of a fluid passing through in a direction to be equal to a flow speed of a fluid passing through in the extending direction.

25. The program stored on a non-transitory computer-readable medium according to claim 23, wherein the program further causes the computer to perform:
setting a flow speed of a fluid passing through in a direction to be not equal to a flow speed of a fluid passing through in the extending direction.

26. The mixing unit according to claim 1,
wherein the mixing elements are arranged such that the first through holes in one of the mixing elements communicates with the first through holes in an adjacent one of the mixing elements to allow fluid to be passed in the extending direction,
wherein each of the mixing elements comprises a second through hole that is larger than the first through holes,
wherein the mixing elements are arranged such that the second through hole forms a hollow portion in the stacking direction,
wherein each of the mixing elements comprises partition walls extending around the hollow portion, and
wherein a number of partition walls is different for each of the mixing elements.

27. The mixing unit according to claim 26, wherein an inner diameter of the second through hole of each of the mixing elements is substantially equal.

28. The mixing unit according to claim 26, wherein an inner diameter of the second through hole of each of the mixing elements is different.

29. A designing method for the mixing unit according to claim 1, comprising:
forming mixing elements having a substantially same external configuration and extending in an extending direction, each of which comprises first through holes;
forming a first layer member having a substantially same external configuration as that of the mixing elements;
forming a second layer member having a substantially same external configuration as that of the mixing elements and comprising an opening portion; arranging the first layer member opposite the second layer member;
stacking the second layer member, the mixing elements, and the first layer member in a stacking direction, wherein the mixing elements form a stacked member;

communicating the opening portion of the second layer member with at least one of the first through holes of the stacked member; and arranging the mixing elements such that at least one of the first through holes of one of the mixing elements is communicated with at least one first through hole in an adjacent one of the mixing elements to allow fluid to be passed in the extending direction to provide a flow path that divides the fluid in the stacking direction.

30. The designing method according to claim 29, further comprising:

setting a flow speed of a fluid passing through in a direction to be equal to a flow speed of a fluid passing through in the extending direction.

31. The designing method according to claim 29, further comprising:

setting a flow speed of a fluid passing through in a direction to be not equal to a flow speed of a fluid passing through in the extending direction.

32. The mixing unit according to claim 1, wherein the mixing elements are arranged such that the first through holes in one of the mixing elements communicates with the first through holes in an adjacent one of the mixing elements to allow fluid to be passed in the extending direction to provide a flow path that divides the fluid in the extending direction.

33. The mixing unit according to claim 32, wherein the mixing elements are further arranged to provide a flow path that combines the divided fluid in the extending direction.

34. A fluid mixing method by using the mixing unit according to claim 1 comprising:

passing fluid the stacked mixing elements sandwiched between the first layer and the second layer, each of which comprises an extending surface, along the extending surfaces of the mixing elements;

dividing the fluid in an extending direction along the extending surface of the mixing element;

merging the fluid after being divided in the extending direction; and discharging the fluid that is merged in the extending direction.

35. A fluid mixing method for mixing fluid by a pump mixer, comprising:

sucking fluid within a housing having a mixing unit therein, through a suction port disposed in an end surface of the housing;

guiding the fluid through an opening portion of a hollow part of the mixing unit that is around a rotational axis that supports the mixing unit to be driven to rotate, guiding the fluid within the hollow part toward the periphery through a flow path of the mixing unit that communicates with a periphery of the mixing unit by the rotation of the mixing unit to mix the fluid within the housing, and discharging the mixed fluid from a discharge port disposed on an outer circumferential portion of the housing.

36. The fluid mixing method of claim 35, wherein the flow path of the mixing unit is bent.

37. A pump mixer comprising:

a casing comprising a suction port that sucks fluid, and a discharge port that discharges fluid mixed within the casing;

a mixing unit supported by the casing for a rotatable movement around a rotational axis within and relative to the casing, and having a hollow part provided with an opening port around the rotational axis; and a flow path disposed within the mixing unit communicating the hollow part with a periphery of the mixing unit, wherein the casing sucks the fluid through the suction port from an outside of the casing into an inside of the casing, mixes the fluid within the casing, and discharges the fluid through the discharge port to the outside of the casing.

38. A fluid mixing method comprising:

passing fluid among a plurality of stacked mixing elements each having a first through holes sandwiched between a first layer and a second layer having an opening to communicate with the first through holes, each of which comprises an extending surface, along the extending surfaces of the mixing elements;

dividing the fluid in a stacking direction in which the mixing elements are stacked;

merging the fluid after being divided in the stacking direction, dividing the fluid in an extending direction along the extending surface of the mixing element;

merging the fluid after being divided in the extending direction; and discharging the fluid that is merged in the stacking and the extending directions.

39. A mixing unit comprising:

a mixing body comprising a plurality of elements each of which includes first through holes to form a flow path therein;

a first layer; and a second layer disposed opposite the first layer, wherein the mixing body is sandwiched between the first layer and the second layer;

wherein the second layer comprises an opening portion that communicates with the first through holes in the mixing body; and wherein the flow path includes an opening portion on a periphery of the mixing unit that is different from the first and second layers.

40. The mixing unit according to claim 39, wherein the flow path is a flow through-path that divides a flow in a plurality of directions within the mixing body.

41. The mixing unit according to claim 40, wherein the mixing body comprises a plurality of flow paths within the mixing body which cross within the mixing body.

42. The mixing unit of claim 39, wherein the flow path comprises a first flow path that feeds a fluid within the mixing body, and a second flow path that feeds out the fluid from the mixing body, and wherein a periphery of the mixing body comprises an opening communicating with the second flow path.

43. The mixing unit according to claim 39, wherein the mixing body is formed as a single member.

44. The mixing unit according to claim 39, wherein the mixing unit is formed as a single member.

45. A mixing unit for rotation use comprising:

a stacked member in which a plurality of planar mixing elements are stacked, wherein the mixing elements have a plurality of first through holes, and the mixing elements are arranged such that part or all of the first through holes in one of the mixing elements, whose upper surface is in contact with another mixing element and whose lower surface is in contact with another mixing element, communicate with first through holes in the adjacent mixing elements to allow fluid to be passed in the direction in which the mixing element extends and to be divided and combined, wherein the direction in which the mixing element extends refers to the direction perpendicular to the direction in which the mixing elements are stacked.

46. The mixing unit of claim 45, wherein the mixing elements have second through holes larger than the first through holes and are arranged such that the second through holes communicate with each other in a direction in which the mixing elements are stacked so as to form a hollow portion in the stacked member.

47. The mixing unit according to claim 45, wherein the mixing elements are arranged such that the first through holes in one of the mixing elements communicates with the first through holes in an adjacent one of the mixing elements to allow fluid to be passed in the extending direction; and wherein the first through hole in the one of the mixing elements overlaps the first through hole in the adjacent one of the mixing elements, whereby the fluid is unevenly divided in the extending direction.

48. The mixing unit according to claim 45, wherein the first through holes in each of mixing elements are non-linearly arranged in the extending direction, and wherein the mixing elements are arranged such that the first through holes in one of the mixing elements communicate with the first through holes in an adjacent one of the mixing elements to allow fluid to be passed in the extending direction.

49. The mixing unit according to claim 45, wherein the mixing unit is formed as a single member.

50. An agitation impeller having the mixing unit of claim 45 disposed to be driven to rotate.

51. A pump mixer comprising:

the mixing unit of claim 45;

a rotational axis that supports the mixing unit to be driven to rotate; and a casing that houses the mixing unit therein, comprising:

a suction port disposed in an end surface thereof, and a discharge port, wherein, when the mixing unit is driven to rotate, fluid is sucked through the suction port, passed into the mixing unit, passed out through an outer circumferential portion of the mixing unit, and discharged through the discharge port.

52. A mixing system comprising:

the pump mixer of claim 51; and a fluid circulating path that extends from the discharge port to the suction port of pump mixer.

53. A fluid mixing method using the mixing unit of claim 45, comprising the step of:

passing fluid into the stacked member, and dividing and combining the fluid through the first through holes arranged in the direction in which the mixing element extends.

54. The fluid mixing method of claim 53 using the mixing unit of claim 46, further comprising the step of:

rotating the stacked member to pass fluid into the hollow portion in the stacked member and to the outer circumferential portion of the stacked member through the first through holes.

* * * * *